US012492411B2

(12) United States Patent
Kohn et al.

(10) Patent No.: US 12,492,411 B2
(45) Date of Patent: Dec. 9, 2025

(54) GENE EDITING OF MONOGENIC DISORDERS IN HUMAN HEMATOPOIETIC STEM CELLS—CORRECTION OF X-LINKED AGAMMAGLOBULINEMIA (XLA)

(71) Applicant: The Regents of the University of California, Oakland, CA (US)

(72) Inventors: Donald B. Kohn, Tarzana, CA (US); Caroline Y. Kuo, Beverly Hills, CA (US); David Gray, San Diego, CA (US); Zulema Romero Garcia, Los Angeles, CA (US); Roger P. Hollis, Los Angeles, CA (US); Anastasia Lomova, Tarzana, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1255 days.

(21) Appl. No.: 17/059,193

(22) PCT Filed: May 30, 2019

(86) PCT No.: PCT/US2019/034715
§ 371 (c)(1),
(2) Date: Nov. 25, 2020

(87) PCT Pub. No.: WO2019/232253
PCT Pub. Date: Dec. 5, 2019

(65) Prior Publication Data
US 2021/0379105 A1    Dec. 9, 2021

Related U.S. Application Data

(60) Provisional application No. 62/760,448, filed on Nov. 13, 2018, provisional application No. 62/678,218, filed on May 30, 2018.

(51) Int. Cl.
*A61K 48/00*    (2006.01)
*A61K 38/17*    (2006.01)
(Continued)

(52) U.S. Cl.
CPC .......... *C12N 15/86* (2013.01); *A61K 38/1793* (2013.01); *A61K 40/11* (2025.01);
(Continued)

(58) Field of Classification Search
CPC ........ C12N 15/86; C12N 5/0636; C12N 9/22; C12N 15/11; C12N 15/907; A61P 37/04;
(Continued)

(56) References Cited

U.S. PATENT DOCUMENTS 3,106,831 A    10/1963 Behrens
6,106,832 A    8/2000 Spriggs et al.
(Continued)

FOREIGN PATENT DOCUMENTS

GB    2338237    12/1999
WO    WO 2002/077227    10/2002
(Continued)

OTHER PUBLICATIONS

Aria, et al., Journal of Human Genetics (2011) 56, 577-582 (Year: 2011).*
(Continued)

*Primary Examiner* — Evelyn Y Pyla
*Assistant Examiner* — Katherine R Small
(74) *Attorney, Agent, or Firm* — Mark S. Cohen; PEARL COHEN ZEDEK LATZER BARATZ LLP

(57) ABSTRACT

In certain embodiments methods of treating X-Linked agammaglobulinemia (XLA) in a mammal are provided where the methods comprise: i) providing differentiated T cells and/or stem/progenitor cells from the mammal; ii) performing a targeted insertion of a corrective BTK cDNA at the BTK
(Continued)

gene locus in said cells to provide a corrected BTK gene in said cells; and iii) introducing said cells into said mammal where said corrected BTK gene is expressed in a physiologically regulated manner.

13 Claims, 8 Drawing Sheets

Specification includes a Sequence Listing.

(51) Int. Cl.
    *A61K 40/11*    (2025.01)
    *A61K 40/40*    (2025.01)
    *A61P 37/04*    (2006.01)
    *C12N 5/0783*    (2010.01)
    *C12N 9/22*    (2006.01)
    *C12N 15/11*    (2006.01)
    *C12N 15/86*    (2006.01)
    *C12N 15/90*    (2006.01)

(52) U.S. Cl.
    CPC .......... *A61K 40/40* (2025.01); *A61K 48/0066* (2013.01); *A61P 37/04* (2018.01); *C12N 5/0636* (2013.01); *C12N 9/22* (2013.01); *C12N 15/11* (2013.01); *C12N 15/907* (2013.01); *C12N 2310/14* (2013.01); *C12N 2310/20* (2017.05); *C12N 2740/15043* (2013.01); *C12N 2750/14143* (2013.01); *C12N 2800/80* (2013.01)

(58) Field of Classification Search
    CPC .............. A61K 39/4611; A61K 39/464; A61K 38/1793
    See application file for complete search history.

(56) References Cited

U.S. PATENT DOCUMENTS

| | | |
|---|---|---|
| 2009/0054985 A1 | 2/2009 | Anderson |
| 2016/0208243 A1 | 7/2016 | Zhang et al. |
| 2017/0101641 A1 | 4/2017 | Vorechovsky et al. |
| 2017/0121693 A1 | 5/2017 | Liu et al. |
| 2017/0335011 A1 | 11/2017 | Conklin et al. |
| 2018/0002719 A1 | 1/2018 | Roeth et al. |
| 2020/0325458 A1 | 10/2020 | Rawlings et al. |
| 2021/0324381 A1 | 10/2021 | Rawlings et al. |
| 2023/0158110 A1 | 5/2023 | Kuo et al. |

FOREIGN PATENT DOCUMENTS

| | | | | |
|---|---|---|---|---|
| WO | WO-2016182959 A1 | 11/2016 | | |
| WO | WO-2016186772 A2 | 11/2016 | | |
| WO | WO-2016201047 A1 | * 12/2016 | ............. | A61K 35/28 |
| WO | WO-2017053729 A1 | 3/2017 | | |
| WO | WO-2017143071 A1 | 8/2017 | | |
| WO | WO-2018232356 A1 | 12/2018 | | |
| WO | WO-2019084168 A1 | 5/2019 | | |
| WO | WO-2019210216 A2 | 10/2019 | | |
| WO | WO-2019232251 A1 | 12/2019 | | |
| WO | WO-2019232253 A1 | 12/2019 | | |

OTHER PUBLICATIONS (Gundry et al., Experimental Hematology (2017) 54: 4-11 (Year: 2017).*
Clough, C. et al., "132. Targeting the BTK Locus in Primary Human Hematopoietic Cells with TALENs and AAV Donor Template", Molecular Therapy, May 1, 2016, vol. 24, No. Suppl. 1, pp. S54.
Dye, M.J., "Terminal Exon Definition Occurs Cotranscriptionally and Promotes Termination of RNA Polymerase II," Molecular Cell, Mar. 1999, vol. 3, pp. 371-378.
EP Search Report dated Feb. 23, 2022, in Application No. EP19812414.1.
Extended European Search Report dated Apr. 25, 2022, in Application No. EP19810629.6.
Hermaszewski, R.A., & Webster, A.D.B., "Primary Hypogammaglobulinaemia: a Survey of Clinical Manifestations and Complications," QJM: An International Journal of Medicine, Jan. 1993, vol. 86(1), pp. 31-42.
Hubbard, N. et al., "Targeted gene editing restores regulated CD40L function in X-linked hyper-IgM syndrome", Blood, May 26, 2016, vol. 127, No. 21, pp. 2513-2522.
International Preliminary Report on Patentability dated Dec. 10, 2020 in PCT Application No. PCT/US2019/034713.
International Preliminary Report on Patentability dated Dec. 10, 2020 in PCT Application No. PCT/US2019/034715.
International Search Report and Written Opinion dated Oct. 9, 2019 in PCT Application No. PCT/US2019/034713.
International Search Report and Written Opinion dated Oct. 18, 2019 in PCT Application No. PCT/US2019/034715.
Kohn, D.B. et al., "New Frontiers in the Therapy of Primary Immunodeficiency: From Gene Addition to Gene Editing", The Journal of allergy and clinical immunology, Mar. 2017, vol. 139, No. 3, pp. 726-732.
Kuo, C.Y. et al., "Site-Specific Gene Editing of Human Hematopoietic Stem Cells for X-Linked Hyper-IgM Syndrome", Cell reports, May 29, 2018, vol. 23, No. 9, pp. 2606-2616.
Kuo, C.Y., et al., "Targeted Gene Therapy in the Treatment of X-linked Hyper-IgM Syndrome," Gene Targeting and Gene Correction I, May 2014, vol. 22(1), p. S36.
Ng. Y.Y. et al., "Correction of B-cell Development in Btk-deficient Mice Using Lentiviral Vectors With Codon-optimized Human BTK", Leukemia, 2010, vol. 24, pp. 1617-1630.
Ravin, S.S.De., et al., "Lentiviral Hematopoietic Stem Cell Gene Therapy for X-linked Severe Combined Immunodeficiency," Science translational medicine, Apr. 20, 2016, vol. 8(335): 33ra57, 12 pages.
Seyama, K. et al., "Mutations of the CD40 ligand gene and its effect on CD40 ligand expression in patients with X-linked hyper IgM syndrome", Blood, Oct. 1, 1998, vol. 92, No. 7, pp. 2421-2434.
Shaul, O., "How Introns Enhance Gene Expression," The international journal of biochemistry & cell biology, Oct. 2017, vol. 9(Pt B), pp. 145-155.
Siegal, F.P, et al., "Lymphocytes in Human Immunodeficiency States: a Study of Membrane-associated Immunoglobulins," European Journal of Immunology, 1971, vol. 1(6), pp. 482-486.
Tsukada, S., et al., "Deficient Expression of a B Cell Cytoplasmic Tyrosine Kinase in Human X-linked Agammaglobulinemia," Cell, Jan. 29, 1993, vol. 279-290.
Brown et al., "Thymic lymphoproliferative disease after successful correction of CD40 ligand deficiency by gene transfer in mice", Nature Medicine, Nov. 1998; 4(11): 1253-1260.
De La Morena, et al., "Long-term outcomes of 176 patients with X-linked hyper-IgM syndrome treated with or without hematopoietic cell transplantations", Journal of Allergy and Clinical Immunology, Apr. 2017; 139(4):1282-1292.
Dull et al., "A third-generation lentivirus vector with a conditional packaging system", Journal of Virology, Nov. 1998, 72(11): 8463-8471.
Ebina et al., "Harnessing the CRISPR/Cas9 system to disrupt latent HIV-1 provirus", Scientific Reports, Aug. 26, 2013; 3: 2510.
Gennery et al., "Treatment of CD40 ligand deficiency by hematopoietic stem cell transplantation: a survey of the European experience, 1993-2002", Blood, Oct. 2, 2003; 103(3):1152-1157.
Hayward et al., "Cholangiopathy and tumors of the pancreas, liver, and biliary tree in boys with X-linked immunodeficiency with hyper-Ig,M", Journal of Immunology, Jan. 15, 1997; 158(2): 977-983.
Hollenbaugh et al., "The random inactivation of the X chromosome carrying the defective gene responsible for X-linked hyper IgM syndrome (X-HIM) in female carriers of HIGM1", The Journal of Clinical Investigation, Aug. 1994; 94(2): 616-622.
Hu et. al., "Heritable gene-targeting with gRNA/Cas9 in rats", Cell Research, Oct. 22, 2013;23:1322-1325.

(56) References Cited

OTHER PUBLICATIONS

Levy et al., "Clinical spectrum of X-linked hyper-IgM syndrome", The Journal of Pediatrics, Jul. 1997; 131(1): 47-54.

Mitsui-Sekinaka et al., "Clinical features and hematopoietic stem cell transplantations for CD40 ligand deficiency in Japan", Journal of Allergy and Clinical Immunology, Mar. 31, 2015; 136(4): 1018-1024.

Saifuddin et al., "Phosphorylation and the regulation of CD40L mRNA stability by polypyrimidine tract binding protein (P1394)", J. Immunol., May 1, 2013; 190(1_Supplement): 203.14.

Tsai et al., "GUIDE-Seq enables genome-wide profiling of off-target cleavage by CRISPR-Cas nucleases", Nat. Biotechnol., Feb. 2015; 33(2):187-197. doi: 10.1038/nbt.3117.

Zufferey et al., "Self-inactivating lentivirus vector for safe and efficient in vivo gene delivery", Journal of Virology, Dec. 1998; 72(12): 9873-9880.

Follenzi et al., "Gene transfer by lentiviral vectors is limited by nuclear translocation and rescued by HIV-1 pol sequences", Nature Genetics, Jun. 2000; 25: 217-222.

Genome assembly GRCh37.p13. National Library of Medicine (accessed at: https://www.ncbi.nlm.nih.gov/datasets/genome/GCF_000001405.25/) (Year: 2013).

Liu et al., "Biallelic insertion of a transcriptional terminator via the CRISPR/Cas9 system efficiently silences expression of protein-coding and non-coding RNA genes", J Biol Chem. Feb. 14, 2017; 292(14):5624-5633.

Barrett et al., "Regulation of eukaryotic gene expression by the untranslated gene regions and other non-coding elements", Cell Mol Life Sci. Nov. 2012; 69(21):3613-34. Epub Apr. 27, 2012.

Leppek et al., "Functional 5' UTR mRNA structures in eukaryotic translation regulation and how to find them", Nat Rev Mol Cell Biol. Mar. 2018; 19(3):158-174. Epub Nov. 22, 2017.

Clerte et al., "The domains of polypyrimidine tract binding protein have distinct RNA structural preferences", Biochemistry, Mar. 17, 2009; 48(10):2063-2074.

Rohrer et al., "Correction of X-Linked Immunodeficient Mice by Competitive Reconstitution With Limiting Numbers of Normal Bone Marrow Cells", Blood, Nov. 15, 1999; 94(10):3358-3365.

Rohrer et al., "Unusual mutations in Btk: an insertion, a duplication, an inversion, and four large deletions", Clinical Immunology, Jan. 1999; 90(1): 28-37.

Naldini et al., "Efficient transfer, integration, and sustained long-term expression of the transgene in adult rat brains injected with a lentiviral vector", Proceedings of the National Academy of Sciences, Oct. 1996; 93:11382-11388.

Sather et al., "Development of B-lineage predominant lentiviral vectors for use in genetic therapies for B cell disorders", Molecular Therapy, Nov. 2011; 19(3): 515-525.

Mohamed et al., "Bruton's tyrosine kinase (Btk): function, regulation, and transformation with special emphasis on the PH domain", Immunol. Rev. (2009) 228: 58-73.

\* cited by examiner

Gene Therapy for X-Linked Agammaglobulinemia (XLA) Using Targeted Endonucleases

X-Linked Agammaglobulinemia

- 1 in 200,000 births worldwide
- Patients produce no antibodies and are treated with Ab supplementation
- Treatment is expensive, lifelong, and patients have recurrent pulmonary infestions and slightly reduced life expectancies
- XLA results from a deficiency in Bruton's Tyrosine Kinase (BTK)
- Analogous disease in mice known as X-linked immunodeficiency (Xid)

*Fig. 3*

SEQUENCE LISTING

```
<160> NUMBER OF SEQ ID NOS: 34

<210> SEQ ID NO 1
<211> LENGTH: 20
<212> TYPE: DNA
<213> ORGANISM: Homo sapiens

<400> SEQUENCE: 1
ctctggactg taagaatatg                                                    20

<210> SEQ ID NO 2
<211> LENGTH: 3680
<212> TYPE: DNA
<213> ORGANISM: Homo sapiens

<400> SEQUENCE: 2
ttgtcctttg gggtcccttc actatcaagt tcaactgtgt gtccctgaga ctcctctgcc        60
ccggaggaca ggagactcga aaaacgctct tcctggccag tctctttgct ctgtgtctgc       120
cagcccccag catctctcct ctttcctgta agccctctc cctgtgctga ctgtcttcat        180
```

```
agtactttag gtatgttgtc cctttacctc tgggaggata gcttgatgac ctgtctgctc      240
aggccagccc catctagagt ctcagtggcc ccagtcatgt tgagaaaggt tctttcaaag      300
atagactcaa gatagtagtg tcagaggtcc aagcaaatg aagggcgggg acagttgagg       360
gggtggaata gggacggcag cagggaacca gatagcatgc tgctgagaag aaaaaaagac     420
attggtttag gtcaggaagc aaaaaaaggg aactgagtgg ctgtgaaagg gtggggtttg      480
ctcagactgt ccttcctctc tggactgtaa gaatatgtct ccagggccag tgtctgctgc     540
gatcgagtcc accttccaa gtcctggcat ctcaatgcat ctgggaagct acctgcatta      600
agtcaggact gagcacacag gtgaactcca gaaagaagaa gctatggccg ccgtgatcct     660
ggaatccatc ttcctgaagc ggagccagca gaagaagaaa acaagccctc tgaacttcaa     720
gaagcggctg ttcctgctga ccgtgcacaa gctgagctac tacgagtacg acttcgagcg     780
gggcagaaga ggcagcaaga aaggcagcat cgacgtggaa aagatcacct gtgtggaaac    840
cgtggtgccc gagaagaacc ctccacctga gagacagatc cccagaaggg gcgaagagtc    900
cagcgagatg gaacagatct ctatcatcga gcggttcccg tatcctttcc aagtggtgta    960
cgacgagggc ccactgtacg tgttcagccc taccgaggaa ctgcggaaga gatggatcca  1020
ccagctgaag aacgtgatcc ggtacaacag cgacctggtg cagaagtatc ccctgctt     1080 ttggatcgac ggccagtacc tgtgctgtag ccagaccgcc aagaatgcca tgggctgcca  1140
gattctggaa aacggaacg gctctctgaa gcccggcagc agccacagaa agaccaagaa   1200
gcctctgcct cctacacctg aagaggacca gatcctgaag aaacccctgc ctccagaacc   1260
tgccgctgct cctgtgtcta ccagcgagct gaaaaaggtg gtggccctgt acgactacat   1320
gcccatgaac gccaacgacc tgcagctgag aaagggcgac gagtacttca tcctggaaga   1380
gtctaacctg cctggtggc gggccagaga caagaatggc caagagggct acatccccag   1440
caactacgtg accgaggccg aggacagcat cgagatgtac gagtggtaca gcaagcacat   1500
gaccagaagc caggccgaac agctgctgaa gcaagagggc aaagaaggcg gcttcatcgt   1560
ccgggattct agcaaggccg gcaagtacac cgtgtccgtg ttcgccaaga gcaccggcga   1620
tcctcagggc gtgatcagac actacgtcgt gtgtagcacc cctcagagcc agtactacct   1680
ggccgagaag cacctgttca gcacaatccc cgagctgatc aactaccacc agcacaactc   1740
tgccggcctg atcagcagac tgaagtaccc tgtgtctcag cagaacaaaa acgcccctag   1800
cacagccggc ctcggctatg atcttgggga gatcgacccc aaggacctga ccttcctgaa    1860
agaactcggc accggccagt tcggcgtcgt gaagtatgga aaatggcggg acagtacga    1920 cgtggccatc aagatgatca agagggcag catgagcgag gacgagttca tcgaagaggc   1980
caaagtgatg atgaacctga gccacgagaa gctggtgcag ctgtacggcg tgtgtaccaa   2040
gcagcggccc atctttatca tcaccgagta catggccaac ggctgcctgc tgaactacct   2100
gcgcgaaatg cggcaccggt tcagacaca gcaactgctg gaaatgtgca aggacgtgtg    2160
cgaggccatg gaatacctgg aaagcaagca gttcctgcac cgcgatctgg ccgcagaaa    2220 ctgcctggtc aatgatcagg gcgttgtgaa ggtgtccgac ttcggcctga gcagatacgt   2280
gctggacgat gagtacacca gcagcgtggg cagcaagttt cccgtcagat ggtccccacc   2340
tgaggtgctg atgtactcca gttcagctc caagagcgac atctgggcct cggcgttct    2400 gatgtgggag atctacagcc tgggcaagat gccctacgag agattcacca acagcgagac   2460
agccgagcac attgcccagg gcctgagact gtatagacct cacctggcct ccgagaaggt   2520
gtacacaatc atgtacagct gttggcacga gaaggccgac gagcggccta ccttt aagat  2580
```

```
cctgctgagc aacatcctgg acgtgatgga cgaggaatcc ggtggaggcg gtggagggta    2640
cccatacgat gttccagatt acgcttatcc gtacgacgtc ccggattacg cttatcccta    2700
tgacgtgcct gattatgctt gagctcgcca ataagcttct tggttctact tctcttctcc    2760
acaagcccca atttcacttt ctcagaggaa atcccaagct taggagccct ggagcctttg    2820
tgctcccact caatacaaaa aggcccctct ctacatctgg gaatgcacct cttctttgat    2880
tccctgggat agtggcttct gagcaaaggc caagaaatta ttgtgcctga aatttcccga    2940
gagaattaag acagactgaa tttgcgatga aaatattttt taggagggag gatgtaaata    3000
gccgcacaaa ggggtccaac agctctttga gtaggcattt ggtagagctt gggggtgtgt    3060 gtgtggggt ggaccgaatt tggcaagaat gaaatggtgt cataaagatg ggaggggagg    3120
gtgttttgat aaaataaaat tactagaaag cattagatct gtgtgttggt ttttgtgtg    3180 tggactgtaa aatatgtct ccagggccag tgtctgctgc gatcgagtcc caccttccaa    3240
gtcctggcat ctcaatgcat ctgggaagct acctgcatta agtcaggact gaggtgggtc    3300
tggggtatgg caggggctgg gcagcagcag caatgtacct tgcttgggac ccctaaaaac    3360
cagagagaca gcatggctgg tgccatttat cagctagtgg aggaggctga cggagggtgg    3420
gagtgtcatc agcacaaggc cctggcagtc ccttctggtg attagagagg ccgaaagggt    3480
cctttccgac aagggctgag ggtgggcgga acaggaagag aaaaatgtga catgaggtga    3540
ccatccgaac aggtagcaaa tgttagaaag gggtacctct ggcaaactta gtggaaaagt    3600
aatattgcag ggagcagtca gataaaaaca agcccttctg tcaaatagtg cttgaagact    3660
caatagggat acatgggtca                                               3680

<210> SEQ ID NO 3
<211> LENGTH: 20
<212> TYPE: DNA
<213> ORGANISM: Homo sapiens

<400> SEQUENCE: 3
agggatgagg attaatgtcc                                                 20

<210> SEQ ID NO 4
<211> LENGTH: 3600
<212> TYPE: DNA
<213> ORGANISM: Artificial
<220> FEATURE:
<223> OTHER INFORMATION: BTK Intron 1 Original HDR Donor Seq excluding
      backbone

<400> SEQUENCE: 4
cctccatatc cttattagtt cccttggtta cagaccccag tgggacaatg tttgaaaaat      60
tatattcacc gtctaggaaa ttgggaactg aaagtccaat atctgcctca gtggagttct    120
ggcacctgca ttatcccttc tgggtatatc aagatcaaca gctgcacaga tacttttgct    180
tttcacagat tctacacata tcatataaag gtgaatagta taaagctacc tctacacctt    240
accaagcaca caggtgcgtg ccatttaaca tctagagcat tccattgcct tatacaagaa    300
ctcagtttat atgagctcac aacatcgaac caatcccccc ccaattcagt gtgcatccat    360
tatacctgaa acctgacaga gctggggct gtgggaggag gttggtagga agaaattatt    420
ttgtgagctg tgcacatttt tgttccattt gaaactaggt agctaggctg aggggggaacc    480 aagagggatg aggattaatg tcctgggtcc tcaggaactt tcattatcaa cagcacacag    540
gtgaactcca gaaagaagaa gctatggccg ccgtgatcct ggaatccatc ttcctgaagc    600
```

```
ggagccagca gaagaagaaa acaagccctc tgaacttcaa gaagcggctg ttcctgctga     660
ccgtgcacaa gctgagctac tacgagtacg acttcgagcg gggcagaaga ggcagcaaga    720
aaggcagcat cgacgtggaa aagatcacct gtgtggaaac cgtggtgccc gagaagaacc    780
ctccacctga gagacagatc cccagaaggg gcgaagagtc cagcgagatg aacagatct     840
ctatcatcga gcggttcccg tatcctttcc aagtggtgta cgacgagggc ccactgtacg    900
tgttcagccc taccgaggaa ctgcggaaga gatggatcca ccagctgaag aacgtgatcc    960
ggtacaacag cgacctggtg cagaagtatc acccctgctt ttggatcgac ggccagtacc   1020
tgtgctgtag ccagaccgcc aagaatgcca tgggctgcca gattctggaa accggaacg    1080
gctctctgaa gcccggcagc agccacagaa agaccaagaa gcctctgcct cctacacctg   1140
aagaggacca gatcctgaag aaaccccgc ctccagaacc tgccgctgct cctgtgtcta    1200
ccagcgagct gaaaaaggtg gtggccctgt acgactacat gcccatgaac gccaacgacc   1260
tgcagctgag aaagggcgac gagtacttca tcctggaaga gtctaacctg ccttggtggc   1320
gggccagaga caagaatggc caagagggct acatccccag caactacgtg accgaggccg   1380
aggacagcat cgagatgtac gagtggtaca gcaagcacat gaccagaagc caggccgaac   1440
agctgctgaa gcaagagggc aaagaaggcg gcttcatcgt ccgggattct agcaaggccg   1500
gcaagtacac cgtgtccgtg ttcgccaaga gcaccggcga tcctcagggc gtgatcagac   1560
actacgtcgt gtgtagcacc cctcagagcc agtactacct ggccgagaag cacctgttca   1620
gcacaatccc cgagctgatc aactaccacc agcacaactc tgccggcctg atcagcagac   1680
tgaagtaccc tgtgtctcag cagaacaaaa acgcccctag cacagccggc ctcggctatg   1740
gatcttggga gatcgacccc aaggacctga ccttcctgaa agaactcggc accggccagt   1800
tcggcgtcgt gaagtatgga aaatggcggg gacagtacga cgtggccatc aagatgatca   1860
aagagggcag catgagcgag gacgagttca tcgaagaggc caaagtgatg atgaacctga   1920
gccacgagaa gctggtgcag ctgtacggcg tgtgtaccaa gcagcggccc atctttatca   1980
tcaccgagta catggccaac ggctgcctgc tgaactacct gcgcgaaatg cggcaccggt   2040
ttcagacaca gcaactgctg gaaatgtgca aggacgtgtg cgaggccatg gaatacctgg   2100
aaagcaagca gttcctgcac cgcgatctgg ccgccagaaa ctgcctggtc aatgatcagg   2160
gcgttgtgaa ggtgtccgac ttcggcctga gcagatacgt gctggacgat gagtacacca   2220
gcagcgtggg cagcaagttt cccgtcagat ggtccccacc tgaggtgctg atgtactcca   2280
agttcagctc caagagcgac atctgggcct tcggcgttct gatgtgggag atctacagcc   2340
tgggcaagat gccctacgag agattcacca acagcgagac agccgagcac attgcccagg   2400
gcctgagact gtatagacct cacctggcct ccgagaaggt gtacacaatc atgtacagct   2460
gttggcacga gaaggccgac gagcggccta cctttaagat cctgctgagc aacatcctgg   2520
acgtgatgga cgaggaatcc ggtggaggcg gtgagggta cccatacgat gttccagatt   2580
acgcttatcc gtacgacgtc ccggattacg cttatcccta tgacgtgcct gattatgctt   2640
gagctcgcca ataagcttct tggttctact tctcttctcc acaagcccca atttcacttt   2700
ctcagaggaa atcccaagct taggagccct ggagcctttg tgctcccact caatacaaaa   2760
aggcccctct ctacatctgg gaatgcacct cttctttgat tccctgggat agtggcttct   2820
gagcaaaggc caagaaatta ttgtgcctga aatttcccga gagaattaag acagactgaa   2880
tttgcgatga aaatattttt taggagggag gatgtaaata gccgcacaaa ggggtccaac   2940
```

| | | |
|---|---|---|
| agctctttga gtaggcattt ggtagagctt gggggtgtgt gtgtgggggt ggaccgaatt | 3000 |
| tggcaagaat gaaatggtgt cataaagatg ggaggggagg gtgttttgat aaaataaaat | 3060 |
| tactagaaag cattagatct gtgtgttggt ttttgtgtg tcctgggtcc tcaggaactt | 3120 |
| tcattatcaa cagcacacag gtgaactcca gaaagaagaa gctatggccg cagtgattct | 3180 |
| ggagagcatc tttctgaagc gatcccaaca gaaaaagaaa acatcacctc taaacttcaa | 3240 |
| gaagcgcctg tttctcttga ccgtgcacaa actctcctac tatgagtatg actttgaacg | 3300 |
| tggggtaagt ttctcgacta tgaaaactga gtttcaagat atcaaggact ggccttaga | 3360 |
| tctttcttgg ggaagaggta aattttcgtt ggtaggagga ggggagtaga atggacctaa | 3420 |
| gttctttcaa attcagcaaa atatttccta gcctataact agctaaagcc ggaaagtcaa | 3480 |
| aggtcctaag aagccacaag gaaaatatta ccatggaatc ttggaattga tgagcactca | 3540 |
| ttaaatgatt gttgaaaatg aaatcgaaga gttggaaatt gcttccttac ttcctatgag | 3600 |

<210> SEQ ID NO 5
<211> LENGTH: 3600
<212> TYPE: DNA
<213> ORGANISM: Artificial
<220> FEATURE:
<223> OTHER INFORMATION: BTK Intron 1 HDR PAM Mutated Donor Excluding
    backbone

<400> SEQUENCE: 5

| | | |
|---|---|---|
| cctccatatc cttattagtt cccttggtta cagaccccag tgggacaatg tttgaaaaat | 60 |
| tatattcacc gtctaggaaa ttgggaactg aaagtccaat atctgcctca gtggagttct | 120 |
| ggcacctgca ttatcccttc tgggtatatc aagatcaaca gctgcacaga acttttgct | 180 |
| tttcacagat tctacacata tcatataaag gtgaatagtg taaagctacc tctacacctt | 240 |
| accaagcaca caggtgcgtg ccatttaaca tctagagcat tccattgcct tatacaagaa | 300 |
| ctcagtttat atgagctcac aacatcgaac caatcccccc ccaattcagt gtgcatccat | 360 |
| tatacctgaa acctgacaga gctggggggct gtgggaggag gttggtagga agaaattatt | 420 |
| ttgtgagctg tgcacatttt tgttccattt gaaactaggt agctaggctg aggggaacc | 480 |
| aagagggatg aggattaatg tcctaagtcc tcaggaactt tcattatcaa cagcacacag | 540 |
| gtgaactcca gaaagaagaa gctatggccg ccgtgatcct ggaatccatc ttcctgaagc | 600 |
| ggagccagca gaagaagaaa acaagccctc tgaacttcaa gaagcggctg ttcctgctga | 660 |
| ccgtgcacaa gctgagctac tacgagtacg acttcgagcg gggcagaaga ggcagcaaga | 720 |
| aaggcagcat cgacgtggaa aagatcacct gtgtggaaac cgtggtgccc gagaagaacc | 780 |
| ctccacctga gagacagatc cccagaaggg gcgaagagtc cagcgagatg aacagatct | 840 |
| ctatcatcga gcggttcccg tatccttttcc aagtggtgta cgacgagggc ccactgtacg | 900 |
| tgttcagccc taccgaggaa ctgcggaaga gatggatcca ccagctgaag aacgtgatcc | 960 |
| ggtacaacag cgacctggtg cagaagtatc accctgctt ttggatcgac ggccagtacc | 1020 |
| tgtgctgtag ccagaccgcc aagaatgcca tgggctgcca gattctggaa accggaacg | 1080 |
| gctctctgaa gccggcagc agccacagaa agaccaagaa gcctctgcct cctacacctg | 1140 |
| aagaggacca gatcctgaag aaacccctgc ctccagaacc tgccgctgct cctgtgtcta | 1200 |
| ccagcgagct gaaaaaggtg gtggccctgt acgactacat gcccatgaac gccaacgacc | 1260 |
| tgcagctgag aaagggcgac gagtacttca tcctggaaga gtctaacctg ccttggtggc | 1320 |
| gggccagaga caagaatggc caagagggct acatccccag caactacgtg accgaggccg | 1380 |

```
aggacagcat cgagatgtac gagtggtaca gcaagcacat gaccagaagc caggccgaac    1440
agctgctgaa gcaagagggc aaagaaggcg gcttcatcgt ccgggattct agcaaggccg    1500
gcaagtacac cgtgtccgtg ttcgccaaga gcaccggcga tcctcagggc gtgatcagac    1560
actacgtcgt gtgtagcacc cctcagagcc agtactacct ggccgagaag cacctgttca    1620
gcacaatccc cgagctgatc aactaccacc agcacaactc tgccggcctg atcagcagac    1680
tgaagtaccc tgtgtctcag cagaacaaaa acgcccctag cacagccggc ctcggctatg    1740
gatcttggga gatcgacccc aaggacctga ccttcctgaa agaactcggc accggccagt    1800
tcggcgtcgt gaagtatgga aaatggcggg acagtacgac cgtggccatc aagatgatca    1860
aagagggcag catgagcgag gacgagttca tcgaagaggc caaagtgatg atgaacctga    1920
gccacgagaa gctggtgcag ctgtacggcg tgtgtaccaa gcagcggccc atctttatca    1980
tcaccgagta catggccaac ggctgcctgc tgaactacct gcgcgaaatg cggcaccggt    2040
ttcagacaca gcaactgctg gaaatgtgca aggacgtgtg cgaggccatg aatacctgg    2100 aaagcaagca gttcctgcac cgcgatctgg ccgccagaaa ctgcctggtc aatgatcagg    2160
gcgttgtgaa ggtgtccgac ttcggcctga gcagatacgt gctggacgat gagtacacca    2220
gcagcgtggg cagcaagttt cccgtcagat ggtcccacc tgaggtgctg atgtactcca    2280
agttcagctc caagagcgac atctgggcct tcggcgttct gatgtgggag atctacagcc    2340
tgggcaagat gccctacgag agattcacca acagcgagag agccgagcac attgcccagg    2400
gcctgagact gtatagacct cacctggcct ccgagaaggt gtacacaatc atgtacagct    2460
gttggcacga gaaggccgac gagcggccta ccttaagat cctgctgagc aacatcctgg    2520
acgtgatgga cgaggaatcc ggtggaggcg gtggagggta cccatacgat gttccagatt    2580
acgcttatcc gtacgacgtc ccggattacg cttatcccta tgacgtgcct gattatgctt    2640
gagctcgcca ataagcttct tggttctact tctcttctcc acaagcccca atttcacttt    2700
ctcagaggaa atcccaagct taggagccct ggagcctttg tgctcccact caatacaaaa    2760
aggcccctct ctacatctgg gaatgcacct cttctttgat tccctgggat agtggcttct    2820
gagcaaaggc caagaaatta ttgtgcctga aatttcccga gagaattaag acagactgaa    2880
tttgcgatga aaatatttt taggagggag gatgtaaata gccgcacaaa ggggtccaac    2940
agctctttga gtaggcattt ggtagagctt ggggtgtgt gtgtgggggt ggaccgaatt    3000
tggcaagaat gaaatggtgt cataaagatg ggaggggagg gtgttttgat aaaataaaat    3060
tactagaaag cattagatct gtgtgttggt tttttgtgtg tcctgggtcc tcaggaactt    3120
tcattatcaa cagcacacag gtgaactcca gaaagaagaa gctatggccg cagtgattct    3180
ggagagcatc tttctgaagc gatcccaaca gaaaaagaaa acatcacctc taaacttcaa    3240
gaagcgcctg tttctcttga ccgtgcacaa actctcctac tatgagtatg actttgaacg    3300
tggggtaagt ttctcgacta tgaaaactga gtttcaagat atcaaggact tggccttaga    3360
tctttcttgg ggaagaggta atttttcgtt ggtaggagga ggggagtaga atggacctaa    3420
gttctttcaa attcagcaaa atatttccta gcctataact agctaaagcc ggaaagtcaa    3480
aggtcctaag aagccacaag gaaaatatta ccatggaatc ttggaattga tgagcactca    3540
ttaaatgatt gttgaaaatg aaatcgaaga gttggaaatt gcttccttac ttcctatgag    3600
```

<210> SEQ ID NO 6
<211> LENGTH: 4339
<212> TYPE: DNA
<213> ORGANISM: Artificial

<220> FEATURE:
<223> OTHER INFORMATION: BTK Intron 1 Donor with WPRE Excluding backbone

<400> SEQUENCE: 6

```
cctccatatc cttattagtt cccttggtta cagaccccag tgggacaatg tttgaaaaat      60
tatattcacc gtctaggaaa ttgggaactg aaagtccaat atctgcctca gtggagttct     120
ggcacctgca ttatcccttc tgggtatatc aagatcaaca gctgcacaga tacttttgct     180
tttcacagat tctacacata tcatataaag gtgaatagtg taaagctacc tctacacctt     240
accaagcaca caggtgcgtg ccatttaaca tctagagcat tccattgcct tatacaagaa     300
ctcagtttat atgagctcac aacatcgaac caatccccccc ccaattcagt gtgcatccat    360
tatacctgaa acctgacaga gctggggct gtgggaggag gttggtagga agaaattatt      420
ttgtgagctg tgcacatttt tgttccattt gaaactaggt agctaggctg aggggaacc      480
aagagggatg aggattaatg tcctgggtcc tcaggaactt tcattatcaa cagcacacag     540
gtgaactcca gaaagaagaa gctatggccg ccgtgatcct ggaatccatc ttcctgaagc     600
ggagccagca gaagaagaaa acaagccctc tgaacttcaa gaagcggctg ttcctgctga    660
ccgtgcacaa gctgagctac tacgagtacg acttcgagcg gggcagaaga ggcagcaaga    720
aaggcagcat cgacgtggaa aagatcacct gtgtggaaac cgtggtgccc gagaagaacc    780
ctccacctga gagacagatc cccagaaggg gcgaagagtc cagcgagatg gaacagatct    840
ctatcatcga gcggttcccg tatccttttcc aagtggtgta cgacgagggc ccactgtacg   900
tgttcagccc taccgaggaa ctgcggaaga gatggatcca ccagctgaag aacgtgatcc    960
ggtacaacag cgacctggtg cagaagtatc accctgctt ttggatcgac ggccagtacc    1020
tgtgctgtag ccagaccgcc aagaatgcca tgggctgcca gattctggaa accggaacg    1080
gctctctgaa gcccggcagc agccacagaa agaccaagaa gcctctgcct cctacacctg    1140
aagaggacca gatcctgaag aaaccccctgc ctccagaacc tgccgctgct cctgtgtcta   1200
ccagcgagct gaaaaaggtg gtggcccctgt acgactacat gcccatgaac gccaacgacc   1260
tgcagctgag aaagggcgac gagtacttca tcctggaaga gtctaacctg ccttggtggc    1320
gggccagaga caagaatggc caagagggct acatcccccag caactacgtg accgaggccg   1380
aggacagcat cgagatgtac gagtggtaca gcaagcacat gaccagaagc caggccgaac    1440
agctgctgaa gcaagagggc aaagaaggcg gcttcatcgt ccgggattct agcaaggccg    1500
gcaagtacac cgtgtccgtg ttcgccaaga gcaccggcga tcctcagggc gtgatcagac    1560
actacgtcgt gtgtagcacc cctcagagcc agtactacct ggccgagaag cacctgttca    1620
gcacaatccc cgagctgatc aactaccacc agcacaactc tgccggcctg atcagcagac    1680
tgaagtaccc tgtgtctcag cagaacaaaa acgcccctag cacagccggc ctcggctatg    1740
gatcttggga gatcgacccc aaggacctga ccttcctgaa agaactcggc accggccagt    1800
tcggcgtcgt gaagtatgga aaatggcggg acagtacga cgtggccatc aagatgatca    1860
aagagggcag catgagcgag gacgagttca tcgaagaggc caaagtgatg atgaacctga    1920
gccacgagaa gctggtgcag ctgtacggcg tgtgtaccaa gcagcggccc atctttatca    1980
tcaccgagta catggccaac ggctgcctgc tgaactacct cgcgaaatg cggcaccggt    2040
ttcagacaca gcaactgctg gaaatgtgca aggacgtgtg cgaggccatg gaatacctgg    2100
aaagcaagca gttcctgcac cgcgatctgg ccgccagaaa ctgcctggtc aatgatcagg   2160
gcgttgtgaa ggtgtccgac ttcggcctga gcagatacgt gctggacgat gagtacacca   2220
```

```
gcagcgtggg cagcaagttt cccgtcagat ggtccccacc tgaggtgctg atgtactcca    2280
agttcagctc caagagcgac atctgggcct tcggcgttct gatgtgggag atctacagcc    2340
tgggcaagat gccctacgag agattcacca acagcgagac agccgagcac attgcccagg    2400
gcctgagact gtatagacct cacctggcct ccgagaaggt gtacacaatc atgtacagct    2460
gttggcacga aaggccgac gagcggccta cctttaagat cctgctgagc aacatcctgg    2520
acgtgatgga cgaggaatcc ggtggaggcg gtggagggta cccatacgat gttccagatt    2580
acgcttatcc gtacgacgtc ccggattacg cttatcccta tgacgtgcct gattatgctt    2640
gagctcgcca ataagcttct tggttctact tctcttctcc acaagcccca atttcacttt    2700
ctcagaggaa atcccaagct taggagccct ggagcctttg tgctcccact caatacaaaa    2760
aggcccctct ctacatctgg gaatgcacct cttctttgat tccctgggat agtggcttct    2820
gagcaaaggc caagaaatta ttgtgcctga aatttcccga gagaattaag acagactgaa    2880
tttgcgatga aaatatttt taggaggag atgtaaata gccgcacaaa ggggtccaac    2940
agctctttga gtaggcattt ggtagagctt gggggtgtgt gtgtgggggt ggaccgaatt    3000
tggcaagaat gaaatggtgt cataaagatg ggaggggagg gtggcctact cgaccacgag    3060
ggaattccga taatcaacct ctggattaca aaatttgtga aagattgact ggtattctta    3120
actatgttgc tccttttacg ctatgtggat acgctgcttt aatgcctttg tatcatgcta    3180
ttgcttcccg tatggctttc attttctcct ccttgtataa atcctggttg ctgtctcttt    3240
atgaggagtt gtggcccgtt gtcaggcaac gtggcgtggt gtgcactgtg tttgctgacg    3300 caaccccccac tggttggggc attgccacca cctgtcagct cctttccggg actttcgctt    3360 tcccctccc tattgccacg gcggaactca tcgccgcctg ccttgcccgc tgctggacag    3420
gggctcggct gttgggcact gacaattccg tggtgttgtc ggggaaatca tcgtcctttc    3480
cttggctgct cgcctgtgtt gccacctgga ttctgcgcgg gacgtccttc tgctacgtcc    3540
cttcggcccc caatccagcg gaccttcctt cccgcggcct gctgccggct ctgcggcctc    3600
ttccgcgtct tcgccttcgc cctcagacga gtcggatctc cctttgggcc gcctccccgc    3660
atcgataccg tcgacctcga gacctagaaa aacatggcca attcgagctc ggtaccttta    3720
agaccaatga cttacaaggc agctgtagat cttagccact ttttaaaaga aaggggggga    3780
cgttttgata aataaaaatt actagaaagc attagatctg tgtgttggtt ttttgtgtgt    3840
cctgggtcct caggaacttt cattatcaac agcacacagg tgaactccag aaagaagaag    3900
ctatggccgc agtgattctg gagagcatct ttctgaagcg atcccaacag aaaaagaaaa    3960
catcacctct aaacttcaag aagcgcctgt ttctcttgac cgtgcacaaa ctctcctact    4020
atgagtatga ctttgaacgt ggggtaagtt tctcgactat gaaaactgag tttcaagata    4080
tcaaggactt ggccttagat cttttcttgg gaagaggtaa attttcgttg gtaggaggag    4140
gggagtagaa tggacctaag ttctttcaaa ttcagcaaaa tatttcctag cctataacta    4200
gctaaagccg gaaagtcaaa ggtcctaaga agccacaagg aaaatattac catggaatct    4260
tggaattgat gagcactcat taaatgattg ttgaaaatga aatcgaagag ttggaaattg    4320
cttccttact tcctatgag                                                 4339

<210> SEQ ID NO 7
<211> LENGTH: 4279
<212> TYPE: DNA
<213> ORGANISM: Artificial
<220> FEATURE:
<223> OTHER INFORMATION: BTK Intron 1 Donor with Intron 18 truncated
``` excluding backbone

<400> SEQUENCE: 7

```
cctccatatc cttattagtt cccttggtta cagaccccag tgggacaatg tttgaaaaat    60
tatattcacc gtctaggaaa ttgggaactg aaagtccaat atctgcctca gtggagttct   120
ggcacctgca ttatcccttc tgggtatatc aagatcaaca gctgcacaga tacttttgct   180
tttcacagat tctacacata tcatataaag gtgaatagtg taaagctacc tctacacctt   240
accaagcaca caggtgcgtg ccatttaaca tctagagcat tccattgcct tatacaagaa   300
ctcagtttat atgagctcac aacatcgaac caatccccc ccaattcagt gtgcatccat     360
tatacctgaa acctgacaga gctgggggct gtgggaggag gttggtagga agaaattatt   420
ttgtgagctg tgcacatttt tgttccattt gaaactaggt agctaggctg aggggggaacc  480
aagagggatg aggattaatg tcctgggtcc tcaggaactt tcattatcaa cagcacacag   540
gtgaactcca gaaagaagaa gctatggccg ccgtgatcct ggaatccatc ttcctgaagc   600
ggagccagca gaagaagaaa acaagccctc tgaacttcaa gaagcggctg ttcctgctga   660
ccgtgcacaa gctgagctac tacgagtacg acttcgagcg gggcagaaga ggcagcaaga   720
aaggcagcat cgacgtggaa aagatcacct gtgtggaaac cgtggtgccc gagaagaacc   780
ctccacctga gagacagatc cccagaaggg gcgaagagtc cagcgagatg aacagatct    840
ctatcatcga gcggttcccg tatcctttcc aagtggtgta cgacgagggc ccactgtacg   900
tgttcagccc taccgaggaa ctgcggaaga gatggatcca ccagctgaag aacgtgatcc   960
ggtacaacag cgacctggtg cagaagtatc ccccctgctt tggatcgac ggccagtacc   1020
tgtgctgtag ccagaccgcc aagaatgcca tgggctgcca gattctggaa accggaacg    1080
gctctctgaa gccggcagc agccacagaa agaccaagaa gcctctgcct cctacacctg    1140
aagaggacca gatcctgaag aaacccctgc ctccagaacc tgccgctgct cctgtgtcta   1200
ccagcgagct gaaaaaggtg gtggcccctgt acgactacat gcccatgaac gccaacgacc   1260
tgcagctgag aaagggcgac gagtacttca tcctggaaga gtctaacctg ccttggtggc   1320
gggccagaga caagaatggc caagagggct acatccccag caactacgtg accgaggccg   1380
aggacagcat cgagatgtac gagtggtaca gcaagcacat gaccagaagc caggccgaac   1440
agctgctgaa gcaagagggc aaagaaggcg gcttcatcgt ccgggattct agcaaggccg   1500
gcaagtacac cgtgtccgtg ttcgccaaga gcaccggcga tctcagggc gtgatcagac    1560
actacgtcgt gtgtagcacc cctcagagcc agtactacct ggccgagaag cacctgttca   1620
gcacaatccc cgagctgatc aactaccacc agcacaactc tgccggcctg atcagcagac   1680
tgaagtaccc tgtgtctcag cagaacaaaa acgcccctag cacagccggc ctcggctatg   1740
gatcttggga gatcgacccc aaggacctga ccttcctgaa agaactcggc accggccagt   1800
tcggcgtcgt gaagtatgga aaatggcggg gacagtacga cgtggccatc aagatgatca   1860
agagggcag catgagcgag gacgagttca tcgaagaggc aaagtgatg atgaacctga    1920
gccacgagaa gctggtgcag ctgtacggcg tgtgtaccaa gcagcggccc atctttatca   1980
tcaccgagta catggccaac ggctgcctgc tgaactacct gcgcgaaatg cggcaccggt   2040
ttcagacaca gcaactgctg gaaatgtgca aggacgtgtg cgaggccatg gaatacctgg   2100
aaagcaagca gttcctgcac cgcgatctgg ccgccagaaa ctgcctggtc aatgatcagg   2160
gcgttgtgaa ggtgtccgac ttcggcctga gcagatacgt gctggacgat gagtacacca   2220
gcagcgtggg cagcaagttt cccgtcagat ggtccccacc tgaggtgctg atgtactcca   2280
```

```
agttcagctc caagagcgac atctgggcct tcggcgttct gatgtgggag atctacagcc    2340
tgggcaagat gccctacgag agattcacca acagcgagac agccgagcac attgcccagg    2400
gcctgagact gtatagacct cacctggcct ccgagaaggt gtacacaatc atgtacagct    2460
gttggcacga ggtaagtgct ttattaggat ctcttaaatt atttccttga atctacttgc    2520
ccatttagct ggccattcag ccaccaaaga ctgatagctg cacacattct tttttttcct    2580
tttttttttt tttaatttg agacaaggtc tcgctctttc acccaggttg gagtacagtg    2640
gcgcgatctt ggcttactgc aaccttcgcc tcccagattc aagcgattct catgtctcag    2700
cctcccaagt agctgggatt ataggcgtgc accaccacac caagctaatt tttttttttt    2760
tttttggtga cacagtcttg ctctgtcacc cgttctgcca accacttgaa cttgtttggt    2820
agccattttt cacttgagga tccaaaataa gaatgtgttg tatacagtta cataatgaac    2880
ttgccctcaa ttttgatcag tgtgattgtc agtttaattt gcaaattgtt cttatcacac    2940
taataacctg agttactaaa gatgaaaagt gcacaaagac tttatggaga gctgctattt    3000
cttttttttt ttttttttcct tttgtaatcg acagggcatg ctactgggca tagagcatat    3060
atttaataaa catttgctgc ttactcattg catttccctt gaattctgga ttctagccac    3120
tctaacactt tacttttct ttggttttag aaggccgacg agcggcctac ctttaagatc    3180
ctgctgagca acatcctgga cgtgatggac gaggaatccg gtggaggcgg tggagggtac    3240
ccatacgatg ttccagatta cgcttatccg tacgacgtcc cggattacgc ttatccctat    3300
gacgtgcctg attatgcttg agctcgccaa taagcttctt ggttctactt ctcttctcca    3360
caagccccaa tttcactttc tcagaggaaa tcccaagctt aggagccctg gagcctttgt    3420
gctcccactc aatacaaaaa ggcccctctc tacatctggg aatgcacctc ttctttgatt    3480
ccctgggata gtggcttctg agcaaaggcc aagaaattat tgtgcctgaa atttcccgag    3540
agaattaaga cagactgaat ttgcgatgaa aatattttt aggagggagg atgtaaatag    3600
ccgcacaaag gggtccaaca gctctttgag taggcatttg gtagagcttg ggggtgtgtg    3660
tgtgggggtg gaccgaattt ggcaagaatg aaatggtgtc ataaagatgg gaggggaggg    3720
tgttttgata aaataaaatt actagaaagc attagatctg tgtgttggtt ttttgtgtgt    3780
cctgggtcct caggaacttt cattatcaac agcacacagg tgaactccag aaagaagaag    3840
ctatggccgc agtgattctg gagagcatct ttctgaagcg atcccaacag aaaaagaaaa    3900
catcacctct aaacttcaag aagcgcctgt ttctcttgac cgtgcacaaa ctctcctact    3960
atgagtatga ctttgaacgt ggggtaagtt tctcgactat gaaaactgag tttcaagata    4020
tcaaggactt ggccttagat cttttcttggg gaagaggtaa attttcgttg gtaggaggag    4080
gggagtagaa tggacctaag ttcttttcaaa ttcagcaaaa tatttcctag cctataacta    4140
gctaaagccg gaaagtcaaa ggtcctaaga agccacaagg aaaatattac catggaatct    4200
tggaattgat gagcactcat taaatgattg ttgaaaatga aatcgaagag ttggaaattg    4260
cttccttact tcctatgag                                                 4279
```

<210> SEQ ID NO 8
<211> LENGTH: 20
<212> TYPE: DNA
<213> ORGANISM: Homo sapiens

<400> SEQUENCE: 8

```
tgcacaaact ctcctactat                                                  20
```

<210> SEQ ID NO 9
<211> LENGTH: 3443
<212> TYPE: DNA
<213> ORGANISM: Homo sapiens

<400> SEQUENCE: 9

| | | | | | | |
|---|---|---|---|---|---|---|
| acagatactt | ttgcttttca | cagattctac | acatatcata | taaaggtgaa | tagtgtaaag | 60 |
| ctacctctac | accttaccaa | gcacacaggt | gcgtgccatt | taacatctag | agcattccat | 120 |
| tgccttatac | aagaactcag | tttatatgag | ctcacaacat | cgaaccaatc | cccccccaat | 180 |
| tcagtgtgca | tccattatac | ctgaaacctg | acagagctgg | gggctgtggg | aggaggttgg | 240 |
| taggaagaaa | ttattttgtg | agctgtgcac | attttttgttc | catttgaaac | taggtagcta | 300 |
| ggctgagggg | gaaccaagag | ggatgaggat | taatgtcctg | ggtcctcagg | aactttcatt | 360 |
| atcaacagca | cacaggtgaa | ctccagaaag | aagaagctat | ggccgcagtg | attctggaga | 420 |
| gcatctttct | gaagcgatcc | caacagaaaa | agaaaacatc | acctctaaac | ttcaagaagc | 480 |
| gcctgttttct | cttgaccgtg | cacaagctga | gctactacga | gtacgacttc | gagcggggca | 540 |
| gaagaggcag | caagaaaggc | agcatcgacg | tggaaaagat | cacctgtgtg | gaaaccgtgg | 600 |
| tgcccgagaa | gaaccctcca | cctgagagac | agatccccag | aaggggcgaa | gagtccagcg | 660 |
| agatggaaca | gatctctatc | atcgagcggt | tcccgtatcc | tttccaagtg | gtgtacgacg | 720 |
| agggcccact | gtacgtgttc | agccctaccg | aggaactgcg | gaagagatgg | atccaccagc | 780 |
| tgaagaacgt | gatccggtac | aacagcgacc | tggtgcagaa | gtatcacccc | tgcttttgga | 840 |
| tcgacggcca | gtacctgtgc | gtagccaga | ccgccaagaa | tgccatgggc | tgccagattc | 900 |
| tggaaaaccg | gaacggctct | ctgaagcccg | gcagcagcca | cagaaagacc | aagaagcctc | 960 |
| tgcctcctac | acctgaagag | gaccagatcc | tgaagaaacc | cctgcctcca | gaacctgccg | 1020 |
| ctgctcctgt | gtctaccagc | gagctgaaaa | aggtggtggc | cctgtacgac | tacatgccca | 1080 |
| tgaacgccaa | cgacctgcag | ctgagaaagg | gcgacgagta | cttcatcctg | gaagagtcta | 1140 |
| acctgccttg | gtggcgggcc | agagacaaga | atggccaaga | gggctacatc | cccagcaact | 1200 |
| acgtgaccga | ggccgaggac | agcatcgaga | tgtacgagtg | gtacagcaag | cacatgacca | 1260 |
| gaagccaggc | cgaacagctg | ctgaagcaag | agggcaaaga | aggcggcttc | atcgtccggg | 1320 |
| attctagcaa | ggccggcaag | tacaccgtgt | ccgtgttcgc | caagagcacc | ggcgatcctc | 1380 |
| agggcgtgat | cagacactac | gtcgtgtgta | gcacccctca | gagccagtac | tacctggccg | 1440 |
| agaagcacct | gttcagcaca | atccccgagc | tgatcaacta | ccaccagcac | aactctgccg | 1500 |
| gcctgatcag | cagactgaag | taccctgtgt | ctcagcagaa | caaaaacgcc | cctagcacag | 1560 |
| ccggcctcgg | ctatggatct | tgggagatcg | accccaagga | cctgaccttc | ctgaaagaac | 1620 |
| tcggcaccgg | ccagttcggc | gtcgtgaagt | atggaaaatg | gcggggacag | tacgacgtgg | 1680 |
| ccatcaagat | gatcaaagag | ggcagcatga | gcgaggacga | gttcatcgaa | gaggccaaag | 1740 |
| tgatgatgaa | cctgagccac | gagaagctgg | tgcagctgta | cggcgtgtgt | accaagcagc | 1800 |
| ggcccatctt | tatcatcacc | gagtacatgg | ccaacggctg | cctgctgaac | tacctgcgcg | 1860 |
| aaatgcggca | ccggtttcag | acacagcaac | tgctggaaat | gtgcaaggac | gtgtgcgagg | 1920 |
| ccatggaata | cctggaaagc | aagcagttcc | tgcaccgcga | tctggccgcc | agaaactgcc | 1980 |
| tggtcaatga | tcagggcgtt | gtgaaggtgt | ccgacttcgg | cctgagcaga | tacgtgctgg | 2040 |
| acgatgagta | caccagcagc | gtgggcagca | agtttcccgt | cagatggtcc | ccacctgagg | 2100 |
| tgctgatgta | ctccaagttc | agctccaaga | gcgacatctg | ggccttcggc | gttctgatgt | 2160 |

-continued

```
gggagatcta cagcctgggc aagatgccct acgagagatt caccaacagc gagacagccg    2220
agcacattgc ccagggcctg agactgtata gacctcacct ggcctccgag aaggtgtaca    2280
caatcatgta cagctgttgg cacgagaagg ccgacgagcg gcctaccttt aagatcctgc    2340
tgagcaacat cctggacgtg atggacgagg aatccgccgc tgtgtacccc tacgatgtgc    2400
ctgattacgc cggctatcct tacgacgtgc cagactatgc cggcagctac ccctatgacg    2460
tccccgatta tgcccctgcc gcttaagctc gccaataagc ttcttggttc tacttctctt    2520
ctccacaagc cccaatttca ctttctcaga ggaaatccca agcttaggag ccctggagcc    2580
tttgtgctcc cactcaatac aaaaaggccc ctctctacat ctgggaatgc acctcttctt    2640
tgattccctg ggatagtggc ttctgagcaa aggccaagaa attattgtgc ctgaaatttc    2700
ccgagagaat taagacagac tgaatttgcg atgaaaatat ttttaggag ggaggatgta     2760 aatagccgca caaggggtc caacagctct ttgagtaggc atttggtaga gcttgggggt    2820
gtgtgtgtgg gggtggaccg aatttggcaa gaatgaaatg gtgtcataaa gatgggaggg    2880
gagggtgttt tgataaaata aaattactag aaagcattag atctgtgtgt tggttttttg    2940
tgtgacaaac tctcctacta tgagtatgac tttgaacgtg gggtaagttt ctcgactatg    3000
aaaactgagt ttcaagatat caaggacttg gccttagatc tttcttgggg aagaggtaaa    3060
ttttcgttgg taggaggagg ggagtagaat ggacctaagt tctttcaaat tcagcaaaat    3120
atttcctagc ctataactag ctaaagccgg aaagtcaaag gtcctaagaa gccacaagga    3180
aaatattacc atggaatctt ggaattgatg agcactcatt aaatgattgt tgaaaatgaa    3240
atcgaagagt tggaaattgc ttccttactt cctatgagga aggtacatac agtcattcac    3300
tcttccatgg tatttgccct ccatttggta gtcatagatt tatagatctg gaaggatttt    3360 ttttcttcc cccacatgac aggtcctggt gccacctcac tttgttgaat gattagataa     3420
caaaatctaa tcatctggtt gct                                            3443
```

```
<210> SEQ ID NO 10
<211> LENGTH: 5
<212> TYPE: DNA
<213> ORGANISM: S. thermophilius
<220> FEATURE:
<221> NAME/KEY: misc_feature
<222> LOCATION: (1)..(1)
<223> OTHER INFORMATION: n is a, c, g, or t
<220> FEATURE:
<221> NAME/KEY: misc_feature
<222> LOCATION: (4)..(4)
<223> OTHER INFORMATION: n is a, c, g, or t

<400> SEQUENCE: 10 nggng                                                                   5

<210> SEQ ID NO 11
<211> LENGTH: 6
<212> TYPE: DNA
<213> ORGANISM: S. thermophilius
<220> FEATURE:
<221> NAME/KEY: misc_feature
<222> LOCATION: (1)..(2)
<223> OTHER INFORMATION: n is a, c, g, or t

<400> SEQUENCE: 11 nnaaaw                                                                  6

<210> SEQ ID NO 12
```

```
<211> LENGTH: 6
<212> TYPE: DNA
<213> ORGANISM: S. thermophilius
<220> FEATURE:
<221> NAME/KEY: misc_feature
<222> LOCATION: (1)..(2)
<223> OTHER INFORMATION: n is a, c, g, or t

<400> SEQUENCE: 12 nnagaa                                                                      6

<210> SEQ ID NO 13
<211> LENGTH: 7
<212> TYPE: DNA
<213> ORGANISM: S. thermophilius
<220> FEATURE:
<221> NAME/KEY: misc_feature
<222> LOCATION: (1)..(3)
<223> OTHER INFORMATION: n is a, c, g, or t

<400> SEQUENCE: 13 nnngatt                                                                     7

<210> SEQ ID NO 14
<211> LENGTH: 7
<212> TYPE: DNA
<213> ORGANISM: C. jejuni
<220> FEATURE:
<221> NAME/KEY: misc_feature
<222> LOCATION: (1)..(4)
<223> OTHER INFORMATION: n is a, c, g, or t

<400> SEQUENCE: 14 nnnnaca                                                                     7

<210> SEQ ID NO 15
<211> LENGTH: 8
<212> TYPE: DNA
<213> ORGANISM: N. meningitides
<220> FEATURE:
<221> NAME/KEY: misc_feature
<222> LOCATION: (1)..(4)
<223> OTHER INFORMATION: n is a, c, g, or t

<400> SEQUENCE: 15 nnnngatt                                                                    8

<210> SEQ ID NO 16
<211> LENGTH: 8
<212> TYPE: DNA
<213> ORGANISM: P. multocida
<220> FEATURE:
<221> NAME/KEY: misc_feature
<222> LOCATION: (2)..(4)
<223> OTHER INFORMATION: n is a, c, g, or t
<220> FEATURE:
<221> NAME/KEY: misc_feature
<222> LOCATION: (6)..(7)
<223> OTHER INFORMATION: n is a, c, g, or t

<400> SEQUENCE: 16 gnnncnna                                                                    8

<210> SEQ ID NO 17
<211> LENGTH: 22
<212> TYPE: DNA
<213> ORGANISM: Artificial
<220> FEATURE:
<223> OTHER INFORMATION: Suitable target sequence for use with a S.
```

```
            pyogenes CRISPR/Cas system
<220> FEATURE:
<221> NAME/KEY: misc_feature
<222> LOCATION: (1)..(1)
<223> OTHER INFORMATION: n is present or absent
<220> FEATURE:
<221> NAME/KEY: misc_feature
<222> LOCATION: (2)..(2)
<223> OTHER INFORMATION: n is present or absent
<220> FEATURE:
<221> NAME/KEY: misc_feature
<222> LOCATION: (3)..(3)
<223> OTHER INFORMATION: n is present or absent
<220> FEATURE:
<221> NAME/KEY: misc_feature
<222> LOCATION: (4)..(20)
<223> OTHER INFORMATION: n is a, c, g, or t

<400> SEQUENCE: 17
nnnnnnnnnn nnnnnnnnnn rg                                         22

<210> SEQ ID NO 18
<211> LENGTH: 23
<212> TYPE: DNA
<213> ORGANISM: Artificial
<220> FEATURE:
<223> OTHER INFORMATION: Suitable target sequence for use with a S.
      pyogenes CRISPR/Cas system
<220> FEATURE:
<221> NAME/KEY: misc_feature
<222> LOCATION: (2)..(2)
<223> OTHER INFORMATION: n is present or absent
<220> FEATURE:
<221> NAME/KEY: misc_feature
<222> LOCATION: (3)..(3)
<223> OTHER INFORMATION: n is present or absent
<220> FEATURE:
<221> NAME/KEY: misc_feature
<222> LOCATION: (4)..(4)
<223> OTHER INFORMATION: n is present or absent
<220> FEATURE:
<221> NAME/KEY: misc_feature
<222> LOCATION: (5)..(21)
<223> OTHER INFORMATION: n is a, c, g, or t

<400> SEQUENCE: 18
gnnnnnnnnn nnnnnnnnnn nrg                                        23

<210> SEQ ID NO 19
<211> LENGTH: 19
<212> TYPE: RNA
<213> ORGANISM: Artificial
<220> FEATURE:
<223> OTHER INFORMATION: CRISPR/Cas guide RNA

<400> SEQUENCE: 19
aauuucuacu guuguagau                                             19

<210> SEQ ID NO 20
<211> LENGTH: 19
<212> TYPE: RNA
<213> ORGANISM: Artificial
<220> FEATURE:
<223> OTHER INFORMATION: CRISPR/Cas guide RNA

<400> SEQUENCE: 20
aauuucugcu guugcagau                                             19

<210> SEQ ID NO 21
<211> LENGTH: 19
<212> TYPE: RNA
```

```
<213> ORGANISM: Artificial
<220> FEATURE:
<223> OTHER INFORMATION: CRISPR/Cas guide RNA

<400> SEQUENCE: 21
aauuuccacu guuguggau                                                    19

<210> SEQ ID NO 22
<211> LENGTH: 19
<212> TYPE: RNA
<213> ORGANISM: Artificial
<220> FEATURE:
<223> OTHER INFORMATION: CRISPR/Cas guide RNA

<400> SEQUENCE: 22
aauuccuacu guuguaggu                                                    19

<210> SEQ ID NO 23
<211> LENGTH: 19
<212> TYPE: RNA
<213> ORGANISM: Artificial
<220> FEATURE:
<223> OTHER INFORMATION: CRISPR/Cas guide RNA

<400> SEQUENCE: 23
aauuucuacu auuguagau                                                    19

<210> SEQ ID NO 24
<211> LENGTH: 19
<212> TYPE: RNA
<213> ORGANISM: Artificial
<220> FEATURE:
<223> OTHER INFORMATION: CRISPR/Cas guide RNA

<400> SEQUENCE: 24
aauuucuacu gcuguagau                                                    19

<210> SEQ ID NO 25
<211> LENGTH: 18
<212> TYPE: RNA
<213> ORGANISM: Artificial
<220> FEATURE:
<223> OTHER INFORMATION: CRISPR/Cas guide RNA

<400> SEQUENCE: 25
aauuucuacu uuguagau                                                     18

<210> SEQ ID NO 26
<211> LENGTH: 17
<212> TYPE: RNA
<213> ORGANISM: Artificial
<220> FEATURE:
<223> OTHER INFORMATION: CRISPR/Cas guide RNA

<400> SEQUENCE: 26
aauuucuacu uguagau                                                      17

<210> SEQ ID NO 27
<211> LENGTH: 7
<212> TYPE: PRT
<213> ORGANISM: Artificial
<220> FEATURE:
<223> OTHER INFORMATION: Nuclear localization signal

<400> SEQUENCE: 27

Pro Lys Lys Lys Arg Lys Val
```

```
1               5

<210> SEQ ID NO 28
<211> LENGTH: 7
<212> TYPE: PRT
<213> ORGANISM: Artificial
<220> FEATURE:
<223> OTHER INFORMATION: Nuclear localization signal

<400> SEQUENCE: 28

Pro Lys Lys Lys Arg Arg Val
1               5

<210> SEQ ID NO 29
<211> LENGTH: 16
<212> TYPE: PRT
<213> ORGANISM: Artificial
<220> FEATURE:
<223> OTHER INFORMATION: Nuclear localization signal

<400> SEQUENCE: 29

Lys Arg Pro Ala Ala Thr Lys Lys Ala Gly Gln Ala Lys Lys Lys Lys
1               5                   10                  15

<210> SEQ ID NO 30
<211> LENGTH: 20
<212> TYPE: PRT
<213> ORGANISM: Artificial
<220> FEATURE:
<223> OTHER INFORMATION: Cell-penetrating peptide sequence

<400> SEQUENCE: 30

Gly Arg Lys Lys Arg Arg Gln Arg Arg Pro Pro Gln Pro Lys Lys
1               5                   10                  15

Lys Arg Lys Val
            20

<210> SEQ ID NO 31
<211> LENGTH: 19
<212> TYPE: PRT
<213> ORGANISM: Artificial
<220> FEATURE:
<223> OTHER INFORMATION: Cell-penetrating peptide sequence

<400> SEQUENCE: 31

Pro Leu Ser Ser Ile Phe Ser Arg Ile Gly Asp Pro Pro Lys Lys Lys
1               5                   10                  15

Arg Lys Val

<210> SEQ ID NO 32
<211> LENGTH: 24
<212> TYPE: PRT
<213> ORGANISM: Artificial
<220> FEATURE:
<223> OTHER INFORMATION: Cell-penetrating peptide sequence

<400> SEQUENCE: 32

Gly Ala Leu Phe Leu Gly Trp Leu Gly Ala Ala Gly Ser Thr Met Gly
1               5                   10                  15

Ala Pro Lys Lys Lys Arg Lys Val
            20

<210> SEQ ID NO 33
<211> LENGTH: 27
<212> TYPE: PRT
```

```
<213> ORGANISM: Artificial
<220> FEATURE:
<223> OTHER INFORMATION: Cell-penetrating peptide sequence

<400> SEQUENCE: 33

Gly Ala Leu Phe Leu Gly Phe Leu Gly Ala Ala Gly Ser Thr Met Gly
1               5                   10                  15

Ala Trp Ser Gln Pro Lys Lys Lys Arg Lys Val
            20                  25

<210> SEQ ID NO 34
<211> LENGTH: 21
<212> TYPE: PRT
<213> ORGANISM: Artificial
<220> FEATURE:
<223> OTHER INFORMATION: Cell-penetrating peptide sequence

<400> SEQUENCE: 34

Lys Glu Thr Trp Trp Glu Thr Trp Trp Thr Glu Trp Ser Gln Pro Lys
1               5                   10                  15

Lys Lys Arg Lys Val
            20
```

GENE EDITING OF MONOGENIC DISORDERS IN HUMAN HEMATOPOIETIC STEM CELLS—CORRECTION OF X-LINKED AGAMMAGLOBULINEMIA (XLA)

CROSS-REFERENCE TO RELATED APPLICATIONS

This application is a U.S. 371 National Phase of PCT/US2019/034715, filed May 30, 2019, which claims priority to and benefit of U.S. Ser. No. 62/678,218, filed on May 30, 2018, and U.S. Ser. No. 62/760,448, filed on Nov. 13, 2018, all of which are incorporated herein by reference in their entirety for all purposes.

STATEMENT OF GOVERNMENTAL SUPPORT

[Not Applicable]

INCORPORATION BY REFERENCE OF SEQUENCE LISTING PROVIDED AS A TEXT FILE

This application contains references to nucleic acid sequences that have been submitted concurrently herewith as the sequence listing text file "UCLA-P201BUS_ST25.txt", file size 38,217 bytes, created on May 17, 2021, which is incorporated by reference in its entirety pursuant to 37 C.F.R. § 1.52(e)(5).

BACKGROUND

The primary immunodeficiency, X-linked agammaglobulinemia (XLA), has a need for a safe, permanent cure. Patients with XLA have loss of function mutations in Bruton's Tyrosine Kinase (BTK), a cytoplasmic kinase necessary for B lymphocyte development and function (Tsukada et al. (1993) *Cell* 72: 279-290). Affected patients have little to no B lymphocyte function, and therefore have severe deficiencies in their antibody response (Siegal et al. (2005) *Eur. J. Immunol.* 1(6): 482-486). XLA patients are susceptible to recurrent bacterial infections. The current standard of care for XLA is intravenous or subcutaneous immunoglobulin supplementation with paired with heavy doses of antibiotics when necessary. While effective, this treatment remains imperfect. It is expensive, lifelong, requires frequent doses, and does not provide complete protection. Susceptibility to respiratory tract and other opportunistic pathogens remains (Hermaszewski & Webster (1993) *Quart. J. Med.* 86: 31-42).

While HSCT is potentially curative; the risks inherent with the procedure (GvHD and graft rejection foremost amongst them) are typically too severe to be worth pursuing for XLA patients with a moderate phenotype. Addition of a functional copy of BTK delivered by a viral vector have shown promise in previous studies, however thus far it has not been possible to restore the endogenous BTK expression pattern (Ng et al. (2010) *Leukemia* 24: 1617-1630). These studies have also found that overexpression of BTK led to abnormal myeloproliferation, which is consistent with evidence that high levels of BTK expression are often associated with chronic lymphoid leukemia. This evidence paired with the risk of insertional oncogenesis present in viral vectors emphasizes the importance of developing a safer method to permanently cure XLA.

SUMMARY

As an alternative to uncontrolled, viral-mediated gene addition, targeted gene correction and in-frame-targeted gene addition that utilizes the endogenous promoter represents a major advancement in gene therapy. The discovery of meganucleases in the mid-1990's (e.g., Sce-I) marked the beginning of using endonucleases that could create double-strand breaks and promote homologous recombination by almost five orders of magnitude (Epinat et al. (2003) *Nucleic Acids Res.* 31: 2952-2962; Porteus & Baltimore (2003) *Science,* 300(5620): 763), and in the last decade, there has been a bloom in gene editing technologies, led by Zinc Finger Nucleases, Transcription Activator-Like Effector Nucleases (TALENs) and the Clustered Regularly Interspaced Short Palindromic Repeats (CRISPR)-associated protein 9 (Cas9) system with its ease of use and nearly limitless DNA sequences that can be targeted (Cong et al. (2013) *Science,* 339(6121): 819-823).

Although ideally 100% of XLA hematopoietic stem cells (HSC) would be gene-corrected, it is believed that only a low frequency of expression is sufficient to correct the immunodeficiencies in mice (Brown et al., 1998). For example, the phenotype for mice with mutations in murine BTK was improved with only 5% wildtype hematopoietic stem and progenitor cells with 10% wildtype splenic B cells (Rohrer et al. (1999) *Clin Immunol.* 90(1): 28-37).

As described herein, the CRISPR/Cas9 platform was used to surpass the target frequency for insertion of a corrective BTK donor into Exon 2 of the BTK locus in human CD34+ HSPCs. The ability to integrate the corrective cDNA cassette and retain its normal chromosomal context in human HSC represents a potential curative therapeutic option for those affected by XLA.

Accordingly, various embodiments contemplated herein may include, but need not be limited to, one or more of the following:

Embodiment 1: A method of treating X-Linked agammaglobulinemia (XLA) in a mammal, said method comprising:
providing differentiated T cells and/or stem/progenitor cells from said mammal;
performing a targeted insertion of a corrective copy of a BTK gene at the BTK gene locus in said cells to provide a corrected BTK gene wherein said targeted insertion places said corrective BTK cDNA where a mutation exists in the native BTK gene and where said insertion places said BTK cDNA downstream and operably linked to the endogenous BTK enhancer/promoter; and
introducing said cells into said mammal where said corrected BTK gene is expressed in a physiologically regulated manner.

Embodiment 2: The method of embodiment 1, wherein said performing a targeted insertion comprises: transducing said cells with an AAV vector or a lentiviral vector containing a donor comprising a corrective BTK cDNA flanked by homology arms; and transfecting said cells in vitro, with: a TALEN protein or a TALEN mRNA targeting the BTK gene; or a nucleic acid encoding a guide RNA (gRNA) and CRISPR/Cas endonuclease where said gRNA targets the BTK gene; or a ribonucleoprotein (RNP) complex comping a guide RNA complexed to a CRISPR/Cas endonuclease, where said gRNA targets the BTK gene.

Embodiment 3: The method of embodiment 2, wherein said corrective BTK cDNA comprises all or a portion of a corrected BTK gene wherein said corrected BTK cDNA comprises a nucleic acid sequence that corrects/replaces a mutation in the target BTK gene.

Embodiment 4: The method of embodiment 3, wherein said corrective BTK cDNA comprises nucleic acid sequence of all or of a fragment of BTK exon 1, BTK intron 1, or BTK exon 2.

Embodiment 5: The method of embodiment 4, wherein said BTK cDNA donor sequence comprises a donor sequence shown in Table 1.

Embodiment 6: The method according to any one of embodiments 2-5, wherein said BTK cDNA donor sequence is flanked by a 5' homology arm that begins at the TALEN or CRISPR/Cas cut site and extends at least 50 bp upstream, or at least 100 bp upstream, or at least 200 bp upstream, or at least 300 bp upstream, or at least 400 bp upstream, or at least 500 bp upstream.

Embodiment 7: The method of embodiment 6, wherein said BTK cDNA donor sequence is flanked by a 5' homology arm that begins at the TALEN or CRISPR/Cas cut site and extends about 500 bp upstream from said site.

Embodiment 8: The method according to any one of embodiments 2-7, wherein said cDNA donor sequence is flanked by a 3' homology arm that extends at least 50 bp, or at least 100 bp, or at least 200 bp, or at least 300 bp, or at least 350 bp, or at least 400 bp, or at least 450 bp, or at least 500 bp downstream of the TALEN or CRISPR/Cas cut site.

Embodiment 9: The method of embodiment 8, wherein said BTK cDNA donor sequence is flanked by a 3' homology arm that extends at about 500 bp downstream of the TALEN or CRISPR/Cas cut site.

Embodiment 10: The method according to any one of embodiments 2-9, wherein said cDNA donor is codon-optimized/-divergent.

Embodiment 11: The method according to any one of embodiments 2-10, wherein said cDNA donor is modified to exclude protospacer adjacent motifs (PAMs).

Embodiment 12: The method according to any one of embodiments 2-11, wherein said cDNA is modified by modifying a PAM sequence TGG to TAA.

Embodiment 13: The method according to any one of embodiments 1-12, wherein said method comprises transducing said cells with a lentiviral vector containing said donor comprising a corrective BTKL cDNA flanked by homology arms.

Embodiment 14: The method of embodiment 13, wherein said lentiviral vector comprises an integrase-deficient lentivirus (IDLV).

Embodiment 15: The method according to any one of embodiments 1-12, wherein said method comprises transducing said cells with an AAV vector containing said donor comprising a corrective BTK cDNA flanked by homology arms.

Embodiment 16: The method of embodiment 15, wherein said AAV vector wherein said AAV vector comprises a serotype selected from the group consisting of AAV1, AAV2, AAV4, AAV5, AAV6, AAV8, and AAV9.

Embodiment 17: The method of embodiment 16, wherein said AAV vector comprises an AAV6 serotype.

Embodiment 18: The method according to any one of embodiments 15-17, wherein an AAV helper protein is introduced into said cells.

Embodiment 19: The method of embodiment 18, wherein said AAV helper protein is introduced into said cell by transfection with an mRNA expressing said AAV helper protein.

Embodiment 20: The method of embodiment 19, wherein said AAV helper protein comprises a mutant adenoviral serotype 5 helper protein.

Embodiment 21: The method of embodiment 20, wherein said helper proteins comprise E4orf6 and/or E1b55k helper proteins.

Embodiment 22: The method according to any one of embodiments 18-21, wherein said method comprises transfecting said cells in vitro, with TALEN mRNA targeting the a region in the BTK gene.

Embodiment 23: The method of embodiment 22, wherein said TALEN mRNA encodes a TALEN pair characterized by the binding sites in BTK exon 1, BTK intron 1, or BTK exon 2.

Embodiment 24: The method according to any one of embodiments 1-21, wherein said method comprises transfecting said cells in vitro, with a nucleic acid encoding a guide RNA (gRNA) and CRISPR/Cas endonuclease where said gRNA targets the BTK gene.

Embodiment 25: The method according to any one of embodiments 1-21, wherein said method comprises transfecting said cells in vitro, with a ribonucleoprotein (RNP) complex comping a guide RNA complexed to a CRISPR/Cas endonuclease, where said gRNA targets the BTK gene.

Embodiment 26: The method according to any one of embodiments 24-25, wherein said guide RNA (gRNA) targets a site in BTK exon 1.

Embodiment 27: The method of embodiment 26, wherein said guide RNA targets a site in BTK exon 1 comprising the sequence CTCTGGACTGTAAGAATATG (SEQ ID NO:1).

Embodiment 28: The method according to any one of embodiments 25-26, wherein said BTK donor sequence comprises the sequence of SEQ ID NO:2.

Embodiment 29: The method according to any one of embodiments 24-25, wherein said guide RNA (gRNA) targets a site in BTK intron 1.

Embodiment 30: The method of embodiment 26, wherein said guide RNA targets a site in BTK intron 1 comprising the sequence AGGGATGAGGATTAATGTCC (SEQ ID NO:3).

Embodiment 31: The method according to any one of embodiments 29-30, wherein said BTK donor sequence comprises a sequence selected from the group consisting of SEQ ID NO:4, SEQ ID NO:5, SEQ ID NO:6, and SEQ ID NO:7.

Embodiment 32: The method according to any one of embodiments 24-25, wherein said guide RNA (gRNA) targets a site in BTK exon 2.

Embodiment 33: The method of embodiment 32, wherein said guide RNA targets a site in BTK exon 2 comprising the sequence TGCACAAACTCTCCTACTAT (SEQ ID NO: 8).

Embodiment 34: The method according to any one of embodiments 32-33, wherein said BTK donor sequence comprises the sequence of SEQ ID NO:9.

Embodiment 35: The method according to any one of embodiments 24-34, wherein said CRISPR/Cas endonuclease comprises a class 2 CRISPR/Cas endonuclease and a guide RNA.

Embodiment 36: The method of embodiment 35, wherein said class 2 CRISPR/Cas endonuclease is a type II CRISPR/Cas endonuclease.

Embodiment 37: The method according to any one of embodiments 35-36, wherein the class 2 CRISPR/Cas endonuclease is a Cas9 polypeptide and the corresponding CRISPR/Cas guide RNA is a Cas9 guide RNA.

Embodiment 38: The method of embodiment 37, wherein said Cas9 protein is selected from the group consisting of a *Streptococcus pyogenes* Cas9 protein (spCas9) or a functional portion thereof, a *Staphylococcus aureus* Cas9 protein (saCas9) or a functional portion thereof, a *Streptococcus thermophilus* Cas9 protein (stCas9) or a functional portion thereof, a *Neisseria meningitides* Cas9 protein (nmCas9) or a functional portion thereof, and a *Treponema denticola* Cas9 protein (tdCas9) or a functional portion thereof.

Embodiment 39: The method of embodiment 38, wherein said Cas9 protein comprises a *Streptococcus pyogenes* Cas9 protein (spCas9).

Embodiment 40: The method of embodiment 38, wherein said Cas9 protein comprises a *Staphylococcus aureus* Cas9 protein (saCas9).

Embodiment 41: The method of embodiment 38, wherein said Cas9 protein comprises a *Streptococcus thermophilus* Cas9 protein.

Embodiment 42: The method of embodiment 38, wherein said Cas9 protein comprises a *Neisseria meningitides* Cas9 protein (nmCas9).

Embodiment 43: The method of embodiment 38, wherein said Cas9 protein comprises a *Treponema denticola* Cas9 protein (tdCas9).

Embodiment 44: The method according to any one of embodiments 24-32, wherein the class 2 CRISPR/Cas endonuclease is a type V or type VI CRISPR/Cas endonuclease.

Embodiment 45: The method of embodiment 44, wherein the class 2 CRISPR/Cas endonuclease is selected from the group consisting of a Cpf1 polypeptide or a functional portion thereof, a C2c1 polypeptide or a functional portion thereof, a C2c3 polypeptide or a functional portion thereof, and a C2c2 polypeptide or a functional portion thereof.

Embodiment 46: The method of embodiment 45, wherein the class 2 CRISPR/Cas endonuclease comprises a Cpf1 polypeptide.

Embodiment 47: The method according to any one of embodiments 1-46, wherein said cells comprise hematopoietic stem and progenitor cells (HSPC).

Embodiment 48: The method of embodiment 47, wherein said cells comprise CD34+ hematopoietic stem and progenitor cells (HSPC).

Embodiment 49: The method according to any one of embodiments 1-46, wherein said cells comprise peripheral blood stem cells (PBSC).

Embodiment 50: The method of embodiment 49, wherein said cells comprise G-CSF mobilized peripheral blood stem cells (PBSC).

Embodiment 51: The method according to any one of embodiments 49-50, wherein said cells comprise CD34+ cells.

Embodiment 52: The method according to any one of embodiments 1-51, wherein said transfecting comprises a method selected from the group consisting of electroporation, sonoporation, lipofection, and transfection using cationic polymer.

Embodiment 53: The method of embodiment 52, wherein said transfecting comprises electroporation.

Embodiment 54: The method according to any one of embodiments 1-53, wherein said mammal is a human.

Embodiment 55: The method according to any one of embodiments 1-54, wherein said method provides at least 3%, or at least 4%, or at least 5%, or at least 6%, or at least 7%, or at least 8%, or at least 9%, or at least 10% corrected hematopoietic stem cells with functional BTK.

Embodiment 56: A system for the treatment of X-Linked agammaglobulinemia (XLA) in a mammal, said system comprising:
   a first component comprising an AAV vector or a lentiviral vector containing a donor comprising a corrective BTK cDNA flanked by homology arms; and
   a second component comprising one or more of the following:

a TALEN mRNA targeting the BTK gene; or
   a nucleic acid encoding a guide RNA (gRNA) and CRISPR/Cas endonuclease where said gRNA targets the BTK gene; or
   a ribonucleoprotein (RNP) complex comping a guide RNA complexed to a CRISPR/Cas endonuclease, where said gRNA targets the BTK gene.

Embodiment 57: The system of embodiment 56, wherein said corrective BTK cDNA comprises all or a portion of a corrected BTK gene wherein said corrected BTK cDNA comprises a nucleic acid sequence that corrects/replaces a mutation in the target BTK gene.

Embodiment 58: The system of embodiment 57, wherein said corrective BTK cDNA comprises nucleic acid sequence of all or of a fragment of BTK exon 1, BTK intron 1, or BTK exon 2.

Embodiment 59: The system of embodiment 58, wherein said BTK cDNA donor sequence comprises a donor sequence shown in Table 1.

Embodiment 60: The system according to any one of embodiments 56-59, wherein said BTK cDNA donor sequence is flanked by a 5' homology arm that begins at the TALEN or CRISPR/Cas cut site and extends at least 50 bp upstream, or at least 100 bp upstream, or at least 200 bp upstream, or at least 300 bp upstream, or at least 400 bp upstream, or at least 500 bp upstream from said cut site.

Embodiment 61: The system of embodiment 60, wherein said 5' homology arm extends about 500 bp upstream from said site.

Embodiment 62: The system according to any one of embodiments 56-61, wherein said cDNA donor sequence is flanked by a 3' homology arm that extends at least 50 bp, or at least 100 bp, or at least 200 bp, or at least 300 bp, or at least 350 bp, or at least 400 bp, or at least 450 bp, or at least 500 bp downstream of the TALEN or CRISPR/Cas cut site.

Embodiment 63: The system of embodiment 62, wherein said BTK cDNA donor sequence is flanked by a 3' homology arm that extends at about 500 bp downstream of the TALEN or CRISPR/Cas cut site.

Embodiment 64: The system according to any one of embodiments 56-63, wherein said cDNA donor is codon-optimized/-divergent.

Embodiment 65: The system according to any one of embodiments 56-64, wherein said cDNA donor modified to exclude protospacer adjacent motifs (PAMs).

Embodiment 66: The system according to any one of embodiments 56-65, wherein said cDNA is modified by modifying a PAM sequence TGG to TAA.

Embodiment 67: The system according to any one of embodiments 56-66, wherein said second component comprises a lentiviral vector containing said donor comprising a corrective BTK cDNA flanked by homology arms.

Embodiment 68: The system of embodiment 67, wherein said lentiviral vector comprises an integrase-deficient lentivirus (IDLV).

Embodiment 69: The system according to any one of embodiments 56-66, wherein said second component comprises an AAV vector containing said donor comprising a corrective BTK cDNA flanked by homology arms.

Embodiment 70: The system of embodiment 69, wherein said AAV vector wherein said AAV vector comprises a serotype selected from the group consisting of AAV1, AAV2, AAV4, AAV5, AAV6, AAV8, and AAV9.

Embodiment 71: The system of embodiment 70, wherein said AAV vector comprises an AAV6 serotype.

Embodiment 72: The system according to any one of embodiments 69-71, wherein said system comprises a third component comprising an AAV helper protein or a nucleic acid encoding an AAV helper protein.

Embodiment 73: The system of embodiment 72, wherein said third component comprises an mRNA expressing said AAV helper protein.

Embodiment 74: The system of embodiment 73, wherein said AAV helper protein comprises a mutant adenoviral serotype 5 helper protein.

Embodiment 75: The system of embodiment 74, wherein said helper proteins comprise E4orf6 and/or E1b55k helper proteins.

Embodiment 76: The system according to any one of embodiments 56-66, wherein said second component comprises a TALEN mRNA targeting the BTK gene.

Embodiment 77: The system of embodiment 76, wherein said TALEN mRNA encodes a TALEN pair characterized by the binding sites that target BTK exon 1, or BTK intron 1, or BTK exon 2.

Embodiment 78: The system according to any one of embodiments 56-66, wherein said second component comprises a nucleic acid encoding a guide RNA (gRNA) and CRISPR/Cas endonuclease where said gRNA targets the BTK gene.

Embodiment 79: The system according to any one of embodiments 56-66, wherein said second component comprises a ribonucleoprotein (RNP) complex comprising a guide RNA complexed to a CRISPR/Cas endonuclease.

Embodiment 80: The system according to any one of embodiments 78-79, wherein said guide RNA (gRNA) targets a site in BTK exon 1.

Embodiment 81: The system of embodiment 80, wherein said guide RNA targets a site in BTK exon 1 comprising the sequence CTCTGGACTGTAAGAATATG (SEQ ID NO:1).

Embodiment 82: The system according to any one of embodiments 80-81, wherein said BTK donor sequence comprises the sequence of SEQ ID NO:2.

Embodiment 83: The system according to any one of embodiments 78-79, wherein said guide RNA (gRNA) targets a site in BTK intron 1.

Embodiment 84: The system of embodiment 80, wherein said guide RNA targets a site in BTK intron 1 comprising the sequence AGGGATGAGGATTAATGTCC (SEQ ID NO:3).

Embodiment 85: The system according to any one of embodiments 83-84, wherein said BTK donor sequence comprises a sequence selected from the group consisting of SEQ ID NO:4, SEQ ID NO:5, SEQ ID NO:6, and SEQ ID NO:7.

Embodiment 86: The system according to any one of embodiments 78-79, wherein said guide RNA (gRNA) targets a site in BTK exon 2.

Embodiment 87: The system of embodiment 80, wherein said guide RNA targets a site in BTK exon 2 comprising the sequence TGCACAAACTCTCCTACTAT (SEQ ID NO: 8).

Embodiment 88: The system according to any one of embodiments 86-87, wherein said BTK donor sequence comprises the sequence of SEQ ID NO:9.

Embodiment 89: The system according to any one of embodiments 78-88, wherein said CRISPR/Cas endonuclease comprises a class 2 CRISPR/Cas endonuclease and a guide RNA.

Embodiment 90: The system of embodiment 89, wherein said class 2 CRISPR/Cas endonuclease is a type II CRISPR/Cas endonuclease.

Embodiment 91: The system according to any one of embodiments 89-90, wherein the class 2 CRISPR/Cas endonuclease is a Cas9 polypeptide and the corresponding CRISPR/Cas guide RNA is a Cas9 guide RNA.

Embodiment 92: The system of embodiment 91, wherein said Cas9 protein is selected from the group consisting of a *Streptococcus pyogenes* Cas9 protein (spCas9) or a functional portion thereof, a *Staphylococcus aureus* Cas9 protein (saCas9) or a functional portion thereof, a *Streptococcus thermophilus* Cas9 protein (stCas9) or a functional portion thereof, a *Neisseria meningitides* Cas9 protein (nmCas9) or a functional portion thereof, and a *Treponema denticola* Cas9 protein (tdCas9) or a functional portion thereof.

Embodiment 93: The system of embodiment 92, wherein said Cas9 protein comprises a *Streptococcus pyogenes* Cas9 protein (spCas9).

Embodiment 94: The system of embodiment 92, wherein said Cas9 protein comprises a *Staphylococcus aureus* Cas9 protein (saCas9).

Embodiment 95: The system of embodiment 92, wherein said Cas9 protein comprises a *Streptococcus thermophilus* Cas9 protein.

Embodiment 96: The system of embodiment 92, wherein said Cas9 protein comprises a *Neisseria meningitides* Cas9 protein (nmCas9).

Embodiment 97: The system of embodiment 92, wherein said Cas9 protein comprises a *Treponema denticola* Cas9 protein (tdCas9).

Embodiment 98: The system according to any one of embodiments 78-79, wherein the class 2 CRISPR/Cas endonuclease is a type V or type VI CRISPR/Cas endonuclease.

Embodiment 99: The system of embodiment 98, wherein the class 2 CRISPR/Cas endonuclease is selected from the group consisting of a Cpf1 polypeptide or a functional portion thereof, a C2c1 polypeptide or a functional portion thereof, a C2c3 polypeptide or a functional portion thereof, and a C2c2 polypeptide or a functional portion thereof.

Embodiment 100: The system of embodiment 99, wherein the class 2 CRISPR/Cas endonuclease comprises a Cpf1 polypeptide.

Embodiment 101: The system according to any one of embodiments 56-100, wherein said first component and second component, and third component when present, are disposed within a mammalian cell.

Embodiment 102: The system of embodiment 101, wherein said cell is a hematopoietic stem or progenitor cell (HSPC).

Embodiment 103: The system of embodiment 102, wherein said cell is a CD34+ hematopoietic stem or progenitor cell (HSPC).

Embodiment 104: The system of embodiment 103, wherein said cell is a peripheral blood stem cell (PBSC).

Embodiment 105: The system of embodiment 104, wherein said cell is a G-CSF mobilized peripheral blood stem cell (PBSC).

Embodiment 106: The system according to any one of embodiments 104-105, wherein said cell is a CD34+ cell.

Embodiment 107: The system according to any one of embodiment 101-106, wherein said cell is a human cell.

Embodiment 108: The system according to any one of embodiments 56-100, wherein said first component, second component, and when present, third component are components of a kit.

Embodiment 109: The system of embodiment 108, wherein each component is disposed within a container comprising said kit.

Embodiment 110: The system according to any one of embodiments 108-109, wherein said kit comprises instructional materials teaching the use of the components of a kit to insert a corrective cDNA into the BTK gene.

Embodiment 111: A donor nucleic acid for the treatment of X-Linked agammaglobulinemia (XLA), said nucleic acid comprising all or a portion of a corrected BTK cDNA.

Embodiment 112: The donor nucleic acid of embodiment 111, wherein said corrected BTK cDNA comprises at least a portion that is codon optimized wherein said portion comprises all or a portion of BTK exon 1, and/or all or a portion of BTK intron 1, and/or all or a portion of BTK exon 3.

Embodiment 113: The donor nucleic acid according to any one of embodiments 111-112, wherein said BTK cDNA donor sequence is flanked by a 5' homology arm that begins at the TALEN or CRISPR/Cas cut site and extends at least 50 bp upstream, or at least 100 bp upstream, or at least 200 bp upstream, or at least 300 bp upstream, or at least 400 bp upstream, or at least 500 bp upstream from said cut site.

Embodiment 114: The donor nucleic acid of embodiment 113, wherein said 5' homology arm extends about 500 bp upstream from said site.

Embodiment 115: The donor nucleic acid according to any one of embodiments 111-114, wherein said cDNA donor sequence is flanked by a 3' homology arm that extends at least 50 bp, or at least 100 bp, or at least 200 bp, or at least 300 bp, or at least 350 bp, or at least 400 bp, or at least 450 bp, or at least 500 bp downstream of the TALEN or CRISPR/Cas cut site.

Embodiment 116: The donor nucleic acid of embodiment 115, wherein said BTK cDNA donor sequence is flanked by a 3' homology arm that extends at about 500 bp downstream of the TALEN or CRISPR/Cas cut site.

Embodiment 117: The donor nucleic acid according to any one of embodiments 111-116, wherein said cDNA donor is codon-optimized/divergent.

Embodiment 118: The donor nucleic acid according to any one of embodiments 111-117, wherein said cDNA donor is modified to exclude protospacer adjacent motifs (PAMs).

Embodiment 119: The donor nucleic acid according to any one of embodiments 111-118, wherein said cDNA is modified by modifying a PAM sequence TGG to TAA.

Embodiment 120: The donor nucleic acid of embodiment 111, wherein said donor sequence comprises a sequence selected from the group consisting of SEQ ID NO:2, SEQ ID NO:4. SEQ ID NO:5, SEQ ID NO:6, SEQ ID NO:7, and SEQ ID NO:9.

Embodiment 121: A mammalian cell, wherein the genome of said cell comprises a corrected BTK gene wherein said gene is modified to eliminate deleterious BTK mutations.

Embodiment 122: The mammalian cell of embodiment 121, wherein said cell comprises all or a portion of a donor nucleic acid according to any one of embodiments 111-119.

Embodiment 123: The cell according to any one of embodiments 121-122, wherein said cell is a hematopoietic stem or progenitor cell (HSPC).

Embodiment 124: The cell of embodiment 123, wherein said cell is a CD34+ hematopoietic stem or progenitor cell (HSPC).

Embodiment 125: The cell according to any one of embodiments 121-122, wherein said cell is a peripheral blood stem cell.

Embodiment 126: The cell of embodiment 125, wherein said cell is a G-CSF mobilized peripheral blood stem cell (PBSC).

Embodiment 127: The cell according to any one of embodiments 125-126, wherein said cell is a CD34+ cells.

Definitions

The terms "subject," "individual," and "patient" may be used interchangeably and refer to humans, as well as non-human mammals (e.g., non-human primates, canines, equines, felines, porcines, bovines, ungulates, lagomorphs, and the like). In various embodiments, the subject can be a human (e.g., adult male, adult female, adolescent male, adolescent female, male child, female child) under the care of a physician or other health worker in a hospital, as an outpatient, or other clinical context. In certain embodiments, the subject may not be under the care or prescription of a physician or other health worker.

As used herein, the phrase "a subject in need thereof" refers to a subject, as described infra, that suffers from, or is at risk for a pathology described herein (e.g., XLA).

The term "treat" when used with reference to treating, e.g., a pathology or disease refers to the mitigation and/or elimination of one or more symptoms of that pathology or disease, and/or a delay in the progression and/or a reduction in the rate of onset or severity of one or more symptoms of that pathology or disease, and/or the prevention of that pathology or disease. The term treat can refer to prophylactic treatment which includes a delay in the onset or the prevention of the onset of a pathology or disease.

A "host cell," as used herein, denotes an in vivo or in vitro eukaryotic cell, or a cell from a multicellular organism (e.g., a cell line) cultured as a unicellular entity, which eukaryotic cells can be, or have been, used as recipients for a nucleic acid (e.g., a donor template nucleic acid), and include the progeny of the original cell which has been genetically modified by the nucleic acid. It is understood that the progeny of a single cell may not necessarily be completely identical in morphology or in genomic or total DNA complement as the original parent, due to natural, accidental, or deliberate mutation. A "recombinant host cell" (also referred to as a "genetically modified host cell") is a host cell into which has been introduced a heterologous nucleic acid, e.g., an expression vector. For example, a eukaryotic host cell is a genetically modified eukaryotic host cell, by virtue of introduction into a suitable eukaryotic host cell of a heterologous nucleic acid, e.g., an exogenous nucleic acid that is foreign to the eukaryotic host cell, or a recombinant nucleic acid that is not normally found in the eukaryotic host cell.

The term "stem cell" is used herein to refer to a cell (e.g., plant stem cell, vertebrate stem cell) that has the ability both to self-renew and to generate a differentiated cell type (see Morrison et al. (1997) Cell 88:287-298). In the context of cell ontogeny, the adjective "differentiated", or "differentiating" is a relative term. A "differentiated cell" is a cell that has progressed further down the developmental pathway than the cell it is being compared with. Thus, pluripotent stem cells (described below) can differentiate into lineage-restricted progenitor cells (e.g., mesodermal stem cells), which in turn can differentiate into cells that are further restricted (e.g., neuron progenitors), which can differentiate into end-stage cells (i.e., terminally differentiated cells, e.g., neurons, cardiomyocytes, etc.), which play a characteristic role in a certain tissue type, and may or may not retain the capacity to proliferate further. Stem cells may be characterized by both the presence of specific markers (e.g., proteins, RNAs, etc.) and the absence of specific markers. Stem cells may also be identified by functional assays both in vitro and in vivo, particularly assays relating to the ability of stem cells to give rise to multiple differentiated progeny.

Stem cells of interest include, but are not limited to pluripotent stem cells (PSCs). The term "pluripotent stem cell" or "PSC" is used herein to mean a stem cell capable of producing all cell types of the organism. Therefore, a PSC can give rise to cells of all germ layers of the organism (e.g., the endoderm, mesoderm, and ectoderm of a vertebrate).

Pluripotent cells are capable of forming teratomas and of contributing to ectoderm, mesoderm, or endoderm tissues in a living organism. Pluripotent stem cells of plants are capable of giving rise to all cell types of the plant (e.g., cells of the root, stem, leaves, etc.).

PSCs of animals can be derived in a number of different ways. For example, embryonic stem cells (ESCs) are derived from the inner cell mass of an embryo (Thomson et. Al. (1998) *Science,* 282(5391): 1145-1147) whereas induced pluripotent stem cells (iPSCs) are derived from somatic cells (Takahashi et. Al. (2007) *Cell,* 131(5): 861-872; Takahashi et. Al. (2007) *Nat. Protoc.* 2(12): 3081-3079; Yu et. Al. (2007) *Science,* 318(5858): 1917-1920). Because the term PSC refers to pluripotent stem cells regardless of their derivation, the term PSC encompasses the terms ESC and iPSC, as well as the term embryonic germ stem cells (EGSC), which are another example of a PSC. PSCs may be in the form of an established cell line, they may be obtained directly from primary embryonic tissue, or they may be derived from a somatic cell. PSCs can be target cells of the methods described herein. In certain embodiments the methods described herein expressly exclude the use of embryonic stem cells or cells derived therefrom.

By "induced pluripotent stem cell" or "iPSC" it is meant a PSC that is derived from a cell that is not a PSC (i.e., from a cell this is differentiated relative to a PSC). iPSCs can be derived from multiple different cell types, including terminally differentiated cells. iPSCs have an ES cell-like morphology, growing as flat colonies with large nucleo-cytoplasmic ratios, defined borders and prominent nuclei. In addition, iPSCs express one or more key pluripotency markers known by one of ordinary skill in the art, including but not limited to Alkaline Phosphatase, SSEA3, SSEA4, Sox2, Oct3/4, Nanog, TRA160, TRA181, TDGF 1, Dnmt3b, FoxD3, GDF3, Cyp26a1, TERT, and zfp42. Examples of methods of generating and characterizing iPSCs may be found in, for example, U.S. Patent Publication Nos. US20090047263, US20090068742, US20090191159, US20090227032, US20090246875, and US20090304646. Generally, to generate iPSCs, somatic cells are provided with reprogramming factors (e.g., Oct4, SOX2, KLF4, MYC, Nanog, Lin28, etc.) known in the art to reprogram the somatic cells to become pluripotent stem cells.

Hematopoietic stem cell transplantation (HSCT) is the transplantation of multipotent hematopoietic stem cells, usually derived from bone marrow, peripheral blood, or umbilical cord blood. In the methods described herein, the HSCT is typically autologous (the patient's own stem cells are used).

Peripheral blood stem cells (PBSCs) refers to hematopoietic stem and progenitor cells obtained from peripheral blood. Such cells are typically collected by apheresis or leukapheresis. The administered hematopoietic stem cells modified as described herein can be administered back into the subject where they then migrate to the recipient's bone marrow, a process known as stem cell homing. In In certain embodiments the PBSCs are "mobilized" by administration of G-CSF prior to collection of the cells.

As another illustrative example of cells that can be used in the methods described herein, hematopoietic stem cells (HSCs) can be harvested from the patient's bone marrow using well known techniques.

"CD34+ cells" refers to cells that display the CD34 antigen. CD34 is an antigen associated with hematopoietic stem cells, and isolation of CD34+ HSCs can readily be accomplished by well-known and clinically-validated methods. For example, a magnetic bead separation process that has been FDA-approved for use in various transplantation contexts is available commercially from Miltenyi Biotec, along with preparations for the handling and maintenance of such cells.

A corrective "copy of a BTK gene" refers to a cDNA encoding a full length BTK gene or encoding fragment of a BTK gene that replaces a corresponding fragment containing a mutation in a BTK gene.

BRIEF DESCRIPTION OF THE DRAWINGS

FIG. 3. X-Linked agammaglobulinemia (XLA) is a primary immunodeficiency that is characterized by a lack of mature B lymphocytes and antibodies. Its incidence has been estimated to be 1 in 200000 births. Patients are typically treated with intravenous or subcutaneous immunoglobulin supplementation, which provides a substantial quality of life improvement. However, these patients still have shorter life expectancies, require expensive monthly treatments, and remain susceptible to certain infections. Patients with XLA have loss of function mutations in Bruton's Tyrosine Kinase, a signaling protein that is essential for B lymphocyte development and function.

FIG. 5A) Schematic for correction of BTK mutations using a full length codon optimized donor integrated into Exon 1. 500 bp homology arms flanking a corrective donor template were assembled into a plasmid for delivery into K562 cells. The donor template also includes an unmodified stretch of the 5' untranslated region downstream of the Exon 1 cut site (portions in both Exon 1 and Exon 2). FIG. 5B) This construct integrated in up to 12% of cells and led to expression of the transgene. Transient expression of the protein in cells treated with only the donor plasmid was seen at Week 1 by Western blot, however by Week 3 the only remaining expression was in cells treated with both the CRISPR/Cas9 plasmid and the donor.

DETAILED DESCRIPTION

Figure 1:
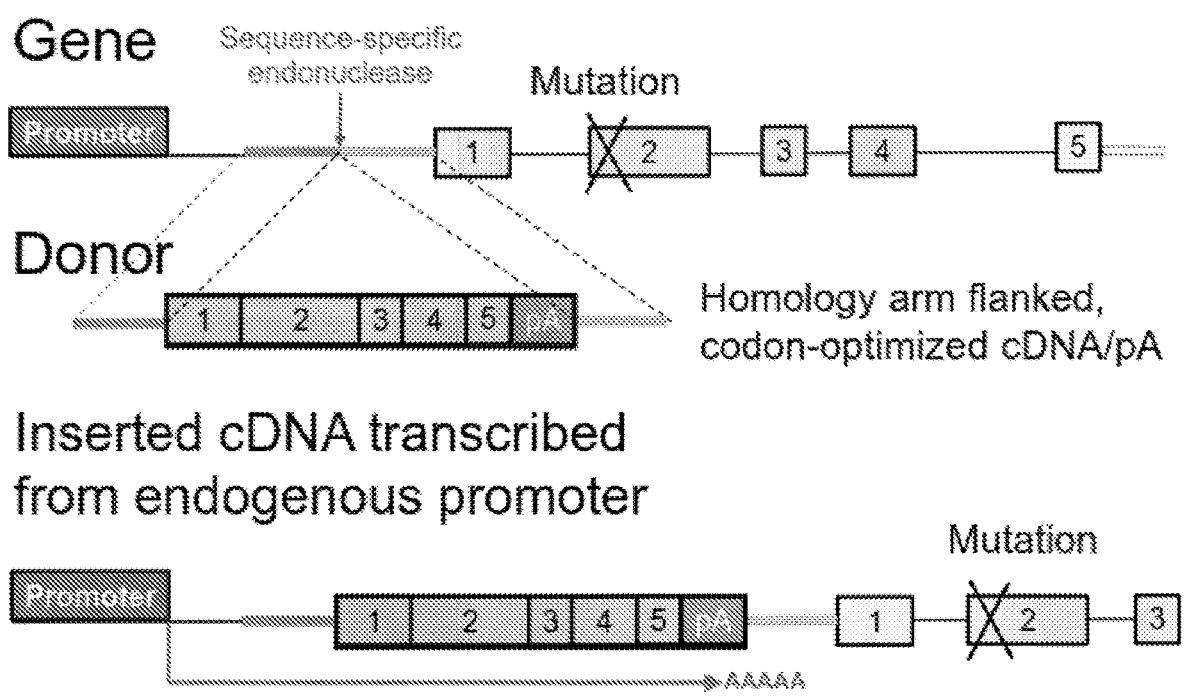
FIG. 1. One size fits all gene correction.
Figure 2:
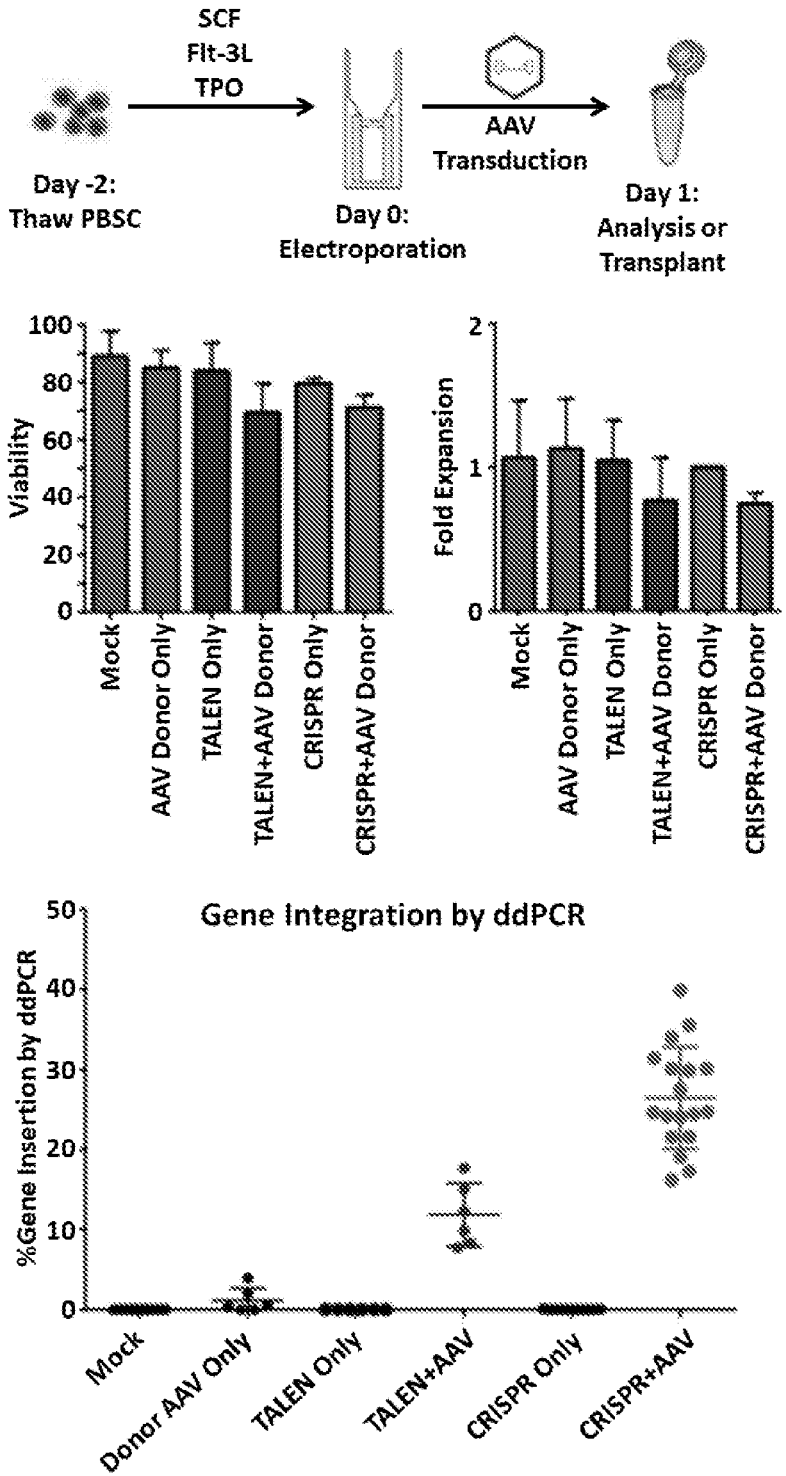
FIG. 2 shows that TALENS and CRISPRs achieve high rates of gene modification in CD34+ HSCs.

In various embodiments methods and compositions are provided to effectively edit genes in cells (e.g., hematopoietic stem cells) to effectively correct various genetic diseases. The goal is to achieve efficient, precise gene integration and effective expression of cDNA cassettes to express normal versions of genes in hematopoietic stem cells. Applications may be for gene therapy of hemoglobinopathies, immune deficiencies, storage and metabolic diseases. In certain embodiments applications include treatment X-Linked agammaglobulinemia (XLA).

In certain embodiments we define optimal design features of homologous donors (cDNA expression cassettes and homology arms) and CRISPR/Cas target sites. Many of these same features may be used for gene correction, such as reversions of mutations e.g. correction of base-pair change causing SCD, replacement of deleted sequences. In various embodiments, illustrative features that were optimized include, but are not limited to one or more of the following:
  a. length of homology arms;
  b. modification of donor sequence and homology arms to minimize illegitimate recombination(s);
  c. modification of donor sequence and homology arms to minimize targeted-recutting by a nuclease;
  d. inclusion of necessary splice sites;
  e. use of optimal 5' and 3' untranslated sequences that flank endogenous gene, as needed for most precise control of transgene expression;
  f. optimal codon optimization algorithm for highest level expression;
  g. strong polyadenylation signal;
  h. editing reagents (CRISPR/Cas9/sgRNA RNP; TALEN), AAV6;
  i. CRISPR/Cas9 targets in 5' UTR or early introns and avoiding splice signals are preferred targets over exons;
  j. CD34+ cell processing—pre-stimulation culture conditions, times, electroporation parameters, cryopreservation;
  k. Use of Geminin-Cas9 to decrease indels;
  l. Selection of cells in S/G2 for editing followed by expansion; and
  m. analytic methods to characterize gene editing effects at molecular (deep sequencing, TIDE, ddPCR, in-out PCR), immunologic (flow cytometry), cellular levels (CD34, primary T cells, CFU assay, NSG xenograft, artificial thymocyte assay and functional assays).

Correcting of X-Linked Agammaglobulinemia (XLA) (BTK Gene Correction).

In one illustrative, but non-limiting embodiment, methods and compositions are provided for correcting (treating) X-Linked agammaglobulinemia (XLA) in a mammal. In various illustrative embodiments, the method comprises: i) providing differentiated T cells and/or stem/progenitor cells from said mammal; ii) performing a targeted insertion of a corrective copy of a BTK gene at the BTK gene locus in said cells to provide a corrected BTK gene wherein said targeted insertion places said corrective BTK cDNA where a mutation exists in the native BTK gene and where said insertion places said BTK cDNA downstream and operably linked to the endogenous BTK enhancer/promoter; and iii) introducing the cells into said mammal where the corrected BTK gene is expressed in a physiologically regulated manner.

In certain embodiments the targeted integration of the corrective "donor" BTK cDNA is accomplished by the use of targeted endonucleases that create targeted double double-strand breaks (e.g., double strand breaks at predetermined location(s)) and promote homologous recombination of the corrective donor cDNA at the location of the double-strand breaks. In certain embodiments the targeted endonucleases comprise Zinc Finger Nucleases, Transcription Activator-Like Effector Nucleases (TALENs), or Clustered Regularly Interspaced Short Palindromic Repeats (CRISPR) associated protein (Cas) systems. Accordingly, in certain embodiments methods contemplated herein involve performing a targeted insertion (in the cells obtained from the subject or cells derived from the primary cells) by i) transducing the cells with an AAV vector or a lentiviral vector containing a donor comprising the corrective BTK cDNA flanked by homology arms; and ii) transfecting the cells in vitro, with:
  a TALEN protein or a TALEN mRNA targeting the BTK gene; or
  a nucleic acid encoding a guide RNA (gRNA) and CRISPR/Cas endonuclease where said gRNA targets the BTK gene; or
  a ribonucleoprotein (RNP) complex comping a guide RNA complexed to a CRISPR/Cas endonuclease, where said gRNA targets the BTK gene; or
  a Zinc finger endonuclease or a nucleic acid encoding a zinc finger endonuclease where the zinc finger endonuclease targets the BTK gene.

In certain embodiments, the integration of a corrective "donor" BTK cDNA is targeted to BTK exon 1, and/or to BTK intron 1, and/or to BTK exon 2. Illustrative BTK target sequences and corrective donor sequences are shown in Table 1.

TABLE 1

Illustrative BTK target sequences and corrective BTK donor sequences.

| | |
|---|---|
| BTK Exon 1 gRNA target (SEQ ID NO: 1) | CTCTGGACTGTAAGAATATG |
| Exon 1 donor (corrective) Sequence (SEQ ID NO: 2) | TTGTCCTTTGGGGTCCCTTCACTATCAAGTTCAACTGTGTGTCCCTGAGACTCCTC<br>TGCCCCGGAGGACAGGAGACTCGAAAAACGCTCTTCCTGGCCAGTCTCTTTGCT<br>CTGTGTCTGCCAGCCCCCAGCATCTCTCCTCTTTCCTGTAAGCCCCTCTCCCTGTG<br>CTGACTGTCTTCATAGTACTTTAGGTATGTTGTCCCTTTACCTCTGGGAGGATAG<br>CTTGATGACCTGTCTGCTCAGGCCAGCCCCATCTAGAGTCTCAGTGGCCCCAGTC<br>ATGTTGAGAAAGGTTCTTTCAAAGATAGACTCAAGATAGTAGTGTCAGAGGTCC<br>CAAGCAAATGAAGGGCGGGGACAGTTGAGGGGGTGGAATAGGGACGGCAGC |

TABLE 1-continued

Illustrative BTK target sequences and corrective BTK donor sequences.

|  |  |
|---|---|
|  | AGGGAACCAGATAGCATGCTGCTGAGAAGAAAAAAAGACATTGGTTTAGGTCA<br>GGAAGCAAAAAAAGGGAACTGAGTGGCTGTGAAAGGGTGGGGTTTGCTCAGA<br>CTGTCCTTCCTCTCTGGACTGTAAGAATATGTCTCCAGGGCCAGTGTCTGCTGCG<br>ATCGAGTCCCACCTTCCAAGTCCTGGCATCTCAATGCATCTGGGAAGCTACCTGC<br>ATTAAGTCAGGACTGAGCACACAGGTGAACTCCAGAAAGAAGAAGCTATGGCC<br>GCCGTGATCCTGGAATCCATCTTCCTGAAGCGGAGCCAGCAGAAGAAGAAAAC<br>AAGCCCTCTGAACTTCAAGAAGCGGCTGTTCCTGCTGACCGTGCACAAGCTGAG<br>CTACTACGAGTACGACTTCGAGCGGGGCAGAAGAGGCAGCAAGAAGGCAGC<br>ATCGACGTGGAAAAGATCACCTGTGTGGAAACCGTGGTGCCCGAGAAGAACCC<br>TCCACCTGAGAGACAGATCCCCAGAAGGGGCGAAGAGTCCAGCGAGATGGAA<br>CAGATCTCTATCATCGAGCGGTTCCCGTATCCTTTCCAAGTGGTGTACGACGAG<br>GGCCCACTGTACGTGTTCAGCCCTACCGAGGAACTGCGGAAGAGATGGATCCA<br>CCAGCTGAAGAACGTGATCCGGTACAACAGCGACCTGGTGCAGAAGTATCACC<br>CCTGCTTTTGGATCGACGGCCAGTACCTGTGCTGTAGCCAGACCGCCAAGAATG<br>CCATGGGCTGCCAGATTCTGGAAAACCGGAACGGCTCTCTGAAGCCCGGCAGC<br>AGCCACAGAAAGACCAAGAAGCCTCTGCCTCCTACACCTGAAGAGGACCAGAT<br>CCTGAAGAAACCCTGCCTCCAGAACCTGCCGCTGCTCCTGTGTCTACCAGCGA<br>GCTGAAAAAGGTGGTGGCCCTGTACGACTACATGCCCATGAACGCCAACGACC<br>TGCAGCTGAGAAAGGGCGACGAGTACTTCATCCTGGAAGAGTCTAACCTGCCTT<br>GGTGGCGGGCCAGAGACAAGAATGGCCAAGAGGGCTACATCCCCAGCAACTAC<br>GTGACCGAGGCCGAGGACAGCATCGAGATGTACGAGTGGTACAGCAAGCACA<br>TGACCAGAAGCCAGGCCAACAGCTGCTGAAGCAAGAGGGCAAAGAAGGCGG<br>CTTCATCGTCCGGGATTCTAGCAAGGCCGGCAAGTACACCGTGTCCGTGTTCGC<br>CAAGAGCACCGGCGATCCTCAGGGCGTGATCAGACACTACGTCGTGTGTAGCA<br>CCCCTCAGAGCCAGTACTACCTGGCCGAGAAGCACCTGTTCAGCACAATCCCCG<br>AGCTGATCAACTACCACCAGCACAACTCTGCCGGCCTGATCAGCAGACTGAAGT<br>ACCCTGTGTCTCAGCAGAACAAAAACGCCCCTAGCACAGCCGGCCTCGGCTATG<br>GATCTTGGGAGATCGACCCCAAGGACCTGACCTTCCTGAAAGAACTCGGCACCG<br>GCCAGTTCGGCGTCGTGAAGTATGGAAAATGGCGGGACAGTACGACGTGGC<br>CATCAAGATGATCAAAGAGGGCAGCATGAGCGAGGACGAGTTCATCGAAGAG<br>GCCAAAGTGATGATGAACCTGAGCCACGAGAAGCTGGTGCAGCTGTACGGCGT<br>GTGTACCAAGCAGCGGCCCATCTTTATCATCACCGAGTACATGGCCAACGGCTG<br>CCTGCTGAACTACCTGCGCGAAATGCGGCACCGGTTTCAGACACAGCAACTGCT<br>GGAAATGTGCAAGGACGTGTGCGAGGCCATGGAATACCTGGAAAGCAAGCAG<br>TTCCTGCACCGCGATCTGGCCGCCAGAAACTGCCTGGTCAATGATCAGGGCGTT<br>GTGAAGGTGTCCGACTTCGGCCTGAGCAGATACGTGCTGGACGATGAGTACAC<br>CAGCAGCGTGGGCAGCAAGTTTCCCGTCAGATGGTCCCCACCTGAGGTGCTGAT<br>GTACTCCAAGTTCAGCTCCAAGAGCGACATCTGGGCCTTCGGCGTTCTGATGTG<br>GGAGATCTACAGCCTGGGCAAGATGCCCTACGAGAGATTCACCAACAGCGAGA<br>CAGCCGAGCACATTGCCCAGGGCCTGAGACTGTATAGACCTCACCTGGCCTCCG<br>AGAAGGTGTACACAATCATGTACAGCTGTTGGCACGAGAAGGCCGACGAGCGG<br>CCTACCTTTAAGATCCTGCTGAGCAACATCCTGGACGTGATGGACGAGGAATCC<br>GGTGGAGGCGGTGGAGGGTACCCATACGATGTTCCAGATTACGCTTATCCGTA<br>CGACGTCCCGGATTACGCTTATCCCTATGACGTGCCTGATTATGCTTGAgctcgcca<br>ataagcttcttggttctacttctcttctccacaagccccaatttcactttctcagaggaaatcccaagcttag<br>gagccctggagcctttgtgctcccactcaatacaaaaaggcccctctctacatctgggaatgcacctcttct<br>ttgattccctgggatagtggcttctgagcaaaggccaagaaattattgtgcctgaaatttcccgagagaat<br>taagacagactgaatttgcgatgaaaatattttttaggagggaggtgtaaatagccgcacaaaggggt<br>ccaacagctcttttgagtaggcatttggtagagcttgggggtgtgtgtgtgggggtggaccgaatttggcaa<br>gaatgaaatggtgtcataaagatgggagggggagggtgttttgataaaataaaattactagaaagCATT<br>AGATCTGTGTGTTGGTTTTTTGTGTGTGGACTGTAAGAATATGTCTCCAGGGCC<br>AGTGTCTGCTGCGATCGAGTCCCACCTTCCAAGTCCTGGCATCTCAATGCATCTG<br>GGAAGCTACCTGCATTAAGTCAGGACTGAGGTGGGTCTGGGGTATGGCAGGG<br>GCTGGGCAGCAGCAGCAATGTACCTTGCTTGGGACCCCTAAAAACCAGAGAGA<br>CAGCATGGCTGGTGCCATTTATCAGCTAGTGGAGGAGGCTGACGGAGGGTGG<br>GAGTGTCATCAGCACAAGGCCCTGGCAGTCCCTTCTGGTGATTAGAGAGGCCG<br>AAAGGGTCCTTTCCGACAAGGGCTGAGGGTGGGCGGAACAGGAAGAGAAAA<br>TGTGACATGAGGTGACCATCCGAACAGGTAGCAAATGTTAGAAAGGGGTACCT<br>CTGGCAAACTTAGTGGAAAAGTAATATTGCAGGGAGCAGTCAGATAAAAACAA<br>GCCCTTCTGTCAAATAGTGCTTGAAGACTCAATAGGGATACATGGGTCA |
| BTK Exon 1<br>gRNA target<br>(SEQ ID<br>NO: 3) | AGGGATGAGGATTAATGTCC |
| BTK Intron 1<br>Original HDR<br>Donor Seq<br>(excluding<br>backbone)<br>(SEQ ID<br>NO: 4) | CCTCCATATCCTTATTAGTTCCCTTGGTTACAGACCCCAGTGGGACAATGTTTGA<br>AAAATTATATTCACCGTCTAGGAAATTGGGAACTGAAAGTCCAATATCTGCCTC<br>AGTGGAGTTCTGGCACCTGCATTATCCCTTCTGGGTATATCAAGATCAACAGCT<br>GCACAGATACTTTTGCTTTTACAGATTCTACACATATCATATAAAGGTGAATAG<br>TGTAAAGCTACCTCTACACCTTACCAAGCACACAGGTGCGTGCCATTTAACATCT<br>AGAGCATTCCATTGCCTTATACAAGAACTCAGTTTATATGAGCTCACAACATCGA<br>ACCAATCCCCCCCCAATTCAGTGTGCATCCATTATACCTGAAACCTGACAGAGCT<br>GGGGGCTGTGGGAGGAGGTTGGTAGGAAGAAATTATTTTGTGAGCTGTGCACA<br>TTTTTGTTCCATTTGAAACTAGGTAGCTAGGCTGAGGGGGAACCAAGAGGGAT<br>GAGGATTAATGTCCTGGGTCCTCAGGAACTTTCATTATCAACAGCACACAGGTG<br>AACTCCAGAAAGAAGAAGCTATGGCCGCCGTGATCCTGGAATCCATCTTCCTGA<br>AGCGGAGCCAGCAGAAGAAGAAAACAAGCCCTCTGAACTTCAAGAAGCGGCTG |

TABLE 1-continued

Illustrative BTK target sequences and corrective BTK donor sequences.

|  |  |
|---|---|
|  | TTCCTGCTGACCGTGCACAAGCTGAGCTACTACGAGTACGACTTCGAGCGGGC
AGAAGAGGCAGCAAGAAAGGCAGCATCGACGTGGAAAAGATCACCTGTGTGG
AAACCGTGGTGCCCGAGAAGAACCCTCCACCTGAGAGACAGATCCCCAGAAGG
GGCGAAGAGTCCAGCGAGATGGAACAGATCTCTATCATCGAGCGGTTCCCGTA
TCCTTTCCAAGTGGTGTACGACGAGGGCCCACTGTACGTGTTCAGCCCTACCGA
GGAACTGCGGAAGAGATGGATCCACCAGCTGAAGAACGTGATCCGGTACAACA
GCGACCTGGTGCAGAAGTATCACCCCTGCTTTTGGATCGACGGCCAGTACCTGT
GCTGTAGCCAGACCGCCAAGAATGCCATGGGCTGCCAGATTCTGGAAAACCGG
AACGGCTCTCTGAAGCCCGGCAGCAGCCACAGAAAGACCAAGAAGCCTCTGCC
TCCTACACCTGAAGAGGACCAGATCCTGAAGAAACCCCTGCCTCCAGAACCTGC
CGCTGCTCCTGTGTCTACCAGCGAGCTGAAAAAGGTGGTGGCCCTGTACGACTA
CATGCCCATGAACGCCAACGACCTGCAGCTGAGAAAGGGCGACGAGTACTTCA
TCCTGGAAGAGTCTAACCTGCCTTGGTGGCGGGCCAGAGACAAGAATGGCCAA
GAGGGCTACATCCCCAGCAACTACGTGACCGAGGCCGAGGACAGCATCGAGAT
GTACGAGTGGTACAGCAAGCACATGACCAGAAGCCAGGCCGAACAGCTGCTGA
AGCAAGAGGGCAAAGAAGGCGGCTTCATCGTCCGGGATTCTAGCAAGGCCGG
CAAGTACACCGTGTCCGTGTTCGCCAAGAGCACCGGCGATCCTCAGGGCGTGAT
CAGACACTACGTCGTGTGTAGCACCCCTCAGAGCCAGTACTACCTGGCCGAGAA
GCACCTGTTCAGCACAATCCCCGAGCTGATCAACTACCACCAGCACAACTCTGCC
GGCCTGATCAGCAGACTGAAGTACCCTGTGTCTCAGCAGAACAAAAACGCCCCT
AGCACAGCCGGCCTCGGCTATGGATCTTGGGAGATCGACCCCAAGGACCTGAC
CTTCCTGAAAGAACTCGGCACCGGCCAGTTCGGCGTCGTGAAGTATGGAAAAT
GGCGGGACAGTACGACGTGGCCATCAAGATGATCAAAGAGGGCAGCATGAG
CGAGGACGAGTTCATCGAA

TABLE 1-continued

Illustrative BTK target sequences and corrective BTK donor sequences.

|  |  |
|---|---|
|  | CATGCCCATGAACGCCAACGACCTGCAGCTGAGAAAGGGCGACGAGTACTTCA<br>TCCTGGAAGAGTCTAACCTGCCTTGGTGGCGGGCCAGAGACAAGAATGGCCAA<br>GAGGGCTACATCCCCAGCAACTACGTGACCGAGGCCGAGGACAGCATCGAGAT<br>GTACGAGTGGTACAGCAAGCACATGACCAGAAGCCAGGCCGAACAGCTGCTGA<br>AGCAAGAGGGCAAAGAAGGCGGCTTCATCGTCCGGGATTCTAGCAAGGCCGG<br>CAAGTACACCGTGTCCGTGTTCGCCAAGAGCACCGGCGATCCTCAGGGCGTGAT<br>CAGACACTACGTCGTGTGTAGCACCCCTCAGAGCCAGTACTACCTGGCCGAGAA<br>GCACCTGTTCAGCACAATCCCCGAGCTGATCAACTACCACCAGCACAACTCTGCC<br>GGCCTGATCAGCAGACTGAAGTACCCTGTGTCTCAGCAGAACAAAAACGCCCCT<br>AGCACAGCCGGCCTCGGCTATGGATCTTGGGAGATCGACCCCAAGGACCTGAC<br>CTTCCTGAAAGAACTCGGCACCGGCCAGTTCGGCGTCGTGAAGTATGGAAAAT<br>GGCGGGGACAGTACGACGTGGCCATCAAGATGATCAAAGAGGGCAGCATGAG<br>CGAGGACGAGTTCATCGAAGAGGCCAAAGTGATGATGAACCTGAGCCACGAGA<br>AGCTGGTGCAGCTGTACGGCGTGTGTACCAAGCAGCGGCCCATCTTTATCATCA<br>CCGAGTACATGGCCAACGGCTGCCTGCTGAACTACCTGCGCGAAATGCGGCAC<br>CGGTTTCAGACACAGCAACTGCTGGAAATGTGCAAGGACGTGTGCGAGGCCAT<br>GGAATACCTGGAAAGCAAGCAGTTCCTGCACCGCGATCTGGCCGCCAGAAACT<br>GCCTGGTCAATGATCAGGGCGTTGTGAAGGTGTCCGACTTCGGCCTGAGCAGA<br>TACGTGCTGGACGATGAGTACACCAGCAGCGTGGGCAGCAAGTTTCCCGTCAG<br>ATGGTCCCCACCTGAGGTGCTGATGTACTCCAAGTTCAGCTCCAAGAGCGACAT<br>CTGGGCCTTCGGCGTTCTGATGTGGGAGATCTACAGCCTGGGCAAGATGCCCTA<br>CGAGAGATTCACCAACAGCGAGACAGCCGAGCACATTGCCCAGGGCCTGAGAC<br>TGTATAGACCTCACCTGGCCTCCGAGAAGGTGTACACAATCATGTACAGCTGTT<br>GGCACGAGAAGGCCGACGAGCGGCCTACCTTTAAGATCCTGCTGAGCAACATC<br>CTGGACGTGATGGACGAGGAATCCGGTGGAGGCGGTGGAGGGTACCCATACG<br>ATGTTCCAGATTACGCTTATCCGTACGACGTCCCGGATTACGCTTATCCCTATGA<br>CGTGCCTGATTATGCTTGAgctcgccaataagcttcttggttctacttctcttctccacaagcccca<br>atttcactttctcagaggaaatcccaagcttaggagccctggagcctttgtgctcccactcaatacaaaaa<br>ggcccctctctacatctgggaatgcacctcttctttgattccctgggatagtggcttctgagcaaaggccaa<br>gaaattattgtgcctgaaatttcccgagagaattaagacagactgaatttgcgatgaaaatattttttagg<br>agggaggatgtaaatagccgcacaaaggggtccaacagctctttgagtaggcatttggtagagcttggg<br>ggtgtgtgtgtggggtggaccgaatttggcaagaatgaaatggtgtcataaagatgggaggggagggt<br>gttttgataaaataaaattactagaaagCATTAGATCTGTGTGTTGGTTTTTTGTGTGGTCCT<br>GGGTCCTCAGGAACTTTCATTATCAACAGCACACAGGTGAACTCCAGAAAGAAG<br>AAGCTATGGCCGCAGTGATTCTGGAGAGCATCTTTCTGAAGCGATCCCAACAGA<br>AAAAGAAAACATCACCTCTAAACTTCAAGAAGCGCTGTTTCTCTTGACCGTGCA<br>CAAACTCTCCTACTATGAGTATGACTTTGAACGTGGGGTAAGTTTCTCGACTATG<br>AAAACTGAGTTTCAAGATATCAAGGACTTGGCCTTAGATCTTTCTTGGGGAAGA<br>GGTAAATTTTCGTTGGTAGGAGGAGGGGAGTAGAATGGACCTAAGTTCTTTCA<br>AATTCAGCAAAATATTTCCTAGCCTATAACTAGCTAAAGCCGGAAAGTCAAAGG<br>TCCTAAGAAGCCACAAGGAAAATATTACCATGGAATCTTGGAATTGATGAGCAC<br>TCATTAAATGATTGTTGAAAATGAAATCGAAGAGTTGGAAATTGCTTCCTTACTT<br>CCTATGAG |
| BTK Intron 1<br>Donor with<br>WPRE<br>(Excluding<br>backbone)<br>(SEQ ID<br>NO: 6) | CCTCCATATCCTTATTAGTTCCCTTGGTTACAGACCCCAGTGGGACAATGTTTGA<br>AAAATTATATTCACCGTCTAGGAAATTGGGAACTGAAAGTCCAATATCTGCCTC<br>AGTGGAGTTCTGGCACCTGCATTATCCCTTCTGGGTATATCAAGATCAACAGCT<br>GCACAGATACTTTTGCTTTTCACAGATTCTACACATATCATATAAAGGTGAATAG<br>TGTAAAGCTACCTCTACACCTTACCAAGCACACAGGTGCGTGCCATTTAACATCT<br>AGAGCATTCCATTGCCTTATACAAGAACTCAGTTTATATGAGCTCACAACATCGA<br>ACCAATCCCCCCCCAATTCAGTGTGCATCCATTATACCTGAAACCTGACAGAGCT<br>GGGGGGCTGTGGGAGGAGGTTGGTAGGAAGAAATTATTTTGTGAGCTGTGCACA<br>TTTTTGTTCCATTTGAAACTAGGTAGCTAGGCTGAGGGGGAACCAAGAGGGAT<br>GAGGATTAATGTCCTGGGTCCTCAGGAACTTTCATTATCAACAGCACACAGGTG<br>AACTCCAGAAAGAAGAAGCTATGGCCGCCGTGATCCTGGAATCCATCTTCCTGA<br>AGCGGAGCCAGCAGAAGAAGAAAACAAGCCCTCTGAACTTCAAGAAGCGGCTG<br>TTCCTGCTGACCGTGCACAAGCTGAGCTACTACGAGTACGACTTCGAGCGGGGC<br>AGAAGAGGCAGCAAGAAAGGCAGCATCGACGTGGAAAAGATCACCTGTGTGG<br>AAACCGTGGTGCCCGAGAAGAACCCTCCACCTGAGAGACAGATCCCCAGAAGG<br>GGCGAAGAGTCCAGCGAGATGGAACAGATCTCTATCATCGAGCGGTTCCCGTA<br>TCCTTTCCAAGTGGTGTACGACGAGGGCCCACTGTACGTGTTCAGCCCTACCGA<br>GGAACTGCGGAAGAGATGGATCCACCAGCTGAAGAACGTGATCGGTACAACA<br>GCGACCTGGTGCAGAAGTATCACCCCTGCTTTTGGATCGACGGCCAGTACCTGT<br>GCTGTAGCCAGACCGCCAAGAATGCCATGGGCTGCCAGATTCTGGAAAACCGG<br>AACGGCTCTCTGAAGCCCGGCAGCAGCCACAGAAAGACCAAGAAGCCTCTGCC<br>TCCTACACCTGAAGAGGACCAGATCCTGAAGAACCCCTGCCTCCAGAACCTGC<br>CGCTGCTCCTGTGTCTACCAGCGAGCTGAAAAAGGTGGTGGCCCTGTACGACTA<br>CATGCCCATGAACGCCAACGACCTGCAGCTGAGAAAGGGCGACGAGTACTTCA<br>TCCTGGAAGAGTCTAACCTGCCTTGGTGGCGGGCCAGAGACAAGAATGGCCAA<br>GAGGGCTACATCCCCAGCAACTACGTGACCGAGGCCGAGGACAGCATCGAGAT<br>GTACGAGTGGTACAGCAAGCACATGACCAGAAGCCAGGCCGAACAGCTGCTGA<br>AGCAAGAGGGCAAAGAAGGCGGCTTCATCGTCCGGGATTCTAGCAAGGCCGG<br>CAAGTACACCGTGTCCGTGTTCGCCAAGAGCACCGGCGATCCTCAGGGCGTGAT<br>CAGACACTACGTCGTGTGTAGCACCCCTCAGAGCCAGTACTACCTGGCCGAGAA<br>GCACCTGTTCAGCACAATCCCCGAGCTGATCAACTACCACCAGCACAACTCTGCC<br>GGCCTGATCAGCAGACTGAAGTACCCTGTGTCTCAGCAGAACAAAAACGCCCCT<br>AGCACAGCCGGCCTCGGCTATGGATCTTGGGAGATCGACCCCAAGGACCTGAC<br>CTTCCTGAAAGAACTCGGCACCGGCCAGTTCGGCGTCGTGAAGTATGGAAAAT |

TABLE 1-continued

Illustrative BTK target sequences and corrective BTK donor sequences.

|  | |
|---|---|
|  | GGCGGGGACAGTACGACGTGGCCATCAAGATGATCAAAGAGGGCAGCATGAG<br>CGAGGACGAGTTCATCGAAGAGGCCAAAGTGATGATGAACCTGAGCCACGAGA<br>AGCTGGTGCAGCTGTACGGCGTGTGTACCAAGCAGCGGCCCATCTTTATCATCA<br>CCGAGTACATGGCCAACGGCTGCCTGCTGAACTACCTGCGCGAAATGCGGCAC<br>CGGTTTCAGACACAGCAACTGCTGGAAATGTGCAAGGACGTGTGCGAGGCCAT<br>GGAATACCTGGAAAGCAAGCAGTTCCTGCACCGCGATCTGGCCGCCAGAAACT<br>GCCTGGTCAATGATCAGGGCGTTGTGAAGGTGTCCGACTTCGGCCTGAGCAGA<br>TACGTGCTGGACGATGAGTACACCAGCAGCGTGGGCAGCAAGTTTCCCGTCAG<br>ATGGTCCCCACCTGAGGTGCTGATGTACTCCAAGTTCAGCTCCAAGAGCGACAT<br>CTGGGCCTTCGGCGTTCTGATGTGGGAGATCTACAGCCTGGGCAAGATGCCCTA<br>CGAGAGATTCACCAACAGCGAGACAGCCGAGCACATTGCCCAGGGCCTGAGAC<br>TGTATAGACCTCACCTGGCCTCCGAGAAGGTGTACACAATCATGTACAGCTGTT<br>GGCACGAGAAGGCCGACGAGCGGCCTACCTTTAAGATCCTGCTGAGCAACATC<br>CTGGACGTGATGGACGAGGAATCCGGTGGAGGCGGTGGAGGGTACCCATACG<br>ATGTTCCAGATTACGCTTATCCGTACGACGTCCCGGATTACGCTTATCCCTATGA<br>CGTGCCTGATTATGCTTGAgctcgccaataagcttcttggttctacttctcttctccacaagcccca<br>atttcactttctcagaggaaatcccaagcttaggagccctggagcctttgtgctcccactcaatacaaaaa<br>ggcccctctctacatctgggaatgcacctcttctttgattccctgggatagtggcttctgagcaaaggccaa<br>gaaattattgtgcctgaaatttcccgagagaattaagacagactgaatttgcgatgaaaatattttttagg<br>agggaggatgtaaatagccgcacaaagggggtccaacagctcttgagtaggcatttggtagagcttggg<br>ggtgtgtgtgtggggggtggaccgaatttggcaagaatgaaatggtgtcataaagatgggaggggagggt<br>ggcctactcgaccacgagggaattccgataatcaacctctggattacaaaatttgtgaaagattgactgg<br>tattcttaactatgttgctccttttacgctatgtggatacgctgctttaatgcctttgtatcatgctattgcttc<br>ccgtatggctttcatttttctcctccttgtataaatcctggttgctgtctctttatgaggagttgtgggcccgttgt<br>caggcaacgtggcgtggtgtgcactgtgtttgctgacgcaaccccactggttgggcattgccaccacct<br>gtcagctcctttccgggacttcgctttcccctcccctattgccacggcggaactcatcgccgctgccttgc<br>ccgctgctggacaggggctcggctgttgggcactgacaattccgtggtgttgtcggggaaATCATcgtc<br>ctttccTtggctgctcgcctgtgttgccacctggattctgcgcgggacgtccttctgctacgtcccttcggcc<br>ctcaatccagcggaccttccttcccgcggcctgctgccggctctgcggcctcttccgcgtcttcgccttcgcc<br>ctcagacgagtcggatctcccctttgggccgcctccccgcATCGATACCGTCGACCTCGAGACCT<br>AGAAAAACATGGCCAATTCGAGCTCGGTACCTTTAAGACCAATGACTTACAAGG<br>CAGCTGTAGATCTTAGCCACTTTTTAAAAGAAAAGGGGGGACgttttgataaaataa<br>aattactagaaagCATTAGATCTGTGTGTTGGTTTTTTGTGTGTCCTGGGTCCTCAGG<br>AACTTTCATTATCAACAGCACACAGGTGAACTCCAGAAGAAGAAGCTATGGCC<br>GCAGTGATTCTGGAGAGCATCTTTCTGAAGCGATCCCAACAGAAAAAGAAAAC<br>ATCACCTCTAAACTTCAAGAAGCGCCTGTTTCTCTTGACCGTGCACAAACTCTCC<br>TACTATGAGTATGACTTTGAACGTGGGGTAAGTTTCTCGACTATGAAAACTGAG<br>TTTCAAGATATCAAGGACTTGGCCTTAGATCTTTCTTGGGGAAGAGGTAAATTTT<br>CGTTGGTAGGAGGAGGGGAGTAGAATGGACCTAAGTTCTTTCAAATTCAGCAA<br>AATATTTCCTAGCCTATAACTAGCTAAAGCCGGAAAGTCAAAGGTCCTAAGAAG<br>CCACAAGGAAAATATTACCATGGAATCTTGGAATTGATGAGCACTCATTAAATG<br>ATTGTTGAAAATGAAATCGAAGAGTTGGAAATTGCTTCCTTACTTCCTATGAG |
| BTK Intron 1<br>Donor with<br>Intron 18<br>truncated<br>(excluding<br>backbone)<br>(SEQ ID<br>NO: 7) | CCTCCATATCCTTATTAGTTCCCTTGGTTACAGACCCCAGTGGGACAATGTTTGA<br>AAAATTATATTCACCGTCTAGGAAATTGGGAACTGAAAGTCCAATATCTGCCTC<br>AGTGGAGTTCTGGCACCTGCATTATCCCTTCTGGGTATATCAAGATCAACAGCT<br>GCACAGATACTTTTGCTTTTCACAGATTCTACACATATCATATAAAGGTGAATAG<br>TGTAAAGCTACCTCTACACCTTACCAAGCACACAGGTGCGTGCCATTTAACATCT<br>AGAGCATTCCATTGCCTTATACAAGAACTCAGTTTATATGAGCTCACAACATCGA<br>ACCAATCCCCCCCAATTCAGTGTGCATCCATTATACCTGAAACCTGACAGAGCT<br>GGGGGCTGTGGGAGGAGGTTGGTAGGAAGAAATTATTTTGTGAGCTGTGCACA<br>TTTTTGTTCCATTTGAAACTAGGTAGCTAGGCTGAGGGGGAACCAAGAGGGAT<br>GAGGATTAATGTCCTGGGTCCTCAGGAACTTTCATTATCAACAGCACACAGGTG<br>AACTCCAGAAGAAGAAGCTATGGCCGCCGTGATCCTGGAATCCATCTTCCTGA<br>AGCGGAGCCAGCAGAAGAAGAAAACAAGCCCTCTGAACTTCAAGAAGCGGCTG<br>TTCCTGCTGACCGTGCACAAGCTGAGCTACTACGAGTACGACTTCGAGCGGGGC<br>AGAAGAGGCAGCAAGAAAGGCAGCATCGACGTGGAAAAGATCACCTGTGTGG<br>AAACCGTGGTGCCCGAGAAGAACCCTCCACCTGAGAGACAGATCCCCAGAAGG<br>GGCGAAGAGTCCAGCGAGATGGAACAGATCTCTATCATCGAGCGGTTCCCGTA<br>TCCTTTCCAAGTGGTGTACGACGAGGGCCCACTGTACGTGTTCAGCCCTACCGA<br>GGAACTGCGGAAGAGATGGATCCACCAGCTGAAGAACGTGATCCGGTACAACA<br>GCGACCTGGTGCAGAAGTATCACCCCTGCTTTTGGATCGACGGCCAGTACCTGT<br>GCTGTAGCCAGACCGCCAAGAATGCCATGGGCTGCCAGATTCTGGAAAACCGG<br>AACGGCTCTCTGAAGCCCGGCAGCAGCCACAGAAAGACCAAGAAGCCTCTGCC<br>TCCTACACCTGAAGAGGACCAGATCCTGAAGAAACCCCTGCCTCCAGAACCTGC<br>CGCTGCTCCTGTGTCTACCAGCGAGCTGAAAAAGGTGGTGGCCCTGTACGACTA<br>CATGCCCATGAACGCCAACGACCTGCAGCTGAGAAAGGGCGACGAGTACTTCA<br>TCCTGGAAGAGTCTAACCTGCCTTGGTGGCGGGCCAGAGACAAGAATGGCCAA<br>GAGGGCTACATCCCCAGCAACTACGTGACCGAGGCCGAGGACAGCATCGAGAT<br>GTACGAGTGGTACAGCAAGCACATGACCAGAAGCCAGGCCGAACAGCTGCTGA<br>AGCAAGAGGGCAAAGAAGGCGGCTTCATCGTCCGGGATTCTAGCAAGGCCGG<br>CAAGTACACCGTGTCCGTGTTCGCCAAGAGCACCGGCGATCCTCAGGGCGTGAT<br>CAGACACTACGTCGTGTGTAGCACCCCTCAGAGCCAGTACTACCTGGCCGAGAA<br>GCACCTGTTCAGCACAATCCCCGAGCTGATCAACTACCACCAGCACAACTCTGCC<br>GGCCTGATCAGCAGACTGAAGTACCCTGTGTCTCAGCAGAACAAAAACGCCCCT<br>AGCACAGCCGGCCTCGGCTATGGATCTTGGGAGATCGACCCCAAGGACCTGAC<br>CTTCCTGAAAGAACTCGGCACCGGCCAGTTCGGCGTCGTGAAGTATGGAAAT<br>GGCGGGGACAGTACGACGTGGCCATCAAGATGATCAAAGAGGGCAGCATGAG |

TABLE 1-continued

Illustrative BTK target sequences and corrective BTK donor sequences.

|  |  |
|---|---|
|  | CGAGGACGAGTTCATCGAAGAGGCCAAAGTGATGATGAACCTGAGCCACGAGA<br>AGCTGGTGCAGCTGTACGGCGTGTGTACCAAGCAGCGGCCCATCTTTATCATCA<br>CCGAGTACATGGCCAACGGCTGCCTGCTGAACTACCTGCGCGAAATGCGGCAC<br>CGGTTTCAGACACAGCAACTGCTGGAAATGTGCAAGGACGTGTGCGAGGCCAT<br>GGAATACCTGGAAAGCAAGCAGTTCCTGCACCGCGATCTGGCCGCCAGAAACT<br>GCCTGGTCAATGATCAGGGCGTTGTGAAGGTGTCCGACTTCGGCCTGAGCAGA<br>TACGTGCTGGACGATGAGTACACCAGCAGCGTGGGCAGCAAGTTTCCCGTCAG<br>ATGGTCCCCACCTGAGGTGCTGATGTACTCCAAGTTCAGCTCCAAGAGCGACAT<br>CTGGGCCTTCGGCGTTCTGATGTGGGAGATCTACAGCCTGGGCAAGATGCCCTA<br>CGAGAGATTCACCAACAGCGAGACAGCCGAGCACATTGCCCAGGGCCTGAGAC<br>TGTATAGACCTCACCTGGCCTCCGAGAAGGTGTACACAATCATGTACAGCTGTT<br>GGCACGAGGTAAGTGCTTTATTAGGATCTCTTAAATTATTTCCTTGAATCTACTT<br>GCCCATTTAGCTGGCCATTCAGCCACCAAAGACTGATAGCTGCACACATTCTTTT<br>TTTTCCTTTTTTTTTTTTAATTTGAGACAAGGTCTCGCTCTTTCACCCAGGTTG<br>GAGTACAGTGGCGCGATCTTGGCTTACTGCAACCTTCGCCTCCCAGATTCAAGC<br>GATTCTCATGTCTCAGCCTCCCAAGTAGCTGGGATTATAGGCGTGCACCACCAC<br>ACCAAGCTAATTTTTTTTTTTTTTGGTGACACAGTCTTGCTCTGTCACCCGTTC<br>TGCCAACCACTTGAACTTGTTTGGTAGCCATTTTTCACTTGAGGATCCAAAATAA<br>GAATGTGTTGTATACAGTTACATAATGAACTTGCCCTCAATTTTGATCAGTGTGA<br>TTGTCAGTTTAATTTGCAAATTGTTCTTATCACACTAATAACCTGAGTTACTAAAG<br>ATGAAAAGTGCACAAAGACTTTATGGAGAGCTGCTATTTCTTTTTTTTTTTTTT<br>CCTTTTGTAATCGACAGGGCATGCTACTGGGCATAGAGCATATATTTAATAAAC<br>ATTTGCTGCTTACTCATTGCATTTCCCTTGAATTCTGGATTCTAGCCACTCTAACA<br>CTTTACTTTTTCTTTGGTTTTAGAAGGCCGACGAGCGGCCTACCTTTAAGATCCT<br>GCTGAGCAACATCCTGGACGTGATGGACGAGGAATCCGGTGGAGGCGGTGGA<br>GGGTACCCATACGATGTTCCAGATTACGCTTATCCGTACGACGTCCCGGATTAC<br>GCTTATCCCTATGACGTGCCTGATTATGCTTGAgctcgccaataagcttcttggttctacttc<br>tcttctccacaagcccaatttcacttttctcagaggaaatcccaagcttaggagccctggagcctttgtgct<br>cccactcaatacaaaaaggcccctctctacatctgggaatgcacctcttctttgattccctgggatagtggc<br>ttctgagcaaaggccaagaaattattgtgcctgaaatttcccgagagaattaagacagactgaatttgcg<br>atgaaaatatttttaggagggaggatgtaaatagccgcacaaaggggtccaacagctctttgagtaggc<br>atttggtagagcttgggggtgtgtgtgtggggtggaccgaatttggcaagaatgaaatggtgtcataaa<br>gatgggagggagggtgttttgataaaataaaattactagaaagCATTAGATCTGTGTGTTGGT<br>TTTTTGTGTGTCCTGGGTCCTCAGGAACTTTCATTATCAACAGCACACAGGTGAA<br>CTCCAGAAAGAAGAAGCTATGGCCGCAGTGATTCTGGAGAGCATCTTTCTGAA<br>GCGATCCCAACAGAAAAAGAAAACATCACCTCTAAACTTCAAGAAGCGCCTGTT<br>TCTCTTGACCGTGCACAAACTCTCCTACTATGAGTATGACTTTGAACGTGGGGTA<br>AGTTTCTCGACTATGAAAACTGAGTTTCAAGATATCAAGGACTTGGCCTTAGATC<br>TTTCTTGGGGAAGAGGTAAATTTTCGTTGGTAGGAGGAGGGGAGTAGAATGGA<br>CCTAAGTTCTTTCAAATTCAGCAAAATATTTCCTAGCCTATAACTAGCTAAAGCC<br>GGAAAGTCAAAGGTCCTAAGAAGCCACAAGGAAAATATTACCATGGAATCTTG<br>GAATTGATGAGCACTCATTAAATGATTGTTGAAAATGAAATCGAAGAGTTGGAA<br>ATTGCTTCCTTACTTCCTATGAG |
| BTK Exon 2<br>gRNA target<br>(SEQ ID<br>NO: 8) | TGCACAAACTCTCCTACTAT |
| BTK Exon 2<br>Donor<br>(SEQ ID<br>NO: 9) | ACAGATACTTTTGCTTTTCACAGATTCTACACATATCATATAAAGGTGAATAGTG<br>TAAAGCTACCTCTACACCTTACCAAGCACACAGGTGCGTGCCATTTAACATCTAG<br>AGCATTCCATTGCCTTATACAAGAACTCAGTTTATATGAGCTCACAACATCGAAC<br>CAATCCCCCCCCAATTCAGTGTGCATCCATTATACCTGAAACCTGACAGAGCTGG<br>GGGCTGTGGGAGGAGGTTGGTAGGAAGAAATTATTTTGTGAGCTGTGCACATT<br>TTTGTTCCATTTGAAACTAGGTAGCTAGGCTGAGGGGGAACCAAGAGGGATGA<br>GGATTAATGTCCTGGGTCCTCAGGAACTTTCATTATCAACAGCACACAGGTGAA<br>CTCCAGAAAGAAGAAGCTATGGCCGCAGTGATTCTGGAGAGCATCTTTCTGAA<br>GCGATCCCAACAGAAAAAGAAAACATCACCTCTAAACTTCAAGAAGCGCCTGTT<br>TCTCTTGACCGTGCACAAGCTGAGCTACTACGAGTACGACTTCGAGCGGGGCAG<br>AAGAGGCAGCAAGAAAGGCAGCATCGACGTGGAAAAGATCACCTGTGTGGAA<br>ACCGTGGTGCCCGAGAAGAACCCTCCACCTGAGAGACAGATCCCCAGAAGGGG<br>CGAAGAGTCCAGCGAGATGGAACAGATCTCTATCATCGAGCGGTTCCCGTATCC<br>TTTCCAAGTGGTGTACGACGAGGGCCCACTGTACGTGTTCAGCCCTACCGAGGA<br>ACTGCGGAAGAGATGGATCCACCAGCTGAAGAACGTGATCCGGTACAACAGCG<br>ACCTGGTGCAGAAGTATCACCCCTGCTTTTGGATCGACGGCCAGTACCTGTGCT<br>GTAGCCAGACCGCCAAGAATGCCATGGGCTGCCAGATTCTGGAAAACCGGAAC<br>GGCTCTCTGAAGCCCGGCAGCAGCCACAGAAAGACCAAGAAGCCTCTGCCTCCT<br>ACACCTGAAGAGGACCAGATCCTGAAGAAACCCCTGCCTCCAGAACCTGCCGCT<br>GCTCCTGTGTCTACCAGCGAGCTGAAAAAGGTGGTGGCCCTGTACGACTACATG<br>CCCATGAACGCCAACGACCTGCAGCTGAGAAAGGGCGACGAGTACTTCATCCT<br>GGAAGAGTCTAACCTGCCTTGGTGGCGGGCCAGAGACAAGAATGGCCAAGAG<br>GGCTACATCCCCAGCAACTACGTGACCGAGGCCGAGGACAGCATCGAGATGTA<br>CGAGTGGTACAGCAAGCACATGACCAGAAGCCAGGCCGAACAGCTGCTGAAGC<br>AAGAGGGCAAAGAAGGCGGCTTCATCGTCCGGGATTCTAGCAAGGCCGGCAA<br>GTACACCGTGTCCGTGTTCGCCAAGAGCACCGGCGATCCTCAGGGCGTGATCA<br>GACACTACGTCGTGTGTAGCACCCCTCAGAGCCAGTACTACCTGGCCGAGAAGC<br>ACCTGTTCAGCACAATCCCCGAGCTGATCAACTACCACCAGCACAACTCTGCCG<br>GCCTGATCAGCAGACTGAAGTACCCTGTGTCTCAGCAGAACAAAAACGCCCCTA |

TABLE 1-continued

Illustrative BTK target sequences and corrective BTK donor sequences.

```
GCACAGCCGGCCTCGGCTATGGATCTTGGGAGATCGACCCCAAGGACCTGACC
TTCCTGAAAGAACTCGGCACCGGCCAGTTCGGCGTCGTGAAGTATGGAAAATG
GCGGGGACAGTACGACGTGGCCATCAAGATGATCAAAGAGGGCAGCATGAGC
GAGGACGAGTTCATCGAAGAGGCCAAAGTGATGATGAACCTGAGCCACGAGA
AGCTGGTGCAGCTGTACGGCGTGTGTACCAAGCAGCGGCCCATCTTTATCATCA
CCGAGTACATGGCCAACGGCTGCCTGCTGAACTACCTGCGCGAAATGCGGCAC
CGGTTTCAGACACAGCAACTGCTGGAAATGTGCAAGGACGTGTGCGAGGCCAT
GGAATACCTGGAAAGCAAGCAGTTCCTGCACCGCGATCTGGCCGCCAGAAACT
GCCTGGTCAATGATCAGGGCGTTGTGAAGGTGTCCGACTTCGGCCTGAGCAGA
TACGTGCTGGACGATGAGTACACCAGCAGCGTGGGCAGCAAGTTTCCCGTCAG
ATGGTCCCCACCTGAGGTGCTGATGTACTCCAAGTTCAGCTCCAAGAGCGACAT
CTGGGCCTTCGGCGTTCTGATGTGGGAGATCTACAGCCTGGGCAAGATGCCCTA
CGAGAGATTCACCAACAGCGAGACAGCCGAGCACATTGCCCAGGGCCTGAGAC
TGTATAGACCTCACCTGGCCTCCGAGAAGGTGTACACAATCATGTACAGCTGTT
GGCACGAGAAGGCCGACGAGCGGCCTACCTTTAAGATCCTGCTGAGCAACATC
CTGGACGTGATGGACGAGGAATCCGCCGCTGTGTACCCCTACGATGTGCCTGAT
TACGCCGGCTATCCTTACGACGTGCCAGACTATGCCGGCAGCTACCCCTATGAC
GTCCCCGATTATGCCCCTGCCGCTTAAgctcgccaataagcttcttggttctacttctcttctcc
acaagccccaatttcactttctcagaggaaatcccaagcttggagccctggagcctttgtgctcccactc
aatacaaaaaggcccctctctacatctgggaatgcacctcttctttgattccctgggatagtggcttctgag
caaaggccaagaaattattgtgcctgaaatttcccgagagaattaagacagactgaatttgcgatgaaa
atattttttaggagggaggatgtaaatagccgcacaaagggggtccaacagctctttgagtaggcatttggt
agagcttgggggtgtgtgtgggggtggaccgaatttggcaagaatgaaatggtgtcataaagatggg
aggggagggtgttttgataaaataaaattactagaaagCATTAGATCTGTGTGTTGGTTTTTT
GTGTGACAAACTCTCCTACTATGAGTATGACTTTGAACGTGGGGTAAGTTTCTC
GACTATGAAAACTGAGTTTCAAGATATCAAGGACTTGGCCTTAGATCTTTCTTGG
GGAAGAGGTAAATTTTCGTTGGTAGGAGGAGGGGAGTAGAATGGACCTAAGT
TCTTTCAAATTCAGCAAAATATTTCCTAGCCTATAACTAGCTAAAGCCGGAAAGT
CAAAGGTCCTAAGAAGCCACAAGGAAAATATTACCATGGAATCTTGGAATTGAT
GAGCACTCATTAAATGATTGTTGAAAATGAAATCGAAGAGTTGGAAATTGCTTC
CTTACTTCCTATGAGGAAGGTACATACAGTCATTCACTCTTCCATGGTATTTGCC
CTCCATTTGGTAGTCATAGATTTATAGATCTGGAAGGATTTTTTTTTCTTCCCCCA
CATGACAGGTCCTGGTGCCACCTCACTTTGTTGAATGATTAGATAACAAAATCTA
ATCATCTGGTTGCT
```

The targeted endonuclease facilitates integration of the corrective cDNA in the BTK gene thereby providing a corrected cell which can then be introduced back into the subject mammal.

Donor cDNA, Vectors, and Target Sites.

Corrective BTK cDNA

In certain embodiments the corrective BTK cDNA comprises all or a portion of a corrected BTK gene. In certain embodiments the cDNA donor sequence is flanked by a 5' homology arm that begins at the TALEN or CRISPR/Cas cut site and extends at least 50 bp, or at least 60 bp, or at least 70 bp, or at least 80 bp, or at least 90 bp at least 100 bp, or at least 250 bp, or at least 300 bp, or at least 400 bp, or at least 450 bp, or at least 500 bp upstream from the cut site. In certain embodiments the cDNA donor sequence is flanked by a 3' homology arm that extends at least least 50 bp, or at least 60 bp, or at least 70 bp, or at least 80 bp, or at least 90 bp at least 100 bp, or at least 250 bp, or at least 300 bp, or at least 400 bp, or at least 450 bp, or at least 500 bp downstream of the TALEN or CRISPR/Cas cut site.

Corrective cDNA Modifications and Introduction into Cells.

In certain embodiments the cDNA donor (e.g., corrective BTK cDNA) is codon-optimized/-divergent. In certain embodiments this is accomplished by using algorithms to choose the most favored codon for each amino acid. Besides increasing the amount of protein made, it also makes the incoming homologous donor less sequence identical to the endogenous gene and less likely to recombine in unwanted ways In certain embodiments the cDNA donor is modified to exclude protospacer adjacent motifs (PAMs). In certain embodiments the cDNA donor is modified by modifying a PAM sequence TGG to TAA.

In certain embodiments the donor nucleic acid is introduced into the host cell (e.g., PBSC) using a viral vector. Illustrative vectors include, but are not limited to adenoviral vectors, adeno-associated virus vectors, lentivirus vectors, vaccinia virus vectors, and RNA virus vectors (such as retroviral vectors). In certain embodiments vectors suitable for introduction of polynucleotides (e.g. nuclease-encoding polynucleotides and/or donor transgene polynucleotides) described herein include non-integrating lentivirus vectors (IDLV) (see, e.g., Ory et al. (1996) Proc. Natl. Acad. Sci. USA, 93: 11382-11388; Dull et al. (1998) J. Virol. 72: 8463-8471; Zuffery et al. (1998) J. Virol. 72: 9873-9880; Follenzi et al. (2000) Nat. Genet. 25: 217-222; U.S. Patent Publication No 2009/054985; and the like which are incorporated herein by reference for the IDLVs and methods of use thereof described therein. A number of IDLVs are also commercially available (see, e.g., TaKaRa LENTI-X™ HTX Packaging System (Integrase Deficient), and the like).

In certain embodiments the donor nucleic acid is introduced into the host cells using an adeno-associated virus (AAV). More than 30 naturally occurring serotypes of AAV are available. AAV viruses can be engineered by conventional molecular biology techniques, making it possible to optimize these particles for cell specific delivery of the desired nucleic acid sequences, for minimizing immunogenicity, for tuning stability and particle lifetime, for efficient degradation, for accurate delivery to the nucleus, etc.

The use of AAVs is a common mode of exogenous delivery of DNA as it is relatively non-toxic, provides efficient gene transfer, and can be easily optimized. Among the serotypes of AAVs isolated from human or non-human primates (NHP) and well characterized, human serotype 2 is the first AAV that was developed as a gene transfer vector. This serotype has been widely used for efficient gene transfer experiments in different target tissues and animal models. Other AAV serotypes include, but are not limited to, AAV1, AAV3, AAV4, AAV5, AAV 6, AAV7, AAV5 and AAV9 (e.g., see, e.g., WO 2005/033321 for a discussion of various AAV serotypes).

In certain embodiments the AAV comprises an AAV serotype 6, e.g., as illustrated in Example 1.

Targeted Endonucleases.

In various embodiments, targeted endonucleases (e.g., TALENs, CRISPR/Cas, Zinc Finger endonucleases, etc.) are used to insert a corrective donor cDNA into the gene (e.g., BTK) in a targeted manner. In various embodiments the targeted endonucleases can be introduced into the cell as a protein or as a nucleic acid (e.g., an mRNA, or a vector) encoding the protein. In the case of CRISPR/Cas, the endonuclease can be introduced as a single nucleic acid encoding the CRISPR/Cas endonuclease and a guide RNA, as separate nucleic acids encoding the CRISPR/Cas endonuclease and the guide protein, or as a ribonucleoprotein (RNP) complex comprising the CRISPR/Cas endonuclease and the guide RNA (gRNA). In certain embodiments the ribonucleoprotein (RNP) complex comprises the CRISPR/Cas endonuclease conjugated to the guide RNA (gRNA).

Methods of introducing targeted endonucleases (and guide RNAs when required) into the cells (transecting the cells) are well known to those of skill in the art. Such methods include, but are not limited to electroporation, sonoporation, cell squeezing, optical transfection, impalefection, and the like. Electroporation is a particularly suitable method (see, e.g., Example 1) where transient increase in the permeability of cell membrane is achieved when the cells are exposed to short pulses of an intense electric field. Cell squeezing enables delivery of molecules into cells via cell membrane deformation. It is a high throughput vector-free microfluidic platform for intracellular delivery. It reduces the possibility of toxicity or off-target effects as it does not rely on exogenous materials or electrical fields (e.g., Sharei et al. (2013) *Proc. Natl. Acad. Sci. USA,* 110 (6): 2082-2087). Sonoporation uses high-intensity ultrasound to induce pore formation in cell membranes. Optical transfection is a method where a tiny (~1 µm diameter) hole is transiently generated in the plasma membrane of a cell using a highly focused laser (see, e.g., Tsukakoshi et al. (1984) *Appl. Physics B: Photophysics and Laser Chem.* 35 (3): 135-140). Impalefection is a method of introducing a nucleic acid bound to a surface of a nanofiber that is inserted into a cell. This approach can also be implemented with arrays of nanofibers that are introduced into large numbers of cells and intact tissue.

Illustrative, but non-limiting, chemical-based transfection methods include, but are not limited to, calcium phosphate, transfection, dendrimers-based transfection, the use of cationic polymers (e.g., DEAE-dextran or polyethyleneimine (PEI)), lipofection (e.g., using a positively charged (cationic) lipid or cationic liposomes, or mixtures thereof), or a non-liposomal transfection reagent such as FUGENE®.

Illustrative, but non-limiting, particle-based transfection methods include, but are not limited to the gene gun, where the DNA is coupled to a nanoparticle of an inert solid (commonly gold), which is then "shot" directly into the target cell's nucleus, magnetofection, or magnet-assisted transfection, where magnetic force is used to deliver nucleic acids into target cells, and the like.

These methods of introducing the endonuclease, and/or nucleic acid encoding an endonuclease, and/or a gRNA (where required) are illustrative and non-limiting. Using the teachings provided herein, numerous other approaches will be available to one of skill in the art.

TALENs

In certain embodiments the targeting endonuclease can be a Transcription

Activator-Like Effector Nuclease (TALEN). TAL effector nucleases are a class of sequence-specific nucleases derived from *Xanthomonas* bacteria, that can be used to make double-strand breaks at specific target sequences in the genome of a prokaryotic or eukaryotic organism. The DNA binding domain of the TAL effector contains a repeated, highly conserved 33-34 amino acid sequence, with the exception of the 12th and 13th amino acids. These two positions are highly variable, showing a strong correlation with specific nucleotide recognition. They can thus be engineered to bind to a desired DNA sequence.

TAL effector nucleases are created by fusing a native or engineered transcription activator-like (TAL) effector, or functional part thereof, to the catalytic domain of an endonuclease, such as, for example, FokI. The unique, modular TAL effector DNA binding domain allows for the design of proteins with potentially any given DNA recognition specificity. Thus, the DNA binding domains of the TAL effector nucleases can be engineered to recognize specific DNA target sites and thus, used to make double-strand breaks at desired target sequences (see, e.g., WO 2010/079430; Morbitzer et al. (2010) *Proc. Natl. Acad. Sci. USA,* 107(50): 21617-21622; Scholze & Boch (2010) *Virulence,* 1: 428-432; Christian et al. (2010) *Genetics,* 186:757-761; Li et al. (2010) *Nucl. Acids Res.* (1):359-372; and Miller et al. (2011) *Nat. Biotechl.* 29: 143-148).

To produce a TALEN, a TAL protein is fused to a nuclease, which is typically a wild-type or mutated FokI endonuclease. Several mutations to FokI have been made for its use in TALENs. These, for example, improve cleavage specificity or activity (see, e.g., Cermak et al. (2011) *Nucl. Acids Res.* 39: e82; Miller et al. (2011) *Nat. Biotech.* 29: 143-148; Hockemeyer et al. (2011) *Nat. Biotech.* 29: 731-734; Wood et al. (2011) *Science,* 333: 307; Doyon et al. (2010) *Nat. Meth.* 8: 74-79; Szczepek et al. (2007) *Nat. Biotech.* 25: 786-793; and Guo et al. (2010) *J Mol. Biol.* 200: 96).

The FokI domain functions as a dimer, typically requiring two constructs with unique DNA binding domains for sites in the target genome with proper orientation and spacing. Both the number of amino acid residues between the TALE DNA binding domain and the FokI cleavage domain and the number of bases between the two individual TALEN binding sites appear to be important parameters for achieving high levels of activity (see, e.g., Miller et al. (2011) *Nat. Biotech.,* 29: 143-148).

Examples of suitable TAL nucleases, and methods for preparing suitable TAL nucleases, are disclosed, e.g., in US Patent Application Nos. 2011/0239315 A1, 2011/0269234 A1, 2011/0145940 A1, 2003/0232410 A1, 2005/0208489 A1, 2005/0026157 A1, 2005/0064474 A1, 2006/0188987 A1, and 2006/0063231 A1. In various embodiments, TAL effector nucleases are engineered that cut in or near a target nucleic acid sequence in, e.g., a genomic locus of interest (e.g., in the BTK gene), where the target nucleic acid sequence is at or near a sequence to be modified by a targeting vector (e.g., BTK gene). The TAL nucleases suitable for use with the various methods and compositions provided herein include those that are specifically designed to bind at or near target nucleic acid sequences to be modified by targeting vectors as described herein (e.g., in BTK exon 1, BTK intron 1, or BTK exon 2).

In one illustrative, but non-limiting embodiment, each monomer of the TALEN comprises 10 or more DNA binding repeats, and in some cases 15 or more DNA binding repeats (e.g., in certain embodiments, 12-25 TAL repeats), wherein each TAL repeat binds a 1 bp subsite. In one embodiment, the nuclease agent is a chimeric protein comprising a TAL repeat-based DNA binding domain operably linked to an independent nuclease. In one embodiment, the independent nuclease is a FokI endonuclease (see e.g., Kim et al. (1996) Proc. Natl. Acad. Sci. USA, 93:1156-1160), however, other useful endonucleases may include, but are not limited to, for example, HhaI, HindIII, Nod, BbvCI, EcoRI, BglI, and AlwI.

In some embodiments, the TAL effector domain that binds to a specific nucleotide sequence within the target DNA (e.g., BTK gene) comprises a plurality of repeat variable-diresidues (RVD) each of which determines recognition of a base pair in the target DNA sequence, where each DNA binding repeat is responsible for recognizing one base pair in the target DNA sequence, and wherein the RVD comprises one or more of: HD for recognizing C; NG for recognizing T; NI for recognizing A; NN for recognizing G or A; NS for recognizing A or C or G or T; N* for recognizing C or T, where * represents a gap in the second position of the RVD; HG for recognizing T; H* for recognizing T, where * represents a gap in the second position of the RVD; IG for recognizing T; NK for recognizing G; HA for recognizing C; ND for recognizing C; HI for recognizing C; HN for recognizing G; NA for recognizing G; SN for recognizing G or A; and YG for recognizing T.

If the genome editing endonuclease to be utilized is a TALEN, in some embodiments, optimal target sites may be selected in accordance with the methods described by Sanjana et al. (2012) Nat. Protocol., 7: 171-192, which is hereby incorporated by reference in its entirety. In brief, in various embodiments, TALENs function as dimers, and a pair of TALENs, referred to as the left and right TALENs, target sequences on opposite strands of DNA. TALENs can be engineered as a fusion of the TALE DNA-binding domain and a monomeric FokI catalytic domain. In certain embodiments to facilitate FokI dimerization, the left and right TALEN target sites can be chosen with a spacing of approximately 14-20 bases. Therefore, for a pair of TALENs, each targeting 20-bp sequences, an optimal target site can have the form 5'-TN$^{19}$N$^{14-20}$N$^{19}$ A-3', where the left TALEN targets 5'-TN$^{19}$-3' and the right TALEN targets the antisense strand of 5'-N$^{19}$A-3' (N=A, G, T or C). This is of course illustrative and non-limiting and examples of TALENs that bind the BTK gene are illustrated in Example 1). For more information on TALENs, refer to U.S. Pat. No. 8,685,737, which is hereby incorporated by reference in its entirety. It is noted, however, that the TALENs described therein are illustrative and non-limiting and, using the teachings provided herein other TALEN pairs can readily be utilized by one of skill in the art.

CRISPR/Cas Systems.

In certain embodiments the targeting endonuclease can comprise a CRISPR/Cas endonuclease which is typically guided to a target site by one or more guide RNAs (gRNAs). CRISPR-based endonucleases are RNA-guided endonucleases derived from CRISPR/Cas systems. Bacteria and archaea have evolved an RNA-based adaptive immune system that uses CRISPR (clustered regularly interspersed short palindromic repeat) and Cas (CRISPR-associated) proteins to detect and destroy invading viruses or plasmids. CRISPR/Cas endonucleases can be programmed to introduce targeted site-specific double-strand breaks by providing target-specific synthetic guide RNAs (see, e.g., Jinek et al. (2012) Science, 337: 816-821).

In various embodiments the CRISPR-based endonuclease can be derived from a CRISPR/Cas type I, type II, type III, type V, or type VI system. Non-limiting examples of suitable CRISPR/Cas proteins include Cas3, Cas4, Cas5, Cas5e (or CasD), Cas6, Cas6e, Cas6f, Cas7, Cas8a1, Cas8a2, Cas8b, Cas8c, Cas9, Cas10, Cas10d, CasF, CasG, CasH, Csy1, Csy2, Csy3, Cse1 (or CasA), Cse2 (or CasB), Cse3 (or CasE), Cse4 (or CasC), Csc1, Csc2, Csa5, Csn2, Csm2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csz1, Csx15, Csf1, Csf2, Csf3, Csf4, and Cu1966.

Type II CRISPR/Cas Endonucleases (e.g., Cas 9)

In certain embodiments, the CRISPR-based endonuclease is derived from a type II CRISPR/Cas system. In illustrative, but non-limiting embodiments, the CRISPR-based endonuclease is derived from a Cas9 protein. In certain embodiments the Cas9 protein can be from *Streptococcus pyogenes, Streptococcus thermophilus, Streptococcus sp., Nocardiopsis dassonvillei, Streptomyces pristinaespiralis, Streptomyces viridochromogenes, Streptomyces viridochromogenes, Streptosporangium roseum, Streptosporangium roseum, Alicyclobacillus acidocaldarius, Bacillus pseudomycoides, Bacillus selenitireducens, Exiguobacterium sibiricum, Lactobacillus delbrueckii, Lactobacillus salivarius, Microscilla marina, Burkholderiales bacterium, Polaromonas naphthalenivorans, Polaromonas sp., Crocosphaera watsonii, Cyanothece sp., Microcystis aeruginosa, Synechococcus sp., Acetohalobium arabaticum, Ammonifex degensii, Caldicellulosiruptor becscii, Candidatus Desulforudis, Clostridium botulinum, Clostridium difficile, Finegoldia magna, Natranaerobius thermophilus, Pelotomaculum thermopropionicum, Acidithiobacillus caldus, Acidithiobacillus ferrooxidans, Allochromatium vinosum, Marinobacter sp., Nitrosococcus halophilus, Nitrosococcus watsoni, Pseudoalteromonas haloplanktis, Ktedonobacter racemifer, Methanohalobium evestigatum, Anabaena variabilis, Nodularia spumigena, Nostoc sp., Arthrospira maxima, Arthrospira platensis, Arthrospira sp., Lyngbya sp., Microcoleus chthonoplastes, Oscillatoria sp., Petrotoga mobilis, Thermosipho africanus,* or *Acaryochloris marina.* In one specific illustrative embodiment, the CRISPR-based nuclease is derived from a Cas9 protein from *Streptococcus pyogenes.*

In general, CRISPR/Cas proteins comprise at least one RNA recognition and/or RNA binding domain. RNA recognition and/or RNA binding domains interact with the guide RNA such that the CRISPR/Cas protein is directed to a specific genomic or genomic sequence. CRISPR/Cas proteins can also comprise nuclease domains (i.e., DNase or RNase domains), DNA binding domains, helicase domains, protein-protein interaction domains, dimerization domains, as well as other domains.

The CRISPR-based endonuclease used herein can be a wild type CRISPR/Cas protein, a modified CRISPR/Cas protein, or a fragment of a wild type or modified CRISPR/Cas protein. In certain embodiments the CRISPR/Cas protein can be modified to increase nucleic acid binding affinity and/or specificity, alter an enzymatic activity, and/or change another property of the protein. For example, the CRISPR/Cas protein can be truncated to remove domains that are not essential for the function of the protein. The CRISPR/Cas protein also can be truncated or modified to optimize the activity of the protein or an effector domain fused with the CRISPR/Cas protein.

In some embodiments, the CRISPR-based endonuclease can be derived from a wild type Cas9 protein or fragment thereof. In other embodiments, the CRISPR-based endonuclease can be derived from a modified Cas9 protein. For example, the amino acid sequence of the Cas9 protein can be modified to alter one or more properties (e.g., nuclease activity, affinity, stability, etc.) of the protein. Alternatively, domains of the Cas9 protein not involved in RNA-guided cleavage can be eliminated from the protein such that the modified Cas9 protein is smaller than the wild type Cas9 protein.

In general, a Cas9 protein comprises at least two nuclease (i.e., DNase) domains. For example, a Cas9 protein can comprise a RuvC-like nuclease domain and a HNH-like nuclease domain. The RuvC and HNH domains work together to cut single strands to make a double-strand break in DNA (see, e.g., Jinek et al. (2012) Science, 337: 816-821). In one embodiment, the CRISPR-based endonuclease is derived from a Cas9 protein and comprises two function nuclease domains, which together introduce a double-stranded break into the targeted site.

The target sites recognized by naturally occurring CRISPR/Cas systems typically having lengths of about 14-15 bp (see, e.g., Cong et al. (2013) Science, 339: 819-823). The target site has no sequence limitation except that sequence complementary to the 5' end of the guide RNA (i.e., called a protospacer sequence) is typically immediately followed by (3' or downstream) a consensus sequence. This consensus sequence is also known as a protospacer adjacent motif (or PAM). Examples of PAM include, but are not limited to, NGG, NGGNG, and NNAGAAW (wherein N is defined as any nucleotide and W is defined as either A or T). At the typical length, only about 5-7% of the target sites would be unique within a target genome, indicating that off target effects could be significant. The length of the target site can be expanded by requiring two binding events. For example, CRISPR-based endonucleases can be modified such that they can only cleave one strand of a double-stranded sequence (i.e., converted to nickases). Thus, the use of a CRISPR-based nickase in combination with two different guide RNAs would essentially double the length of the target site, while still effecting a double stranded break.

The requirement of the crRNA-tracrRNA complex in a CRISPR/Cas system can be avoided by use of an engineered "single-guide RNA" (sgRNA) that comprises the hairpin normally formed by the annealing of the crRNA and the tracrRNA (see Jinek et al. (2012) Science 337:816; Cong et al. (2013) Sciencexpress/10.1126/science.1231143). In *S. pyrogenes*, the engineered tracrRNA:crRNA fusion, or the sgRNA, guides Cas9 to cleave the target DNA when a double strand RNA:DNA heterodimer forms between the Cas associated RNAs and the target DNA. This system comprising the Cas9 protein and an engineered sgRNA containing a PAM sequence has been used for RNA guided genome editing and has been useful for zebrafish embryo genomic editing in vivo (see Hwang et al. (2013) *Nat. Biotechnol.*, 31(3):227) with editing efficiencies similar to ZFNs and TALENs.

Accordingly in certain embodiments, a CRISPR/Cas endonuclease complex used in the methods described herein comprises a Cas protein and at least one to two ribonucleic acids (e.g., gRNAs) that are capable of directing the Cas protein to and hybridizing to a target motif of a target polynucleotide sequence. In some embodiments, a CRISPR/Cas endonuclease complex used in the methods described herein comprises a Cas protein and one ribonucleic acid (e.g., gRNA) that us capable of directing the Cas protein to and hybridizing to a target motif of a target polynucleotide sequence.

As used herein, "protein" and "polypeptide" are used interchangeably to refer to a series of amino acid residues joined by peptide bonds (i.e., a polymer of amino acids) and include modified amino acids (e.g., phosphorylated, glycated, glycosolated, etc.) and amino acid analogs. Illustrative polypeptides or proteins include gene products, naturally occurring proteins, homologs, paralogs, fragments and other equivalents, variants, and analogs of the above.

In some embodiments, a Cas protein comprises a core Cas protein. Illustrative Cas core proteins include, but are not limited to, Cas1, Cas2, Cas3, Cas4, Cas5, Cas6, Cas7, Cas8 and Cas9. In some embodiments, a Cas protein comprises a Cas protein of an *E. coli* subtype (also known as CASS2). Illustrative Cas proteins of the *E. Coli* subtype include, but are not limited to Cse1, Cse2, Cse3, Cse4, and Cas5e. In some embodiments, a Cas protein comprises a Cas protein of the Ypest subtype (also known as CASS3). Illustrative Cas proteins of the Ypest subtype include, but are not limited to Csy1, Csy2, Csy3, and Csy4. In some embodiments, a Cas protein comprises a Cas protein of the Nmeni subtype (also known as CASS4). Illustrative Cas proteins of the Nmeni subtype include, but are not limited to Csn1 and Csn2. In some embodiments, a Cas protein comprises a Cas protein of the Dvulg subtype (also known as CASS1). Illustrative Cas proteins of the Dvulg subtype include Csd1, Csd2, and Cas5d. In some embodiments, a Cas protein comprises a Cas protein of the Tneap subtype (also known as CASS7). Illustrative Cas proteins of the Tneap subtype include, but are not limited to, Cst1, Cst2, Cas5t. In some embodiments, a Cas protein comprises a Cas protein of the Hmari subtype. Illustrative Cas proteins of the Hmari subtype include, but are not limited to Csh1, Csh2, and Cas5h. In some embodiments, a Cas protein comprises a Cas protein of the Apern subtype (also known as CASS5). Illustrative Cas proteins of the Apern subtype include, but are not limited to Csa1, Csa2, Csa3, Csa4, Csa5, and Cas5a. In some embodiments, a Cas protein comprises a Cas protein of the Mtube subtype (also known as CASS6). Illustrative Cas proteins of the Mtube subtype include, but are not limited to Csm1, Csm2, Csm3, Csm4, and Csm5. In some embodiments, a Cas protein comprises a RAMP module Cas protein. Illustrative RAMP module Cas proteins include, but are not limited to, Cmr1, Cmr2, Cmr3, Cmr4, Cmr5, and Cmr6.

In some embodiments, the Cas protein is a *Streptococcus pyogenes* Cas9 protein (spCas9) or a functional portion thereof (see, e.g., UniProtKB—Q99ZW2 (CAS9_STRP1)). In some embodiments, the Cas protein is a *Staphylococcus aureus* Cas9 protein (saCas9) or a functional portion thereof. In some embodiments, the Cas protein is a *Streptococcus thermophilus* Cas9 protein (stCas9) or a functional portion thereof. In some embodiments, the Cas protein is a *Neisseria meningitides* Cas9 protein (nmCas9) or a functional portion thereof. In some embodiments, the Cas protein is a *Treponema denticola* Cas9 protein (tdCas9) or a functional portion thereof. In some embodiments, the Cas protein is Cas9 protein from any other bacterial species or functional portion thereof.

Type V and Type VI CRISPR/Cas Endonucleases

In certain embodiments the CRISPR/Cas endonuclease systems contemplated herein include, but are not limited to a type V or type VI CRISPR/Cas endonuclease (e.g., the genome editing endonuclease is a type V or type VI CRISPR/Cas endonuclease) (e.g., Cpf1, C2c1, C2c2, C2c3). Type V and type VI CRISPR/Cas endonucleases are a type of class 2 CRISPR/Cas endonuclease. Examples of type V CRISPR/Cas endonucleases include but are not limited to: Cpf1, C2c1, and C2c3. An example of a type VI CRISPR/Cas endonuclease is C2c2. In some cases, a subject genome targeting composition includes a type V CRISPR/Cas endonuclease (e.g., Cpf1, C2c1, C2c3). In some cases, a Type V CRISPR/Cas endonuclease is a Cpf1 protein. In some cases, a subject genome targeting composition includes a type VI CRISPR/Cas endonuclease (e.g., C2c2)

Like type II CRISPR/Cas endonucleases, type V and VI CRISPR/Cas endonucleases form a complex with a corresponding guide RNA. The guide RNA provides target specificity to an endonuclease-guide RNA RNP complex by having a nucleotide sequence (a guide sequence) that is complementary to a sequence (the target site) of a target nucleic acid (as described elsewhere herein). The endonuclease of the complex provides the site-specific activity. In other words, the endonuclease is guided to a target site (e.g., stabilized at a target site) within a target nucleic acid sequence (e.g., a chromosomal sequence) by virtue of its association with the protein-binding segment of the guide RNA.

Examples and guidance related to type V and type VI CRISPR/Cas proteins (e.g., cpf1, C2c1, C2c2, and C2c3 guide RNAs) can be found in the art (see, e.g., Zetsche et al. (2015) *Cell*, 163(3):759-771; Makarova et al. (2015) *Nat. Rev. Microbiol*. 13(11): 722-736; Shmakov et al. (2015) *Mol. Cell*, 60(3):385-397; and the like).

In some cases, the Type V or type VI CRISPR/Cas endonuclease (e.g., Cpf1, C2c1, C2c2, C2c3) is enzymatically active, e.g., the Type V or type VI CRISPR/Cas polypeptide, when bound to a guide RNA, and cleaves a target nucleic acid. In some cases, the Type V or type VI CRISPR/Cas endonuclease (e.g., Cpf1, C2c1, C2c2, C2c3) exhibits reduced enzymatic activity relative to a corresponding wild-type a Type V or type VI CRISPR/Cas endonuclease (e.g., Cpf1, C2c1, C2c2, C2c3), and retains DNA binding activity.

In some cases a type V CRISPR/Cas endonuclease is a Cpf1 protein or a functional portion thereof (see, e.g., UniProtKB—A0Q7Q2 (CPF1_FRATN)). Cpf1 protein is a member of the type V CRISPR system and is a polypeptide comprising about 1300 amino acids. Cpf1 contains a RuvC-like endonuclease domain. Unlike Cas9, Cpf1 cleaves target DNA in a staggered pattern using a single ribonuclease domain. The staggered DNA double-stranded break results in a 4 or 5-nt 5' overhang.

The CRISPR-Cpf1 system, identified in *Francisella* spp, is a class 2 CRISPR-Cas system that mediates robust DNA interference in human cells. Although functionally conserved, Cpf1 and Cas9 differ in many aspects including in their guide RNAs and substrate specificity (see, e.g., Fagerlund et al. (2015) *Genom. Bio.* 16: 251). A major difference between Cas9 and Cpf1 proteins is that Cpf1 does not utilize tracrRNA, and thus requires only a crRNA. The FnCpf1 crRNAs are 42-44 nucleotides long (19-nucleotide repeat and 23-25-nucleotide spacer) and contain a single stem-loop, which tolerates sequence changes that retain secondary structure. In addition, the Cpf1 crRNAs are significantly shorter than the ~100-nucleotide engineered sgRNAs required by Cas9, and the PAM requirements for FnCpf1 are 5'-TTN-3' and 5'-CTA-3' on the displaced strand. Although both Cas9 and Cpf1 make double strand breaks in the target DNA, Cas9 uses its RuvC- and HNH-like domains to make blunt-ended cuts within the seed sequence of the guide RNA, whereas Cpf1 uses a RuvC-like domain to produce staggered cuts outside of the seed. Because Cpf1 makes staggered cuts away from the critical seed region, NHEJ will not disrupt the target site, therefore ensuring that Cpf1 can continue to cut the same site until the desired HDR recombination event has taken place. Thus, in the methods and compositions described herein, it is understood that the term "Cas" includes both Cas9 and Cfp1 proteins.

Accordingly, as used herein, a "CRISPR/Cas system" refers both CRISPR/Cas and/or CRISPR/Cfp1 systems, including both nuclease and/or transcription factor systems. Accordingly, in certain embodiments the methods described herein the Cas protein is Cpf1 from any bacterial species or functional portion thereof. In some aspects, Cpf1 is a *Francisella novicida* U112 protein or a functional portion thereof. In some aspects, Cpf1 is a Acidaminococcus sp. BV3L6 protein or a functional portion thereof. In some aspects, Cpf1 is a Lachnospiraceae bacterium ND2006 protein or a function portion thereof.

In certain embodiments, Cas protein may be a "functional portion" or "functional derivative" of a naturally occurring Cas protein, or of a modified Cas protein. A "functional derivative" of a native sequence polypeptide is a compound having a qualitative biological property in common with a native sequence polypeptide. "Functional derivatives" include, but are not limited to, fragments of a native sequence and derivatives of a native sequence polypeptide and its fragments, provided that they have a biological activity (e.g., endonuclease activity) in common with a corresponding native sequence polypeptide. As used herein, "functional portion" refers to a portion of a Cas polypeptide that retains its ability to complex with at least one ribonucleic acid (e.g., guide RNA (gRNA)) and cleave a target polynucleotide sequence. In some embodiments, the functional portion comprises a combination of operably linked Cas9 protein functional domains selected from the group consisting of a DNA binding domain, at least one RNA binding domain, a helicase domain, and an endonuclease domain. In some embodiments, the functional portion comprises a combination of operably linked Cpf1 protein functional domains selected from the group consisting of a DNA binding domain, at least one RNA binding domain, a helicase domain, and an endonuclease domain. In some embodiments, the functional domains form a complex. In some embodiments, a functional portion of the Cas9 protein comprises a functional portion of a RuvC-like domain. In some embodiments, a functional portion of the Cas9 protein comprises a functional portion of the HNH nuclease domain. In some embodiments, a functional portion of the Cpf1 protein comprises a functional portion of a RuvC-like domain.

In certain embodiments a biological activity contemplated herein is the ability of the functional derivative to to introduce a double strand break (DSB) at a desired target site in a genomic DNA. The term "derivative" encompasses both amino acid sequence variants of polypeptide, covalent modifications, and fusions thereof. In some aspects, a functional derivative may comprise a single biological property of a naturally occurring Cas protein. In other aspects, a function derivative may comprise a subset of biological properties of a naturally occurring Cas protein.

In view of the foregoing, the term "Cas polypeptide" as used herein encompasses a full-length Cas polypeptide, an enzymatically active fragment of a Cas polypeptide, and enzymatically active derivatives of a Cas polypeptide or fragment thereof. Suitable derivatives of a Cas polypeptide or a fragment thereof include but are not limited to mutants, fusions, covalent modifications of Cas protein or a fragment thereof. Cas protein, which includes Cas protein or a fragment thereof, as well as derivatives of Cas protein or a fragment thereof, may be obtainable from a cell or synthesized chemically, recombinantly expressed, or by a combination of these procedures. The cell may be a cell that naturally produces Cas protein, or a cell that naturally produces Cas protein and is genetically engineered to produce the endogenous Cas protein at a higher expression level or to produce a Cas protein from an exogenously introduced nucleic acid, which nucleic acid encodes a Cas that is same or different from the endogenous Cas. In some case, the cell does not naturally produce Cas protein and is genetically engineered to produce a Cas protein.

In some embodiments, a Cas protein comprises one or more amino acid substitutions or modifications. In some embodiments, the one or more amino acid substitutions comprises a conservative amino acid substitution. In some instances, substitutions and/or modifications can prevent or reduce proteolytic degradation and/or extend the half-life of the polypeptide in a cell. In some embodiments, the Cas protein can comprise a peptide bond replacement (e.g., urea, thiourea, carbamate, sulfonyl urea, etc.). In some embodiments, the Cas protein can comprise a naturally occurring amino acid. In some embodiments, the Cas protein can comprise an alternative amino acid (e.g., D-amino acids, beta-amino acids, homocysteine, phosphoserine, etc.). In some embodiments, a Cas protein can comprise a modification to include a moiety (e.g., PEGylation, glycosylation, lipidation, acetylation, end-capping, etc.).

In certain embodiments the Cas proteins used in the constructs described herein may be mutated to alter functionality. Illustrative selection methods, including phage display and two-hybrid systems, are disclosed in U.S. Pat. Nos. 5,789,538; 5,925,523; 6,007,988; 6,013,453; 6,410,248; 6,140,466; 6,200,759; and 6,242,568; as well as WO 98/37186; WO 98/53057; WO 00/27878; WO 01/88197 and GB 2,338,237. In addition, enhancement of binding specificity for zinc finger binding domains has been described, for example, in WO 02/077227.

In certain embodiments the Cas proteins (e.g., Cas9 protein) comprise truncated Cas proteins. In one illustrative, but non-limiting, embodiment, the Cas9 comprises only the domain responsible for interaction with the crRNA or sgRNA and the target DNA.

In certain embodiments the Cas proteins comprising the constructs described herein comprise a Cas protein, or truncation thereof, fused to a different functional domain. In some aspects, the functional domain is an activation or a repression domain. In other aspects, the functional domain is a nuclease domain. In some embodiments, the nuclease domain is a FokI endonuclease domain (see, e.g. Tsai (2014) Nat. Biotechnol. doi:10.1038/nbt.2908). In some embodiments, the FokI domain comprises mutations in the dimerization domain.

Guide RNA (for CRISPR/Cas Endonucleases)

In various embodiments the constructs methods described herein involve the introduction into the desired cell(s) of one or more guide RNAs (gRNAs) along with the CRISPR/Cas endonuclease. In certain embodiments the CRISPR/Cas endonuclease and gRNA are encoded by a single nucleic acid that is introduced into the cell. In certain embodiments the CRISPR/Cas endonuclease and gRNA are introduced into the cell as a ribonucleoprotein complex. In certain embodiments the complex comprise a Cas protein attached to a single guide RNA.

A nucleic acid molecule that binds to a class 2 CRISPR/Cas endonuclease (e.g., a Cas9 protein; a type V or type VI CRISPR/Cas protein; a Cpf1 protein; etc.) and targets the complex to a specific location within a target nucleic acid is referred to herein as a "guide RNA" or "CRISPR/Cas guide nucleic acid" or "CRISPR/Cas guide RNA."

In various embodiments the guide RNA provides target specificity to the complex (the RNP complex) by including a targeting segment, which includes a guide sequence (also referred to herein as a targeting sequence), which typically comprise a nucleotide sequence that is complementary to a sequence of a target nucleic acid A guide RNA can be referred to by the protein to which it corresponds. For example, when the class 2 CRISPR/Cas endonuclease is a Cas9 protein, the corresponding guide RNA can be referred to as a "Cas9 guide RNA." Likewise, as another example, when the class 2 CRISPR/Cas endonuclease is a Cpf1 protein, the corresponding guide RNA can be referred to as a "Cpf1 guide RNA."

In some embodiments, a guide RNA includes two separate nucleic acid molecules (or two sequenced within a single molecule): an "activator" and a "targeter" and is referred to herein as a "dual guide RNA", a "double-molecule guide RNA", a "two-molecule guide RNA", or a "dgRNA." In some embodiments, the guide RNA is one molecule (e.g., for some class 2 CRISPR/Cas proteins, the corresponding guide RNA is a single molecule; and in some cases, an activator and targeter are covalently linked to one another, e.g., via intervening nucleotides), and the guide RNA is referred to as a "single guide RNA", a "single-molecule guide RNA," a "one-molecule guide RNA", or simply "sgRNA."

Cas9 Guide RNA

A nucleic acid molecule that binds to a Cas9 protein and targets the complex to a specific location (e.g., BTK gene) within a target nucleic acid is referred to herein as a "Cas9 guide RNA." In certain embodiments a Cas9 guide RNA (can be said to include two segments, a first segment (referred to herein as a "targeting segment"); and a second segment (referred to herein as a "protein-binding segment"). By "segment" it is meant a segment/section/region of a molecule, e.g., a contiguous stretch of nucleotides in a nucleic acid molecule. A segment can also mean a region/section of a complex such that a segment may comprise regions of more than one molecule.

In various embodiments the first segment (targeting segment) of a Cas9 guide RNA typically includes a nucleotide sequence (a guide sequence) that is complementary to (and therefore hybridizes with) a specific sequence (a target site) within a target nucleic acid (e.g., a target ssRNA, a target ssDNA, the complementary strand of a double stranded target DNA, etc.). The protein-binding segment (or "protein-binding sequence") interacts with (binds to) a Cas9 polypeptide. The protein-binding segment of a subject Cas9 guide RNA typically includes two complementary stretches of nucleotides that hybridize to one another to form a double stranded RNA duplex (dsRNA duplex). Site-specific binding and/or cleavage of a target nucleic acid (e.g., genomic DNA) can occur at locations (e.g., target sequence of a target locus) determined by base-pairing complementarity between the Cas9 guide RNA (the guide sequence of the Cas9 guide RNA) and the target nucleic acid A Cas9 guide RNA and a Cas9 protein form a complex (e.g., bind via non-covalent interactions). The Cas9 guide RNA provides target specificity to the complex by including a targeting segment, which includes a guide sequence (a nucleotide sequence that is complementary to a sequence of a target nucleic acid). The Cas9 protein of the complex provides the site-specific activity (e.g., cleavage activity or an activity provided by the Cas9 protein when the Cas9 protein is a Cas9 fusion polypeptide, i.e., has a fusion partner). In other words, the Cas9 protein is guided to a target nucleic acid sequence (e.g., a target sequence in a chromosomal nucleic acid, e.g., a chromosome; a target sequence in an extrachromosomal nucleic acid, e.g., an episomal nucleic acid, a minicircle, an ssRNA, an ssDNA, etc.; a target sequence in a mitochondrial nucleic acid; a target sequence in a chloroplast nucleic acid; a target sequence in a plasmid; a target sequence in a viral nucleic acid; etc.) by virtue of its association with the Cas9 guide RNA.

The "guide sequence" also referred to as the "targeting sequence" of a Cas9 guide RNA can be modified so that the Cas9 guide RNA can target a Cas9 protein to any desired sequence of any desired target nucleic acid, with the exception that the protospacer adjacent motif (PAM) sequence can be taken into account. Thus, for example, a Cas9 guide RNA can have a targeting segment with a sequence (a guide sequence) that has complementarity with (e.g., can hybridize to) a sequence in a nucleic acid in a eukaryotic cell, e.g., a viral nucleic acid, a eukaryotic nucleic acid (e.g., a eukaryotic chromosome, chromosomal sequence, a eukaryotic RNA, etc.), and the like.

In some embodiments, a Cas9 guide RNA includes two separate nucleic acid molecules: an "activator" and a "targeter" and is referred to herein as a "dual Cas9 guide RNA", a "double-molecule Cas9 guide RNA", or a "two-molecule Cas9 guide RNA" a "dual guide RNA", or a "dgRNA." In some embodiments, the activator and targeter are covalently linked to one another (e.g., via intervening nucleotides) and the guide RNA is referred to as a "single guide RNA", a "Cas9 single guide RNA", a "single-molecule Cas9 guide RNA," or a "one-molecule Cas9 guide RNA", or simply "sgRNA."

In various embodiments a Cas9 guide RNA comprises a crRNA-like ("CRISPR RNA"/"targeter"/"crRNA"/"crRNA repeat") molecule and a corresponding tracrRNA-like ("trans-acting CRISPR RNA"/"activator"/"tracrRNA") molecule. A crRNA-like molecule (targeter) typically comprises both the targeting segment (single stranded) of the Cas9 guide RNA and a stretch ("duplex-forming segment") of nucleotides that forms one half of the dsRNA duplex of the protein-binding segment of the Cas9 guide RNA. A corresponding tracrRNA-like molecule (activator/tracrRNA) typically comprises a stretch of nucleotides (duplex-forming segment) that forms the other half of the dsRNA duplex of the protein-binding segment of the guide nucleic acid. In other words, a stretch of nucleotides of a crRNA-like molecule are complementary to and hybridize with a stretch of nucleotides of a tracrRNA-like molecule to form the dsRNA duplex of the protein-binding domain of the Cas9 guide RNA. As such, each targeter molecule can be said to have a corresponding activator molecule (which has a region that hybridizes with the targeter). In various embodiments the targeter molecule additionally provides the targeting segment. Thus, in various embodiments, a targeter and an activator molecule (as a corresponding pair) can hybridize to form a Cas9 guide RNA. The exact sequence of a given crRNA or tracrRNA molecule is characteristic of the species in which the RNA molecules are found. A subject dual Cas9 guide RNA can include any corresponding activator and targeter pair.

The term "activator" or "activator RNA" is used herein to mean a tracrRNA-like molecule (tracrRNA: "trans-acting CRISPR RNA") of a Cas9 dual guide RNA (and therefore of a Cas9 single guide RNA when the "activator" and the "targeter" are linked together by, e.g., intervening nucleotides). Thus, for example, a Cas9 guide RNA (dgRNA or sgRNA) typically comprises an activator sequence (e.g., a tracrRNA sequence). A tracr molecule (a tracrRNA) is a naturally existing molecule that hybridizes with a CRISPR RNA molecule (a crRNA) to form a Cas9 dual guide RNA. The term "activator" is used herein to encompass naturally existing tracrRNAs, but also to encompass tracrRNAs with modifications (e.g., truncations, sequence variations, base modifications, backbone modifications, linkage modifications, etc.) where the activator retains at least one function of a tracrRNA (e.g., contributes to the dsRNA duplex to which Cas9 protein binds). In some cases the activator provides one or more stem loops that can interact with Cas9 protein. An activator can be referred to as having a tracr sequence (tracrRNA sequence) and in some cases is a tracrRNA, but the term "activator" is not limited to naturally existing tracrRNAs.

The term "targeter" or "targeter RNA" is used herein to refer to a crRNA-like molecule (crRNA: "CRISPR RNA") of a Cas9 dual guide RNA (and therefore of a Cas9 single guide RNA when the "activator" and the "targeter" are linked together, e.g., by intervening nucleotides). Thus, for example, a Cas9 guide RNA (dgRNA or sgRNA) typically comprises a targeting segment (which includes nucleotides that hybridize with (are complementary to) a target nucleic acid, and a duplex-forming segment (e.g., a duplex forming segment of a crRNA, which can also be referred to as a crRNA repeat). Because the sequence of a targeting segment (the segment that hybridizes with a target sequence of a target nucleic acid) of a targeter is modified by a user to hybridize with a desired target nucleic acid, the sequence of a targeter will often be a non-naturally occurring sequence. However, in various embodiments, the duplex-forming segment of a targeter (described in more detail below), which hybridizes with the duplex-forming segment of an activator, can include a naturally existing sequence (e.g., can include the sequence of a duplex-forming segment of a naturally existing crRNA, which can also be referred to as a crRNA repeat). Thus, the term targeter is used herein to distinguish from naturally occurring crRNAs, despite the fact that part of a targeter (e.g., the duplex-forming segment) often includes a naturally occurring sequence from a crRNA. However, the term "targeter" encompasses naturally occurring crRNAs.

In various embodiments a Cas9 guide RNA can also be said to include 3 parts: (i) a targeting sequence (a nucleotide sequence that hybridizes with a sequence of the target nucleic acid); (ii) an activator sequence (as described above) (in some cases, referred to as a tracr sequence); and (iii) a sequence that hybridizes to at least a portion of the activator sequence to form a double stranded duplex. A targeter has (i) and (iii); while an activator has (ii).

A Cas9 guide RNA (e.g., a dual guide RNA or a single guide RNA) can be comprised of any corresponding activator and targeter pair. In some cases, the duplex forming segments can be swapped between the activator and the targeter. In other words, in some cases, the targeter includes a sequence of nucleotides from a duplex forming segment of a tracrRNA (which sequence would normally be part of an activator) while the activator includes a sequence of nucleotides from a duplex forming segment of a crRNA (which sequence would normally be part of a targeter).

As noted above, a targeter typically comprises both the targeting segment (single stranded) of the Cas9 guide RNA and a stretch ("duplex-forming segment") of nucleotides that forms one half of the dsRNA duplex of the protein-binding segment of the Cas9 guide RNA. A corresponding tracrRNA-like molecule (activator) typically comprises a stretch of nucleotides (a duplex-forming segment) that forms the other half of the dsRNA duplex of the protein-binding segment of the Cas9 guide RNA. In other words, a stretch of nucleotides of the targeter is complementary to and hybridizes with a stretch of nucleotides of the activator to form the dsRNA duplex of the protein-binding segment of a Cas9 guide RNA. As such, each targeter can be said to have a corresponding activator (which has a region that hybridizes with the targeter). The targeter molecule additionally provides the targeting segment. Thus, a targeter and an activator (as a corresponding pair) hybridize to form a Cas9 guide RNA. The particular sequence of a given naturally existing crRNA or tracrRNA molecule is characteristic of the species in which the RNA molecules are found. Examples of suitable activator and targeter are well known in the art.

In various embodiments a Cas9 guide RNA (e.g., a dual guide RNA or a single guide RNA) can be comprised of any corresponding activator and targeter pair.

Targeting Segment of a Cas9 Guide RNA

The first segment of a subject guide nucleic acid typically includes a guide sequence (e.g., a targeting sequence)(a nucleotide sequence that is complementary to a sequence (a target site) in a target nucleic acid). In other words, the targeting segment of a subject guide nucleic acid can interact with a target nucleic acid (e.g., double stranded DNA (dsDNA)) in a sequence-specific manner via hybridization (i.e., base pairing). As such, the nucleotide sequence of the targeting segment may vary (depending on the target) and can determine the location within the target nucleic acid that the Cas9 guide RNA and the target nucleic acid will interact. The targeting segment of a Cas9 guide RNA can be modified (e.g., by genetic engineering)/designed to hybridize to any desired sequence (target site) within a target nucleic acid (e.g., a eukaryotic target nucleic acid such as genomic DNA).

In certain embodiments the targeting segment can have a length of 7 or more nucleotides (nt) (e.g., 8 or more, 9 or more, 10 or more, 12 or more, 15 or more, 20 or more, 25 or more, 30 or more, or 40 or more nucleotides). In some cases, the targeting segment can have a length of from 7 to 100 nucleotides (nt) (e.g., from 7 to 80 nt, from 7 to 60 nt, from 7 to 40 nt, from 7 to 30 nt, from 7 to 25 nt, from 7 to 22 nt, from 7 to 20 nt, from 7 to 18 nt, from 8 to 80 nt, from 8 to 60 nt, from 8 to 40 nt, from 8 to 30 nt, from 8 to 25 nt, from 8 to 22 nt, from 8 to 20 nt, from 8 to 18 nt, from 10 to 100 nt, from 10 to 80 nt, from 10 to 60 nt, from 10 to 40 nt, from 10 to 30 nt, from 10 to 25 nt, from 10 to 22 nt, from 10 to 20 nt, from 10 to 18 nt, from 12 to 100 nt, from 12 to 80 nt, from 12 to 60 nt, from 12 to 40 nt, from 12 to 30 nt, from 12 to 25 nt, from 12 to 22 nt, from 12 to 20 nt, from 12 to 18 nt, from 14 to 100 nt, from 14 to 80 nt, from 14 to 60 nt, from 14 to 40 nt, from 14 to 30 nt, from 14 to 25 nt, from 14 to 22 nt, from 14 to 20 nt, from 14 to 18 nt, from 16 to 100 nt, from 16 to 80 nt, from 16 to 60 nt, from 16 to 40 nt, from 16 to 30 nt, from 16 to 25 nt, from 16 to 22 nt, from 16 to 20 nt, from 16 to 18 nt, from 18 to 100 nt, from 18 to 80 nt, from 18 to 60 nt, from 18 to 40 nt, from 18 to 30 nt, from 18 to 25 nt, from 18 to 22 nt, or from 18 to 20 nt).

The nucleotide sequence (the targeting sequence) of the targeting segment that is complementary to a nucleotide sequence (target site) of the target nucleic acid can have a length of 10 nt or more. For example, the targeting sequence of the targeting segment that is complementary to a target site of the target nucleic acid can have a length of 12 nt or more, 15 nt or more, 18 nt or more, 19 nt or more, or 20 nt or more. In some cases, the nucleotide sequence (the targeting sequence) of the targeting segment that is complementary to a nucleotide sequence (target site) of the target nucleic acid has a length of 12 nt or more. In some cases, the nucleotide sequence (the targeting sequence) of the targeting segment that is complementary to a nucleotide sequence (target site) of the target nucleic acid has a length of 18 nt or more.

For example, in certain embodiments, the targeting sequence of the targeting segment that is complementary to a target sequence of the target nucleic acid can have a length of from 10 to 100 nucleotides (nt) (e.g., from 10 to 90 nt, from 10 to 75 nt, from 10 to 60 nt, from 10 to 50 nt, from 10 to 35 nt, from 10 to 30 nt, from 10 to 25 nt, from 10 to 22 nt, from 10 to 20 nt, from 12 to 100 nt, from 12 to 90 nt, from 12 to 75 nt, from 12 to 60 nt, from 12 to 50 nt, from 12 to 35 nt, from 12 to 30 nt, from 12 to 25 nt, from 12 to 22 nt, from 12 to 20 nt, from 15 to 100 nt, from 15 to 90 nt, from 15 to 75 nt, from 15 to 60 nt, from 15 to 50 nt, from 15 to 35 nt, from 15 to 30 nt, from 15 to 25 nt, from 15 to 22 nt, from 15 to 20 nt, from 17 to 100 nt, from 17 to 90 nt, from 17 to 75 nt, from 17 to 60 nt, from 17 to 50 nt, from 17 to 35 nt, from 17 to 30 nt, from 17 to 25 nt, from 17 to 22 nt, from 17 to 20 nt, from 18 to 100 nt, from 18 to 90 nt, from 18 to 75 nt, from 18 to 60 nt, from 18 to 50 nt, from 18 to 35 nt, from 18 to 30 nt, from 18 to 25 nt, from 18 to 22 nt, or from 18 to 20 nt). In some cases, the targeting sequence of the targeting segment that is complementary to a target sequence of the target nucleic acid has a length of from 15 nt to 30 nt. In some cases, the targeting sequence of the targeting segment that is complementary to a target sequence of the target nucleic acid has a length of from 15 nt to 25 nt. In some cases, the targeting sequence of the targeting segment that is complementary to a target sequence of the target nucleic acid has a length of from 18 nt to 30 nt. In some cases, the targeting sequence of the targeting segment that is complementary to a target sequence of the target nucleic acid has a length of from 18 nt to 25 nt. In some cases, the targeting sequence of the targeting segment that is complementary to a target sequence of the target nucleic acid has a length of from 18 nt to 22 nt. In some cases, the targeting sequence of the targeting segment that is complementary to a target site of the target nucleic acid is 20 nucleotides in length. In some cases, the targeting sequence of the targeting segment that is complementary to a target site of the target nucleic acid is 19 nucleotides in length.

In certain embodiments the percent complementarity between the targeting sequence (guide sequence) of the targeting segment and the target site of the target nucleic acid can be 60% or more (e.g., 65% or more, 70% or more, 75% or more, 80% or more, 85% or more, 90% or more, 95% or more, 97% or more, 98% or more, 99% or more, or 100%). In some cases, the percent complementarity between the targeting sequence of the targeting segment and the target site of the target nucleic acid is 100% over the seven contiguous 5'-most nucleotides of the target site of the target nucleic acid. In some cases, the percent complementarity between the targeting sequence of the targeting segment and the target site of the target nucleic acid is 60% or more over about 20 contiguous nucleotides. In some cases, the percent complementarity between the targeting sequence of the targeting segment and the target site of the target nucleic acid is 100% over the fourteen contiguous 5'-most nucleotides of the target site of the target nucleic acid and as low as 0% or more over the remainder. In such a case, the targeting sequence can be considered to be 14 nucleotides in length. In some cases, the percent complementarity between the targeting sequence of the targeting segment and the target site of the target nucleic acid is 100% over the seven contiguous 5'-most nucleotides of the target site of the target nucleic acid and as low as 0% or more over the remainder. In such a case, the targeting sequence can be considered to be 20 nucleotides in length.

In some cases, the percent complementarity between the targeting sequence of the targeting segment and the target site of the target nucleic acid is 100% over the 7 contiguous 5'-most nucleotides of the target site of the target nucleic acid (which can be complementary to the 3'-most nucleotides of the targeting sequence of the Cas9 guide RNA). In some cases, the percent complementarity between the targeting sequence of the targeting segment and the target site of the target nucleic acid is 100% over the 8 contiguous 5'-most nucleotides of the target site of the target nucleic acid (which can be complementary to the 3'-most nucleotides of the targeting sequence of the Cas9 guide RNA). In some cases, the percent complementarity between the targeting sequence of the targeting segment and the target site of the target nucleic acid is 100% over the 9 contiguous 5'-most nucleotides of the target site of the target nucleic acid (which can be complementary to the 3'-most nucleotides of the targeting sequence of the Cas9 guide RNA). In some cases, the percent complementarity between the targeting sequence of the targeting segment and the target site of the target nucleic acid is 100% over the 10 contiguous 5'-most nucleotides of the target site of the target nucleic acid (which can be complementary to the 3'-most nucleotides of the targeting sequence of the Cas9 guide RNA). In some cases, the percent complementarity between the targeting sequence of the targeting segment and the target site of the target nucleic acid is 100% over the 17 contiguous 5'-most nucleotides of the target site of the target nucleic acid (which can be complementary to the 3'-most nucleotides of the targeting sequence of the Cas9 guide RNA). In some cases, the percent complementarity between the targeting sequence of the targeting segment and the target site of the target nucleic acid is 100% over the 18 contiguous 5'-most nucleotides of the target site of the target nucleic acid (which can be complementary to the 3'-most nucleotides of the targeting sequence of the Cas9 guide RNA). In some cases, the percent complementarity between the targeting sequence of the targeting segment and the target site of the target nucleic acid is 60% or more (e.g., e.g., 65% or more, 70% or more, 75% or more, 80% or more, 85% or more, 90% or more, 95% or more, 97% or more, 98% or more, 99% or more, or 100%) over about 20 contiguous nucleotides.

In some cases, the percent complementarity between the targeting sequence of the targeting segment and the target site of the target nucleic acid is 100% over the 7 contiguous 5'-most nucleotides of the target site of the target nucleic acid and as low as 0% or more over the remainder. In such a case, the targeting sequence can be considered to be 7 nucleotides in length. In some cases, the percent complementarity between the targeting sequence of the targeting segment and the target site of the target nucleic acid is 100% over the 8 contiguous 5'-most nucleotides of the target site of the target nucleic acid and as low as 0% or more over the remainder. In such a case, the targeting sequence can be considered to be 8 nucleotides in length. In some cases, the percent complementarity between the targeting sequence of the targeting segment and the target site of the target nucleic acid is 100% over the 9 contiguous 5'-most nucleotides of the target site of the target nucleic acid and as low as 0% or more over the remainder. In such a case, the targeting sequence can be considered to be 9 nucleotides in length. In some cases, the percent complementarity between the targeting sequence of the targeting segment and the target site of the target nucleic acid is 100% over the 10 contiguous 5'-most nucleotides of the target site of the target nucleic acid and as low as 0% or more over the remainder. In such a case, the targeting sequence can be considered to be 10 nucleotides in length. In some cases, the percent complementarity between the targeting sequence of the targeting segment and the target site of the target nucleic acid is 100% over the 11 contiguous 5'-most nucleotides of the target site of the target nucleic acid and as low as 0% or more over the remainder. In such a case, the targeting sequence can be considered to be 11 nucleotides in length. In some cases, the percent complementarity between the targeting sequence of the targeting segment and the target site of the target nucleic acid is 100% over the 12 contiguous 5'-most nucleotides of the target site of the target nucleic acid and as low as 0% or more over the remainder. In such a case, the targeting sequence can be considered to be 12 nucleotides in length. In some cases, the percent complementarity between the targeting sequence of the targeting segment and the target site of the target nucleic acid is 100% over the 13 contiguous 5'-most nucleotides of the target site of the target nucleic acid and as low as 0% or more over the remainder. In such a case, the targeting sequence can be considered to be 13 nucleotides in length. In some cases, the percent complementarity between the targeting sequence of the targeting segment and the target site of the target nucleic acid is 100% over the 14 contiguous 5'-most nucleotides of the target site of the target nucleic acid and as low as 0% or more over the remainder. In such a case, the targeting sequence can be considered to be 14 nucleotides in length. In some cases, the percent complementarity between the targeting sequence of the targeting segment and the target site of the target nucleic acid is 100% over the 17 contiguous 5'-most nucleotides of the target site of the target nucleic acid and as low as 0% or more over the remainder. In such a case, the targeting sequence can be considered to be 17 nucleotides in length. In some cases, the percent complementarity between the targeting sequence of the targeting segment and the target site of the target nucleic acid is 100% over the 18 contiguous 5'-most nucleotides of the target site of the target nucleic acid and as low as 0% or more over the remainder. In such a case, the targeting sequence can be considered to be 18 nucleotides in length.

Protein-Binding Segment of a Cas9 Guide RNA

The protein-binding segment of a subject Cas9 guide RNA typically interacts with a Cas9 protein. The Cas9 guide RNA guides the bound Cas9 protein to a specific nucleotide sequence within target nucleic acid via the above mentioned targeting segment. The protein-binding segment of a Cas9 guide RNA typically comprises two stretches of nucleotides that are complementary to one another and hybridize to form a double stranded RNA duplex (dsRNA duplex). Thus, the protein-binding segment can include a dsRNA duplex. In some cases, the protein-binding segment also includes stem loop 1 (the "nexus") of a Cas9 guide RNA. For example, in some cases, the activator of a Cas9 guide RNA (dgRNA or sgRNA) includes (i) a duplex forming segment that contributes to the dsRNA duplex of the protein-binding segment; and (ii) nucleotides 3' of the duplex forming segment, e.g., that form stem loop 1 (the "nexus"). For example, in some cases, the protein-binding segment includes stem loop 1 (the "nexus") of a Cas9 guide RNA. In some cases, the protein-binding segment includes 5 or more nucleotides (nt) (e.g., 6 or more, 7 or more, 8 or more, 9 or more, 10 or more, 11 or more, 12 or more, 15 or more, 20 or more, 30 or more, 40 or more, 50 or more, 60 or more, 70 or more, 75 or more, or 80 or more nt) 3' of the dsRNA duplex (where 3' is relative to the duplex-forming segment of the activator sequence).

The dsRNA duplex of the guide RNA (sgRNA or dgRNA) that forms between the activator and targeter is sometimes referred to herein as the "stem loop". In addition, the activator (activator RNA, tracrRNA) of many naturally existing Cas9 guide RNAs (e.g., *S. pygogenes* guide RNAs) has 3 stem loops (3 hairpins) that are 3' of the duplex-forming segment of the activator. The closest stem loop to the duplex-forming segment of the activator (3' of the duplex forming segment) is called "stem loop 1" (and is also referred to herein as the "*nexus*"); the next stem loop is called "stem loop 2" (and is also referred to herein as the "hairpin 1"); and the next stem loop is called "stem loop 3" (and is also referred to herein as the "hairpin 2").

In some cases, a Cas9 guide RNA (sgRNA or dgRNA) (e.g., a full length Cas9 guide RNA) has stem loops 1, 2, and 3. In some cases, an activator (of a Cas9 guide RNA) has stem loop 1, but does not have stem loop 2 and does not have stem loop 3. In some cases, an activator (of a Cas9 guide RNA) has stem loop 1 and stem loop 2, but does not have stem loop 3. In some cases, an activator (of a Cas9 guide RNA) has stem loops 1, 2, and 3.

In some cases, the activator (e.g., tracr sequence) of a Cas9 guide RNA (dgRNA or sgRNA) includes (i) a duplex forming segment that contributes to the dsRNA duplex of the protein-binding segment; and (ii) a stretch of nucleotides (e.g., referred to herein as a 3' tail) 3' of the duplex forming segment. In some cases, the additional nucleotides 3' of the duplex forming segment form stem loop 1. In some cases, the activator (e.g., tracr sequence) of a Cas9 guide RNA (dgRNA or sgRNA) includes (i) a duplex forming segment that contributes to the dsRNA duplex of the protein-binding segment; and (ii) 5 or more nucleotides (e.g., 6 or more, 7 or more, 8 or more, 9 or more, 10 or more, 11 or more, 12 or more, 13 or more, 14 or more, 15 or more, 20 or more, 25 or more, 30 or more, 35 or more, 40 or more, 45 or more, 50 or more, 60 or more, 70 or more, or 75 or more nucleotides) 3' of the duplex forming segment. In some cases, the activator (activator RNA) of a Cas9 guide RNA (dgRNA or sgRNA) includes (i) a duplex forming segment that contributes to the dsRNA duplex of the protein-binding segment; and (ii) 5 or more nucleotides (e.g., 6 or more, 7 or more, 8 or more, 9 or more, 10 or more, 11 or more, 12 or more, 13 or more, 14 or more, 15 or more, 20 or more, 25 or more, 30 or more, 35 or more, 40 or more, 45 or more, 50 or more, 60 or more, 70 or more, or 75 or more nucleotides) 3' of the duplex forming segment.

In some cases, the activator (e.g., tracr sequence) of a Cas9 guide RNA (dgRNA or sgRNA) includes (i) a duplex forming segment that contributes to the dsRNA duplex of the protein-binding segment; and (ii) a stretch of nucleotides (e.g., referred to herein as a 3' tail) 3' of the duplex forming segment. In some cases, the stretch of nucleotides 3' of the duplex forming segment has a length in a range of from 5 to 200 nucleotides (nt) (e.g., from 5 to 150 nt, from 5 to 130 nt, from 5 to 120 nt, from 5 to 100 nt, from 5 to 80 nt, from 10 to 200 nt, from 10 to 150 nt, from 10 to 130 nt, from 10 to 120 nt, from 10 to 100 nt, from 10 to 80 nt, from 12 to 200 nt, from 12 to 150 nt, from 12 to 130 nt, from 12 to 120 nt, from 12 to 100 nt, from 12 to 80 nt, from 15 to 200 nt, from 15 to 150 nt, from 15 to 130 nt, from 15 to 120 nt, from 15 to 100 nt, from 15 to 80 nt, from 20 to 200 nt, from 20 to 150 nt, from 20 to 130 nt, from 20 to 120 nt, from 20 to 100 nt, from 20 to 80 nt, from 30 to 200 nt, from 30 to 150 nt, from 30 to 130 nt, from 30 to 120 nt, from 30 to 100 nt, or from 30 to 80 nt). In some cases, the nucleotides of the 3' tail of an activator RNA are wild type sequences. It will be recognized that a number of different alternative sequences can be used.

Examples of various Cas9 proteins and Cas9 guide RNAs (as well as information regarding requirements related to protospacer adjacent motif (PAM) sequences present in targeted nucleic acids) can be found in the art (see, e.g., Jinek et al. (2012) *Science*, 337(6096): 816-821; Chylinski et al. (2013) *RNA Biol.* 10(5):726-737; Ma et al., (2013) *Biomed. Res. Int.* 2013: 270805; Hou et al. (2013) *Proc. Natl. Acad. Sci. USA*, 110(39): 15644-15649; Pattanayak et al. (2013) *Nat. Biotechnol.* 31(9): 839-843; Qi et al. (2013) *Cell*, 152(5): 1173-1183; Wang et al. (2013) *Cell*, 153(4): 910-918; Chen et. al. (2013) *Nucl. Acids Res.* 41(20): e19; Cheng et. al. (2012) *Cell Res.* 23(10): 1163-1171; Cho et. al. (2013) *Genetics*, 195(3): 1177-1180; DiCarlo et al. (2013) *Nucl. Acids Res.* 41(7): 4336-4343; Dickinson et. al. (2013) *Nat. Meth.* 10(10): 1028-1034; Ebina et. al. (2013) *Sci. Rep.* 3: 2510; Fujii et. al. (2013) *Nucl. Acids Res.* 41(20): e187; Hu et. al. (2013) *Cell Res.* 23(11): 1322-1325; Jiang et. al. (2013) *Nucl. Acids Res.* 41(20): e188; Larson et. al. (2013) *Nat. Protoc.* 8(11): 2180-2196; *Mali* et. at. (2013) *Nat. Meth.* 10(10): 957-963; Nakayama et. al. (2013) *Genesis*, 51(12): 835-843; Ran et. al. (2013) *Nat. Protoc.* 8(11): 2281-2308; Ran et. al. (2013) *Cell* 154(6): 1380-1389; Walsh et. al. (2013) *Proc. Natl. Acad. Sci. USA*, 110(39): 15514-15515; Yang et. al. (2013) *Cell*, 154(6): 1370-1379; Briner et al. (2014)*Mol. Cell*, 56(2): 333-339; and U.S. Pat. Nos. 8,906, 616; 8,895,308; 8,889,418; 8,889,356; 8,871,445; 8,865, 406; 8,795,965; 8,771,945; 8,697,359; 2014/0068797; 2014/ 0170753; 2014/0179006; 2014/0179770; 2014/0186843; 2014/0186919; 2014/0186958; 2014/0189896; 2014/ 0227787; 2014/0234972; 2014/0242664; 2014/0242699; 2014/0242700; 2014/0242702; 2014/0248702; 2014/ 0256046; 2014/0273037; 2014/0273226; 2014/0273230; 2014/0273231; 2014/0273232; 2014/0273233; 2014/ 0273234; 2014/0273235; 2014/0287938; 2014/0295556; 2014/0295557; 2014/0298547; 2014/0304853; 2014/ 0309487; 2014/0310828; 2014/0310830; 2014/0315985; 2014/0335063; 2014/0335620; 2014/0342456; 2014/ 0342457; 2014/0342458; 2014/0349400; 2014/0349405; 2014/0356867; 2014/0356956; 2014/0356958; 2014/ 0356959; 2014/0357523; 2014/0357530; 2014/0364333; and 2014/0377868; all of which are incorporated herein by reference in their entirety.

In certain embodiments alternative PAM sequences may also be utilized, where a PAM sequence can be NAG as an alternative to NGG (Hsu (2014) supra.) using an *S. pyogenes* Cas9. Additional PAM sequences may also include those lacking the initial G (see, e.g., Sander and Joung (2014) *Nature Biotech* 32(4):347). In addition to the *S. pyogenes* encoded Cas9 PAM sequences, other PAM sequences can be used that are specific for Cas9 proteins from other bacterial sources. For example, the PAM sequences shown below in Table 2 (adapted from Sander and Joung, supra., and Esvelt et al. (2013) *Nat. Meth.* 10(11): 1116) are specific for these Cas9 proteins:

TABLE 2

Illustrative PAM sequences from various species.

| Species | PAM | SEQ ID NO |
|---|---|---|
| S. pyogenes | NGG | |
| S. pyogenes | NAG | |
| S. mutans | NGG | |
| S. thermophilius | NGGNG | 10 |
| S. thermophilius | NNAAAW | 11 |
| S. thermophilius | NNAGAA | 12 |
| S. thermophilius | NNNGATT | 13 |
| C. jejuni | NNNNACA | 14 |
| N. meningitides | NNNNGATT | 15 |
| P. multocida | GNNNCNNA | 16 |
| F. novicida | NG | |

Thus, in certain embodiments, a suitable target sequence for use with a S. pyogenes CRISPR/Cas system can be chosen according to the following guideline: [n17, n18, n19, or n20](G/A)G (SEQ ID NO:17). Alternatively, in certain embodiments, the PAM sequence can follow the guideline G[n17, n18, n19, n20](G/A)G (SEQ ID NO:18). For Cas9 proteins derived from non-S. pyogenes bacteria, the same guidelines may be used where the alternate PAMs are substituted in for the S. pyogenes PAM sequences.

Guide RNAs Corresponding to Type V and Type VI CRISPR/Cas Endonucleases (e.g., Cpf1 Guide RNA)

A guide RNA that binds to a type V or type VI CRISPR/Cas protein (e.g., Cpf1, C2c1, C2c2, C2c3), and targets the complex to a specific location within a target nucleic acid is referred to herein generally as a "type V or type VI CRISPR/Cas guide RNA". An example of a more specific term is a "Cpf1 guide RNA."

In various embodiments a type V or type VI CRISPR/Cas guide RNA (e.g., cpf1 guide RNA) can have a total length of from 30 nucleotides (nt) to 200 nt, e.g., from 30 nt to 180 nt, from 30 nt to 160 nt, from 30 nt to 150 nt, from 30 nt to 125 nt, from 30 nt to 100 nt, from 30 nt to 90 nt, from 30 nt to 80 nt, from 30 nt to 70 nt, from 30 nt to 60 nt, from 30 nt to 50 nt, from 50 nt to 200 nt, from 50 nt to 180 nt, from 50 nt to 160 nt, from 50 nt to 150 nt, from 50 nt to 125 nt, from 50 nt to 100 nt, from 50 nt to 90 nt, from 50 nt to 80 nt, from 50 nt to 70 nt, from 50 nt to 60 nt, from 70 nt to 200 nt, from 70 nt to 180 nt, from 70 nt to 160 nt, from 70 nt to 150 nt, from 70 nt to 125 nt, from 70 nt to 100 nt, from 70 nt to 90 nt, or from 70 nt to 80 nt). In some cases, a type V or type VI CRISPR/Cas guide RNA (e.g., cpf1 guide RNA) has a total length of at least 30 nt (e.g., at least 40 nt, at least 50 nt, at least 60 nt, at least 70 nt, at least 80 nt, at least 90 nt, at least 100 nt, or at least 120 nt).

In some cases, a Cpf1 guide RNA has a total length of 35 nt, 36 nt, 37 nt, 38 nt, 39 nt, 40 nt, 41 nt, 42 nt, 43 nt, 44 nt, 45 nt, 46 nt, 47 nt, 48 nt, 49 nt, or 50 nt.

Like a Cas9 guide RNA, a type V or type VI CRISPR/Cas guide RNA (e.g., cpf1 guide RNA) can include a target nucleic acid-binding segment and a duplex-forming region (e.g., in some cases formed from two duplex-forming segments, i.e., two stretches of nucleotides that hybridize to one another to form a duplex)

In various embodiments the target nucleic acid-binding segment of a type V or type VI CRISPR/Cas guide RNA (e.g., cpf1 guide RNA) can have a length of from 15 nt to 30 nt, e.g., 15 nt, 16 nt, 17 nt, 18 nt, 19 nt, 20 nt, 21 nt, 22 nt, 23 nt, 24 nt, 25 nt, 26 nt, 27 nt, 28 nt, 29 nt, or 30 nt. In some cases, the target nucleic acid-binding segment has a length of 23 nt. In some cases, the target nucleic acid-binding segment has a length of 24 nt. In some cases, the target nucleic acid-binding segment has a length of 25 nt.

In certain embodiments the guide sequence of a type V or type VI CRISPR/Cas guide RNA (e.g., cpf1 guide RNA) can have a length of from 15 nt to 30 nt (e.g., 15 to 25 nt, 15 to 24 nt, 15 to 23 nt, 15 to 22 nt, 15 to 21 nt, 15 to 20 nt, 15 to 19 nt, 15 to 18 nt, 17 to 30 nt, 17 to 25 nt, 17 to 24 nt, 17 to 23 nt, 17 to 22 nt, 17 to 21 nt, 17 to 20 nt, 17 to 19 nt, 17 to 18 nt, 18 to 30 nt, 18 to 25 nt, 18 to 24 nt, 18 to 23 nt, 18 to 22 nt, 18 to 21 nt, 18 to 20 nt, 18 to 19 nt, 19 to 30 nt, 19 to 25 nt, 19 to 24 nt, 19 to 23 nt, 19 to 22 nt, 19 to 21 nt, 19 to 20 nt, 20 to 30 nt, 20 to 25 nt, 20 to 24 nt, 20 to 23 nt, 20 to 22 nt, 20 to 21 nt, 15 nt, 16 nt, 17 nt, 18 nt, 19 nt, 20 nt, 21 nt, 22 nt, 23 nt, 24 nt, 25 nt, 26 nt, 27 nt, 28 nt, 29 nt, or 30 nt). In some cases, the guide sequence has a length of 17 nt. In some cases, the guide sequence has a length of 18 nt. In some cases, the guide sequence has a length of 19 nt. In some cases, the guide sequence has a length of 20 nt. In some cases, the guide sequence has a length of 21 nt. In some cases, the guide sequence has a length of 22 nt. In some cases, the guide sequence has a length of 23 nt. In some cases, the guide sequence has a length of 24 nt.

In certain embodiments the guide sequence of a type V or type VI CRISPR/Cas guide RNA (e.g., cpf1 guide RNA) can have 100% complementarity with a corresponding length of target nucleic acid sequence. The guide sequence can have less than 100% complementarity with a corresponding length of target nucleic acid sequence. For example, the guide sequence of a type V or type VI CRISPR/Cas guide RNA (e.g., cpf1 guide RNA) can have 1, 2, 3, 4, or 5 nucleotides that are not complementary to the target nucleic acid sequence. For example, in some cases, where a guide sequence has a length of 25 nucleotides, and the target nucleic acid sequence has a length of 25 nucleotides, in some cases, the target nucleic acid-binding segment has 100% complementarity to the target nucleic acid sequence. As another example, in some cases, where a guide sequence has a length of 25 nucleotides, and the target nucleic acid sequence has a length of 25 nucleotides, in some cases, the target nucleic acid-binding segment has 1 non-complementary nucleotide and 24 complementary nucleotides with the target nucleic acid sequence. As another example, in some cases, where a guide sequence has a length of 25 nucleotides, and the target nucleic acid sequence has a length of 25 nucleotides, in some cases, the target nucleic acid-binding segment has 2 non-complementary nucleotides and 23 complementary nucleotides with the target nucleic acid sequence.

In certain embodiments the duplex-forming segment of a type V or type VI CRISPR/Cas guide RNA (e.g., cpf1 guide RNA) (e.g., of a targeter RNA or an activator RNA) can have a length of from 15 nt to 25 nt (e.g., 15 nt, 16 nt, 17 nt, 18 nt, 19 nt, 20 nt, 21 nt, 22 nt, 23 nt, 24 nt, or 25 nt).

The RNA duplex of a type V or type VI CRISPR/Cas guide RNA (e.g., cpf1 guide RNA) can have a length of from 5 base pairs (bp) to 40 bp (e.g., from 5 to 35 bp, 5 to 30 bp, 5 to 25 bp, 5 to 20 bp, 5 to 15 bp, 5-12 bp, 5-10 bp, 5-8 bp, 6 to 40 bp, 6 to 35 bp, 6 to 30 bp, 6 to 25 bp, 6 to 20 bp, 6 to 15 bp, 6 to 12 bp, 6 to 10 bp, 6 to 8 bp, 7 to 40 bp, 7 to 35 bp, 7 to 30 bp, 7 to 25 bp, 7 to 20 bp, 7 to 15 bp, 7 to 12 bp, 7 to 10 bp, 8 to 40 bp, 8 to 35 bp, 8 to 30 bp, 8 to 25 bp, 8 to 20 bp, 8 to 15 bp, 8 to 12 bp, 8 to 10 bp, 9 to 40 bp, 9 to 35 bp, 9 to 30 bp, 9 to 25 bp, 9 to 20 bp, 9 to 15 bp, 9 to 12 bp, 9 to 10 bp, 10 to 40 bp, 10 to 35 bp, 10 to 30 bp, 10 to 25 bp, 10 to 20 bp, 10 to 15 bp, or 10 to 12 bp).

As an illustrative, but non-limiting example, a duplex-forming segment of a Cpf1 guide RNA can comprise a nucleotide sequence selected from (5' to 3'): AAUUUCUA-CUGUUGUAGAU (SEQ ID NO:19), AAUUUCUGCU-GUUGCAGAU (SEQ ID NO:20), AAUUUCCACUGUU-GUGGAU (SEQ ID NO:21), AAUUCCUACUGUUGUAGGU (SEQ ID NO:22), AAUUUCUACUAUUGUAGAU (SEQ ID NO:23), AAUUUCUACUGCUGUAGAU (SEQ ID NO:24), AAUUUCUACUUUGUAGAU (SEQ ID NO:25), AAUUUCUACUUGUAGAU (SEQ ID NO:26), and the like. The guide sequence can then follow (5' to 3') the duplex forming segment.

Examples and guidance related to type V or type VI CRISPR/Cas endonucleases and guide RNAs (as well as information regarding requirements related to protospacer adjacent motif (PAM) sequences present in targeted nucleic acids) can be found in the art (see, e.g., Zetsche et al. (2015) *Cell*, 163(3): 759-771; Makarova et al. (2015) *Nat. Rev. Microbiol.* 13(11): 722-736; Shmakov et al. (2015)*Mol. Cell*, 60(3): 385-397; and the like).

Methods of utilizing a CRISPR/Cas9 system to introduce a corrective donor nucleic acid into the BTK gene are illustrated in Example 1. The constructs and methods described therein are illustrate and non-limiting. Using the teachings provided herein, methods utilizing different CRISPR/Cas endonucleases and gRNAs will be available to one of skill in the art.

Zinc Finger Endonucleases.

In certain embodiments the targeting endonuclease can be a zinc finger nuclease (ZFN). Typically, a zinc finger nuclease comprises a DNA binding domain (e.g., zinc finger) and a cleavage domain (e.g., nuclease), both of which are described below.

Zinc Finger Binding Domain.

Zinc finger binding domains may be engineered to recognize and bind to any nucleic acid sequence of choice (see, e.g., Beerli et al. (2002) *Nat. Biotechnol.* 20: 135-141; Pabo et al. (2001) *Ann. Rev. Biochem.* 70: 313-340; Isalan et al. (2001) *Nat. Biotechnol.* 19: 656-660; Segal et al. (2001) *Curr. Opin. Biotechnol.* 12: 632-637; Choo et al. (2000) *Curr. Opin. Struct. Biol.* 10: 411-416; Zhang et al. (2000) *J Biol. Chem.* 275(43): 33850-33860; Doyon et al. (2008) *Nat. Biotechnol.* 26: 702-708; and Santiago et al. (2008) *Proc. Natl. Acad. Sci. USA*, 105: 5809-5814). An engineered zinc finger binding domain can have a novel binding specificity compared to a naturally-occurring zinc finger protein. Engineering methods include, but are not limited to, rational design and various types of selection. Rational design includes, for example, using databases comprising doublet, triplet, and/or quadruplet nucleotide sequences and individual zinc finger amino acid sequences, in which each doublet, triplet or quadruplet nucleotide sequence is associated with one or more amino acid sequences of zinc fingers which bind the particular triplet or quadruplet sequence (see, e.g., U.S. Pat. Nos. 6,453,242 and 6,534,261, and the like). As an example, the algorithm described in U.S. Pat. No. 6,453,242 may be used to design a zinc finger binding domain to target a preselected sequence. Alternative methods, such as rational design using a nondegenerate recognition code table can also be used to design a zinc finger binding domain to target a specific sequence (see, e.g., Sera et al. (2002) *Biochemistry* 41: 7074-7081; and the like). Publically available web-based tools for identifying target sites in DNA sequences and designing zinc finger binding domains are found, inter alia, at www.zincfingertools.org and zifit.partners.org/ZiFiT/(see also Mandell et al. (2006) *Nucl. Acida Res.* 34: W516-W523; Sander et al. (2007) *Nucl. Acida Res.* 35: W599-W605; and the like).

A zinc finger binding domain may be designed to recognize and bind a DNA sequence ranging from about 3 nucleotides to about 21 nucleotides in length, for example, from about 9 to about 18 nucleotides in length. Each zinc finger recognition region (i.e., zinc finger) typically recognizes and binds three nucleotides. In certain embodiments, the zinc finger binding domains of suitable targeted zinc finger nucleases comprise at least three zinc finger recognition regions (i.e., zinc fingers). The zinc finger binding domain, however, may comprise four, or five, or six, or more zinc finger recognition regions. A zinc finger binding domain may be designed to bind to any suitable target DNA sequence (see, e.g., U.S. Pat. Nos. 6,607,882; 6,534,261, 6,453,242, and the like.

Illustrative methods of selecting a zinc finger recognition region include, but are not limited to phage display and two-hybrid systems, and are disclosed in U.S. Pat. Nos. 5,789,538; 5,925,523; 6,007,988; 6,013,453; 6,410,248; 6,140,466; 6,200,759; and 6,242,568; as well as WO 98/37186; WO 98/53057; WO 00/27878; WO 01/88197 and GB 2,338,237y. In addition, enhancement of binding specificity for zinc finger binding domains has been described, for example, in WO 02/077227.

Zinc finger binding domains and methods for design and construction of fusion proteins (and polynucleotides encoding same) are known to those of skill in the art and are described in detail in U.S. Patent Application Publication Nos. 2005/0064474 and 2006/0188987. Zinc finger recognition regions and/or multi-fingered zinc finger proteins may be linked together using suitable linker sequences, including for example, linkers of five or more amino acids in length (see, e.g., U.S. Pat. Nos. 6,479,626; 6,903,185; and 7,153, 949) for non-limiting examples of linker sequences of six or more amino acids in length.

Cleavage Domain.

A zinc finger nuclease also typically includes a cleavage domain. The cleavage domain portion of the zinc finger nuclease may be obtained from any endonuclease or exonuclease. Non-limiting examples of endonucleases from which a cleavage domain may be derived include, but are not limited to, restriction endonucleases and homing endonucleases (see, e.g., New England Biolabs catalog (www.neb.com); Belfort et al. (1997) *Nucleic Acids Res.* 25:3379-3388; and the like). Additional enzymes that cleave DNA are known (e.g., S1 Nuclease; mung bean nuclease; pancreatic DNase I; micrococcal nuclease; yeast HO endonuclease). In certain embodiments one or more of these enzymes (or functional fragments thereof) may be used as a source of cleavage domains.

In certain embodiments, a cleavage domain also may be derived from an enzyme or portion thereof, as described above, that requires dimerization for cleavage activity. Two zinc finger nucleases may be required for cleavage, as each nuclease comprises a monomer of the active enzyme dimer. Alternatively, a single zinc finger nuclease can comprise both monomers to create an active enzyme dimer. As used herein, an "active enzyme dimer" is an enzyme dimer capable of cleaving a nucleic acid molecule. The two cleavage monomers may be derived from the same endonuclease (or functional fragments thereof), or each monomer may be derived from a different endonuclease (or functional fragments thereof).

In various embodiments when two cleavage monomers are used to form an active enzyme dimer, the recognition sites for the two zinc finger nucleases are preferably disposed such that binding of the two zinc finger nucleases to their respective recognition sites places the cleavage monomers in a spatial orientation to each other that allows the cleavage monomers to form an active enzyme dimer, e.g., by dimerizing. As a result, the near edges of the recognition sites may be separated by about 5 to about 18 nucleotides. For instance, the near edges may be separated by about 5, 6, 7, 8, 9, 10, 11, 12, 13, 14, 15, 16, 17 or 18 nucleotides. It will however be understood that any integral number of nucleotides or nucleotide pairs can intervene between two recognition sites (e.g., from about 2 to about 50 nucleotide pairs or more). The near edges of the recognition sites of the zinc finger nucleases, such as for example those described in detail herein, may be separated by 6 nucleotides. In general, the site of cleavage lies between the recognition sites.

Restriction endonucleases (restriction enzymes) are present in many species and are capable of sequence-specific binding to DNA (at a recognition site), and cleaving DNA at or near the site of binding. Certain restriction enzymes (e.g., Type IIS) cleave DNA at sites removed from the recognition site and have separable binding and cleavage domains. For example, the Type IIS enzyme FokI catalyzes double-stranded cleavage of DNA, at 9 nucleotides from its recognition site on one strand and 13 nucleotides from its recognition site on the other (see, e.g., U.S. Pat. Nos. 5,356,802; 5,436,150, and 5,487,994; Li et al. (1992) Proc. Natl. Acad. Sci. USA, 89: 4275-4279; Li et al. (1993)Proc. Natl. Acad. Sci. USA, 90: 2764-2768. Thus, a zinc finger nuclease can comprise the cleavage domain from at least one Type IIS restriction enzyme and one or more zinc finger binding domains, which may or may not be engineered. Illustrative type IIS restriction enzymes are described for example in International Patent Publication No: WO 07/014,275. Additional restriction enzymes also contain separable binding and cleavage domains, and these also are contemplated by the present disclosure (see, e.g., Roberts et al. (2003) Nucleic Acids Res. 31:418-420.

An illustrative Type IIS restriction enzyme, whose cleavage domain is separable from the binding domain, is FokI. This particular enzyme is active as a dimer (Bitinaite et al. (1998) Proc. Natl. Acad. Sci. USA 95: 10, 570-10, 575). Accordingly, for the purposes of the present disclosure, the portion of the FokI enzyme used in a zinc finger nuclease is considered a cleavage monomer. Thus, for targeted double-stranded cleavage using a FokI cleavage domain, two zinc finger nucleases, each comprising a FokI cleavage monomer, may be used to reconstitute an active enzyme dimer. Alternatively, a single polypeptide molecule containing a zinc finger binding domain and two FokI cleavage monomers can also be used.

In certain embodiments the cleavage domain may comprise one or more engineered cleavage monomers that minimize or prevent homodimerization, as described, for example, in U.S. Patent Publication Nos. 2005/0064474, 2006/0188987, 2008/0131962, and the like. By way of non-limiting example, amino acid residues at positions 446, 447, 479, 483, 484, 486, 487, 490, 491, 496, 498, 499, 500, 531, 534, 537, and 538 of FokI are all targets for influencing dimerization of the FokI cleavage half-domains. Illustrative engineered cleavage monomers of FokI that form obligate heterodimers include a pair in which a first cleavage monomer includes mutations at amino acid residue positions 490 and 538 of FokI and a second cleavage monomer that includes mutations at amino-acid residue positions 486 and 499 (see, e.g., Miller et al. (2007) Nat. Biotechnol. 25: 778-785; Szczpek et al. (2007) Nat. Biotechnol. 25: 786-793). For example, the Glu (E) at position 490 may be changed to Lys (K) and the Ile (I) at position 538 may be changed to K in one domain (E490K, I538K), and the Gln (Q) at position 486 may be changed to E and the I at position 499 may be changed to Leu (L) in another cleavage domain (Q486E, I499L). In other aspects, modified FokI cleavage domains can include three amino acid changes (see, e.g., Doyon et al. (2011) Nat. Methods, 8: 74-81). For example, one modified FokI domain (which is termed ELD) can comprise Q486E, I499L, N496D mutations and the other modified FokI domain (which is termed KKR) can comprise E490K, I538K, H537R mutations.

Additional Domains.

In certain embodiments the zinc finger nuclease further comprises at least one nuclear localization signal or sequence (NLS). A NLS is an amino acid sequence that facilitates transport of the zinc finger nuclease protein into the nucleus of eukaryotic cells. In general, an NLS comprise a stretch of basic amino acids. Nuclear localization signals are known in the art (see, e.g., Makkerh et al. (1996) Curr. Biol. 6: 1025-1027; Lange et al. (2007) J. Biol. Chem. 282: 5101-5105). For example, in one embodiment, the NLS can be a monopartite sequence, such as PKKKRKV (SEQ ID NO:27) or PKKKRRV (SEQ ID NO:28). In another embodiment, the NLS can be a bipartite sequence. In still another embodiment, the NLS can be KRPAATKKAGQAKKKK (SEQ ID NO:29). In various embodiments the NLS can be located at the N-terminus, the C-terminus, or in an internal location of the zinc finger nuclease.

Although not required in the methods described herein, in certain embodiments, the zinc finger nuclease can also comprise at least one cell-penetrating domain. In one embodiment, the cell-penetrating domain can be a cell-penetrating peptide sequence derived from the HIV-1 TAT protein. As an example, the TAT cell-penetrating sequence can be GRKKRRQRRRPPQPKKKRKV (SEQ ID NO:30). In another embodiment, the cell-penetrating domain can be TLM (PLSSIFSRIGDPPKKKRKV, SEQ ID NO:31), a cell-penetrating peptide sequence derived from the human hepatitis B virus. In still another embodiment, the cell-penetrating domain can be MPG (GALFLGWLGAAGSTMGAPKKKRKV, SEQ ID NO:32) or GALFLGFLGAAGSTMGAWSQPKKKRKV, SEQ ID NO:33). In an additional embodiment, the cell-penetrating domain can be Pep-1 (KETWWETWWTEWS-QPKKKRKV, SEQ ID NO:34), VP22, a cell penetrating peptide from Herpes simplex virus, or a polyarginine peptide sequence. In various embodiments the cell-penetrating domain can be located at the N-terminus, the C-terminus, or in an internal location of the protein.

Cells to be Modified

In certain embodiments the cells that are modified using the methods described herein include, but are not limited to T cells including but not limited to primary XLA patient CD4+ T cells, peripheral blood stem cells including but not limited to GCSF mobilized peripheral blood stem cells (PBSC), and various hematopoietic stem and progenitor cells (HPSCs) including, but not limited to CD34+ HSPCs.

However the methods described herein need not be limited to these cells. In certain embodiments other suitable cells include, but are not limited to various adult stem cells, cord blood cells, and induced pluripotent stem cells (IPSCs).

Systems/Kits.

In various embodiments a system for treatment of X-Linked Hyper-IgM Syndrome ((XHIM) in a mammal (e.g., a human) is provided. In certain embodiments the system comprises: i) a first component comprising an AAV vector or a lentiviral vector containing a donor comprising a corrective BTK cDNA flanked by homology arms; and ii) a second component comprising one or more of the following: a TALEN mRNA targeting the BTK gene; or a nucleic acid encoding a guide RNA (gRNA) and CRISPR/Cas endonuclease where said gRNA targets the BTK gene; or a ribonucleoprotein (RNP) complex comping a guide RNA complexed to a CRISPR/Cas endonuclease, where said gRNA targets the BTK gene. In certain embodiments the corrective BTK cDNA comprises a corrective BTK cDNA as described herein. In certain embodiments the corrective BTK cDNA comprises a corrective BTK cDNA as described herein in a viral vector (e.g., lentiviral vector, AAV vector, etc.). In certain embodiments the second component comprises a targeted endonuclease as described herein and, when required by the endonuclease, a guide RNA as described herein. In certain embodiments the system comprises a third component comprising an AAV helper protein or a nucleic acid encoding an AAV helper protein as described herein.

In certain embodiments the first component and second component, and third component when present, are disposed within a mammalian cell as described herein. In certain embodiments the cell is a hematopoietic stem or progenitor cell (HSPC). In certain embodiments the cell is a CD34+ hematopoietic stem or progenitor cell (HSPC). In certain embodiments the cell is a peripheral blood stem cell (PBSC) (e.g., a G-CSF mobilized peripheral blood stem cell (PBSC)). In certain embodiments the cell is a CD34+ cell.

In certain embodiments the first component and second component, and third component when present, are components of a kit. In certain embodiments component is disposed within a container comprising said kit. In certain embodiments the kit comprises instructional materials teaching the use of the components of a kit to insert a corrective cDNA into the BTK gene.

While the instructional materials in the various kits typically comprise written or printed materials they are not limited to such. Any medium capable of storing such instructions and communicating them to an end user is contemplated by this invention. Such media include, but are not limited to electronic storage media (e.g., magnetic discs, tapes, cartridges, chips), optical media (e.g., CD ROM), and the like. Such media may include addresses to internet sites that provide such instructional materials

EXAMPLES

The following examples are offered to illustrate, but not to limit the claimed invention.

Example 1

Correction of X-Linked Agammaglobulinemia

X-Linked agammaglobulinemia (XLA) is one of the most common forms of primary immunodeficiency affecting 1 in 200,000 births each year (Boyle & Scalchunes (2008) *Pharmaceuticals Policy and Law* 10: 133-146). Patients with XLA have mutations in Bruton's Tyrosine Kinase (BTK), a necessary component of B lymphocyte development required for cell maturation and antibody production (Tsukada et al. (1993) *Cell,* 72: 279-290; Vetrie et al. (1993) *Nature,* 361: 226-233; Siegal et al. (2005) *Eur. J. Immunol.* 1(6): 482-486; Bruton (1952) *Pediatrics,* 9(6): 722-728). The current standard of care for patients with XLA is immunoglobulin supplementation. This treatment provides a substantial improvement in quality of life and life expectancy, though it remains imperfect. Immunoglobulin supplementation is expensive, requires lifelong monthly injections, and patients retain a susceptibility to recurrent pulmonary infections as well as skin disease and inflammatory bowel disease (Hermaszewski & Webster (1993) *Quart. J. Med.* 86: 31-42). The need for a permanent cure and potential benefits to affected patients makes XLA an attractive target for gene therapy. Additionally, previously performed murine in vivo studies suggest that even low levels (<5%) of hematopoietic stem cells (HSCs) with functional BTK are sufficient to restore levels of antibody production to wild-type levels, as B cells produced from the healthy HSCs have a strong selective advantage (Rohrer & Conley (1999) *Blood,* 94: 3358-3365).

Previous work towards gene therapy for XLA has focused on using lentiviral vectors to achieve semi-random integration of a corrective BTK gene driven by exogenous promoters (Sather et al. (2011) *Mol. Ther.* 19(3): 515-525; Ng et al. (2010) *Leukemia,* 24:1617-1630). While B cell maturation and function was restored, there are risks inherent with this approach. BTK is a highly controlled gene with a number of different regulatory factors, and overexpression of BTK from an exogenous promoter has led to abnormal lymphoproliferation in murine models (Sather et al. (2011) *Mol. Ther.* 19(3): 515-525; Ng et al. (2010) *Leukemia,* 24:1617-1630; Mohamed et al. (2009) *Immunol. Rev.* 228: 58-73). Lentiviral vectors also run the risk of integration near proto-oncogenes or disrupting tumor suppressors, which may result in the development of leukemia. Although various modifications to the lentiviral backbone have been implemented to reduce this risk, insertional oncogenesis remains a concern. The fairly mild phenotype of the disease when treated with immunoglobulin supplementation gives a very low tolerance for any potential risks of the treatment.

An alternative to ectopic viral-mediated gene addition is to use targeted gene repair to integrate a corrective copy of the BTK gene into its endogenous locus. This method uses targeted endonucleases, such as the CRISPR/Cas9 (Clusters of Regularly Interspaced Short Palindromic Repeat) system, to introduce double stranded breaks (DSB) into the 5' end of the BTK locus. Cells can repair these DSBs through multiple pathways, the most predominant of which are non-homologous end joining (NHEJ), which may result in deletions or insertions of random nucleotides, or homologous recombination, which uses a homologous DNA sequence to seamlessly repair the break. In a natural setting, this homologous template is generally a sister chromatid during cell replication, however, this pathway can be harnessed by providing a new homologous donor template. This donor template is typically delivered via an adeno-associated viral (AAV) vector, which is non-integrating. For treatment of XLA, we deliver a nearly full length, codon-optimized BTK cDNA donor flanked by 500 bp sequences homologous to the regions flanking the DSB. Integration of the construct into the endogenous BTK locus will allow the transgene to retain much of the regulation of the endogenous gene while dramatically reducing the risk of insertional oncogenesis. Successful treatment with this method should be therapeutic for any patients with mutations downstream of the DSB.

Figure 4:
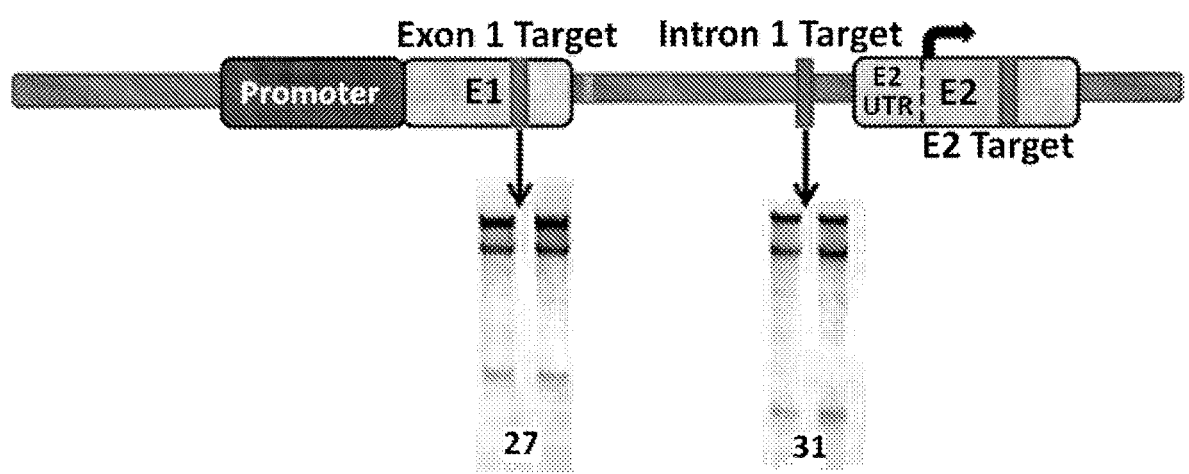
FIG. 4. Illustrative BTK target sites. A diagram of three target sites evaluated in BTK for donor integration. The targets are in the Exon 1, Intron 1, and Exon 2. CRISPR/Cas9 plasmid was tested at each site and illustrative surveyor nuclease assay gels demonstrate up to 31% allelic disruption in K562 cells. Homologous donors designed to be integrated into each of the three sites were created.
Figure 5A:
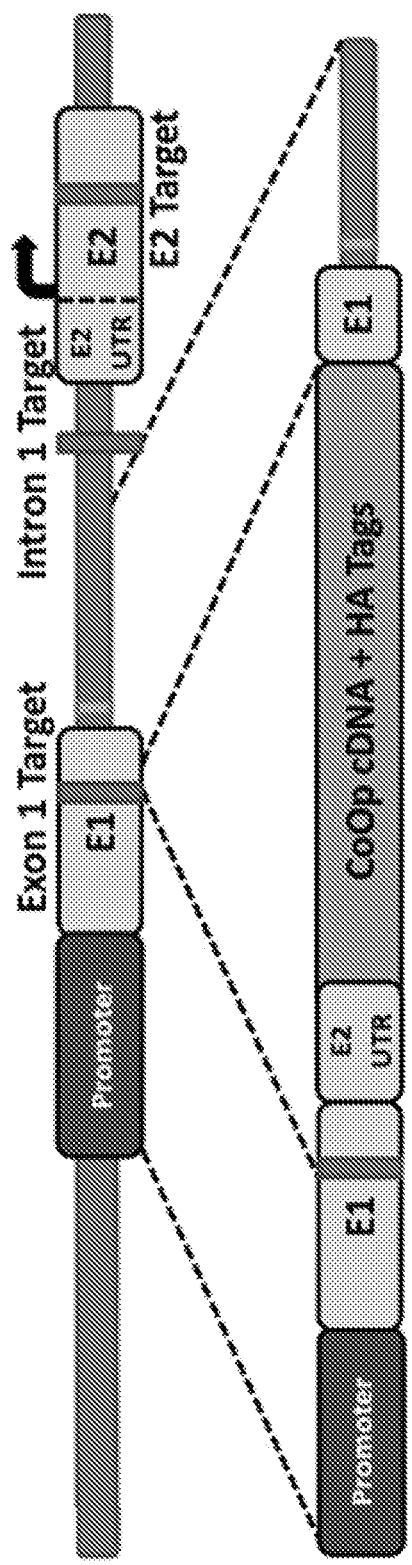
FIGS. 5A and 5B illustrate correction of BTK mutations.
Figure 5B:
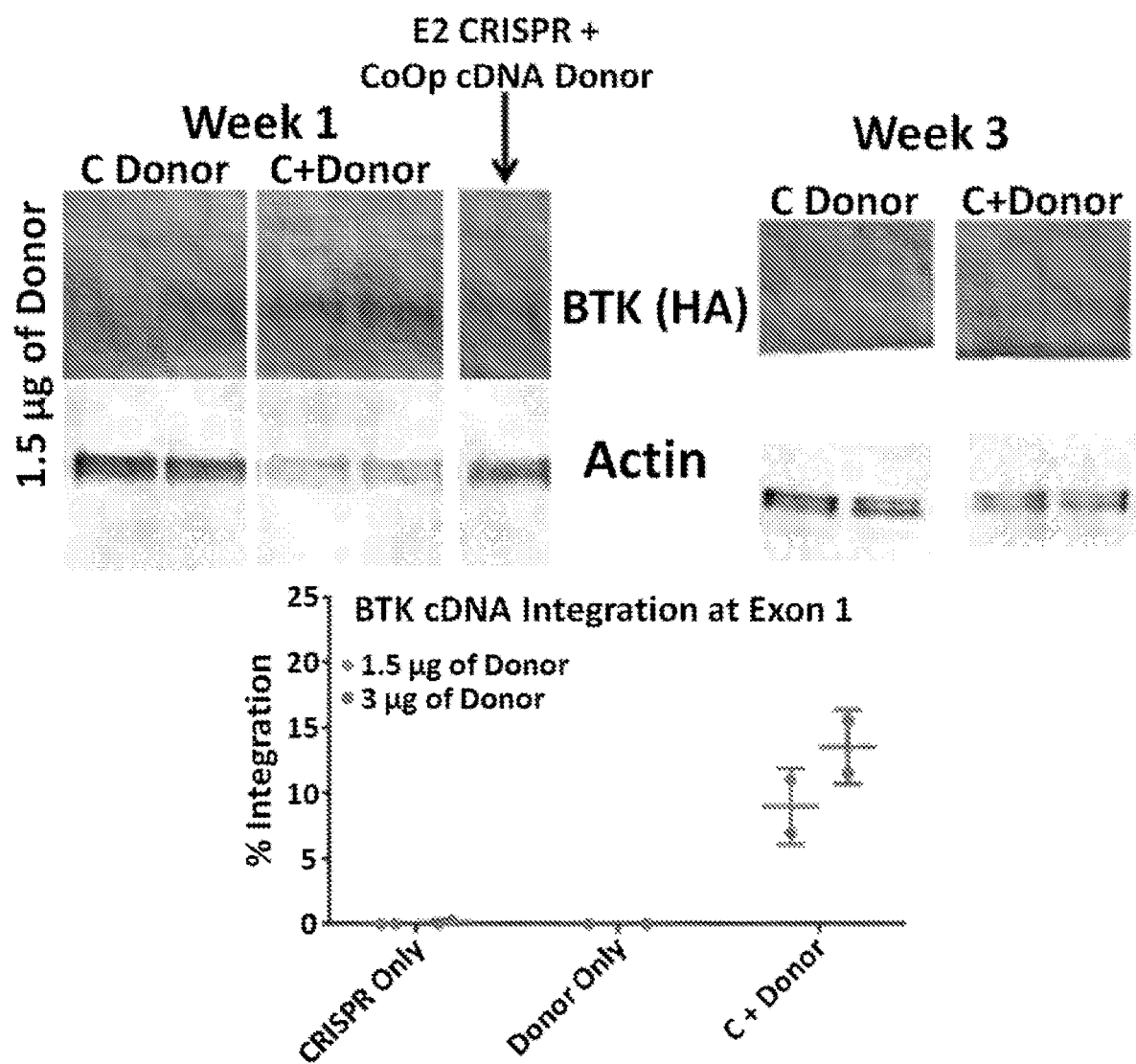

Many different CRISPR/Cas9 target sites within the BTK locus were assessed for efficacy of BTK gene editing. Guide RNA (gRNA) for sites in exon 1, intron 1, and exon 2 were assembled and tested with their corresponding homologous donor sequences (see, e.g., FIG. 4). Sites in exons 3, 5, 6, 13, and 18 were also tested but found to be inferior to the three other sites described (data not shown). For in vitro studies, these donors were tagged with three C-terminal Hemagglutinin (HA) tags in order to differentiate between transgenic and endogenous BTK by protein based assays (see, e.g., FIG. 5).

Each gRNA targeted to the described sites was first tested in K562 erythroleukemia cell lines to determine the efficacy of allelic disruption via surveyor nuclease assay. The gRNA was expressed off of the pX330 expression plasmid which also expresses SpCas9 while the donor molecule was assembled into the TOPO 2.1 plasmid backbone. 500 ng of CRISPR/Cas9 plasmid was electroporated via the Lonza 4D nucleofection system into 2e5 K562 cells. Genomic DNA was extracted 3-5 days post electroporation and protein lysates were collected 1-3 weeks post electroporation. Levels of allelic disruption in cell lines was measured to be above 25% at all three sites as measured by surveyor nuclease assaying using the Cell enzyme.

After determining that the gRNAs were effective at introducing DSBs, further trials in K562 cells were conducted with the addition of the respective homologous donor template. 500 ng of the exon 1 gRNA and Cas9 expression plasmid was electroporated 1.5 ug or 3 ug of the homologous donor plasmid. Droplet digital PCR demonstrated about integration in about 10% of cells treated with 1.5 ug of donor and 15% of cells treated with 3 ug of donor (see, e.g., FIG. 5). Expression of the HA tagged transgenic BTK was seen one week post electroporation, however sample given only the donor plasmid displayed some expression as well. Three weeks post electroporation, the presence of the tagged product could still be seen in the samples treated with both CRISPR/Cas9 and donor, while the samples given on the CRISPR/Cas9 or the donor were both negative. This demonstrates stable, long term expression of the transgenic BTK.

Figure 6:
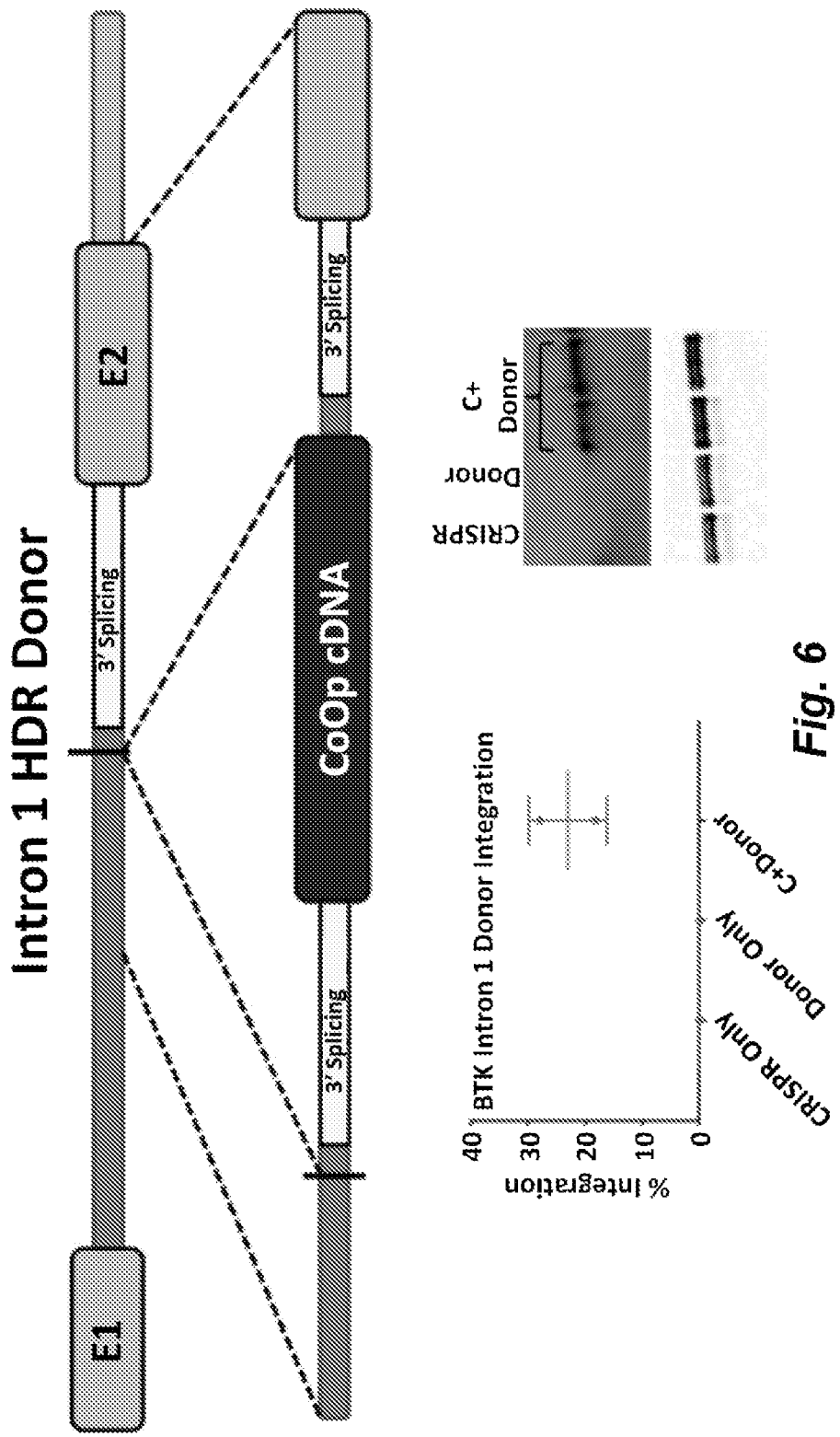
FIG. 6. Schematic for correction of BTK mutations using a full length codon optimized donor integrated into BTK Intron 1. A corrective codon optimized donor targeted to Intron 1 of the BTK locus was constructed with 500 bp of homology on either side of the transgene. In order to achieve efficient RNA processing of the construct, the 3' splicing elements from the endogenous Intron 1 locus were included within the homology arms. These signals include the branch point, AG exclusion zone, and the 3' splice signal. When delivered with the appropriate CRISPR/Cas9 expression plasmid, over 20% integration was seen in K562 cells. After 1 week, these cells were analyzed by Western blot and demonstrated expression of the HA tagged transgenic BTK.

Similar experiments were carried out for the intron 1 targeted gRNA. This donor template also included the 3' splice signal, branch point, and AG exclusion zone necessary for efficient splicing of intron 1. 500 ng of intron 1 gRNA in the pX330 expression plasmid was electroporated into K562 cells with 3 ug of donor plasmid template. Genomic DNA extracted from the samples 3 days post electroporation and tested for integration of the transgenic BTK via droplet digital PCR. Over 20% of cells treated with both the CRISPR/Cas9 and the donor template were positive for integration at the target site in the BTK locus (see, e.g., FIG. 6). These same samples were found to strongly express the HA tagged transgenic product one week post electroporation via immunoblot.

Figure 7:
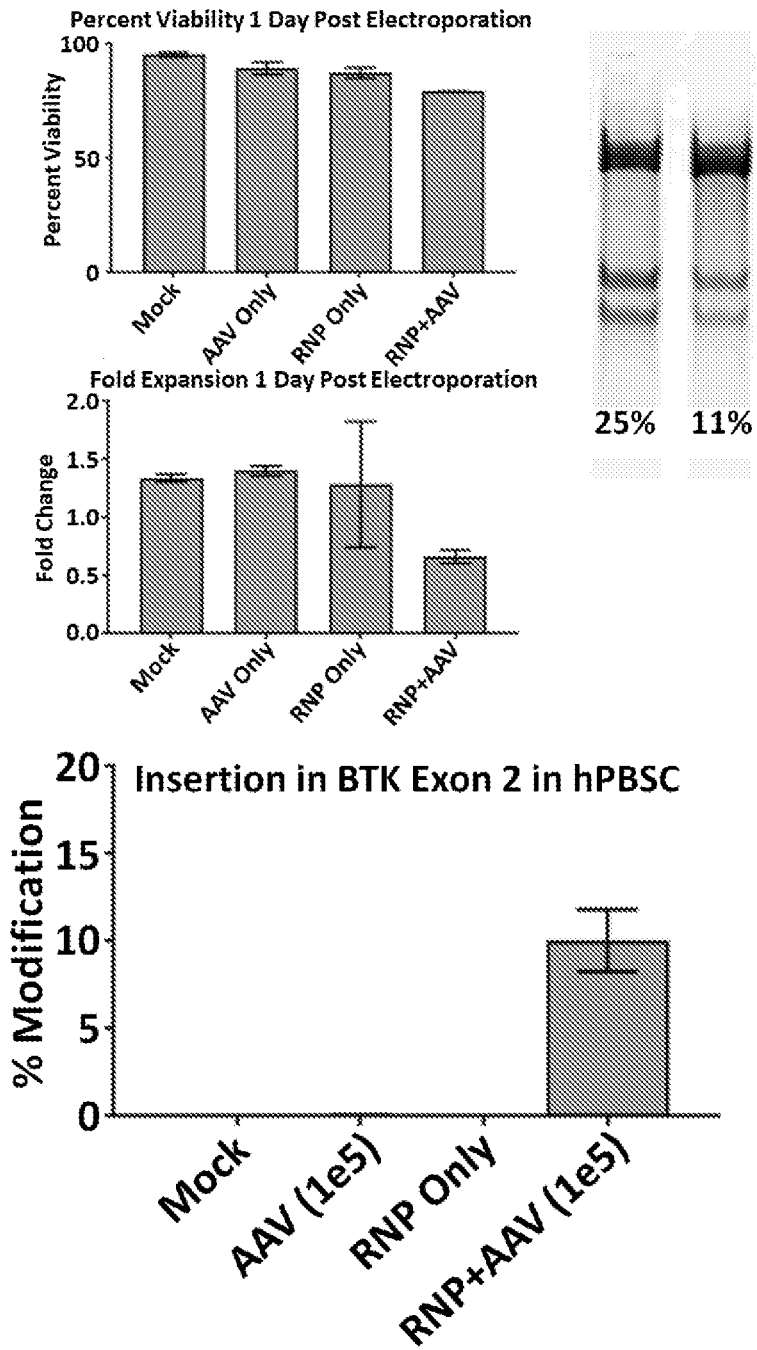
FIG. 7. Targeted Integration of a Corrective BTK Donor into BTK Exon 2 in Human PBSC. A corrective codon optimized donor targeted to Exon 2 of BTK featuring 500 bp homology arms on either side was packaged into an AAV6 vector and delivered with a CRISPR/Cas9 RNP loaded with the appropriate Exon 2 targeted gRNA into human CD34+ hematopoietic stem and progenitor cells taken from healthy donor mobilized peripheral blood. The RNP alone induced up to 25% allelic disruption. Treatment with the AAV and RNP led to a substantial decrease in the percent viability and fold expansion of the cells one day post electroporation, but also led to integration of the corrective donor in 10% of cells.

Finally, the exon 2 reagents were tested in human primary hematopoietic stem and progenitor cells (HSPCs) following similar experiments described for exon 1 and intron 1. The gRNA and Cas9 were delivered as a ribonucleoprotein (RNP) while the donor template was delivered as an AAV. 4.5 ug of gRNA and 100 pmol of Cas9 were complexed in vitro for 20 minutes and electroporated into 2e5 human CD34+ HSPCs via the BTX electroporation system (250 V, 5 ms, 1 pulse). Following electroporation, these samples were transduced with donor AAV with an MOI of 1e5 and cultured in X-Vivo with Stem Cell Factor, Flt3, and TPO. 24 hours post transduction, the cells were counted and measured for viability and the virus was removed (see, e.g., FIG. 7). The cells were cultured for three additional days in BBMM with IL-3, IL-6, and Stem Cell Factor before being harvested for genomic DNA. Allelic disruption was measured via the surveyor nuclease assay and found to average at 13%. While the treated cells retained viability similar to the mock samples, the addition of both RNP and AAV caused a large decrease in the fold expansion of the cells. Samples treated with both RNP and AAV were found to have 10% integration of the transgenic BTK. This experiment serves as a proof of concept for editing BTK ex vivo to achieve correction of XLA causing mutations.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of treating X-Linked agammaglobulinemia (XLA) in a mammal, said method comprising:
providing differentiated T cells and/or stem/progenitor cells from said mammal;
performing a targeted insertion of a corrective copy of a BTK cDNA at the BTK gene locus in said cells to provide a corrected BTK gene, wherein said corrective BTK cDNA comprises a sequence selected from SEQ ID NO:2, SEQ ID NO:4, SEQ ID NO:5, SEQ ID NO:6, and SEQ ID NO:7, and wherein said targeted insertion places said BTK cDNA in BTK exon 1, BTK intron 1, or BTK exon 2, downstream and operably linked to the endogenous BTK enhancer/promoter; and
introducing said modified cells into said mammal where said corrected BTK gene is expressed in a physiologically regulated manner.

2. The method of claim 1, wherein said performing a targeted insertion comprises:
transducing said cells with an AAV vector or integrase defective lentiviral vector (IDLV) containing a donor comprising said corrective BTK cDNA flanked by homology arms; and
transfecting said cells in vitro, with:
a TALEN protein or a TALEN mRNA targeting the BTK gene; or
a nucleic acid encoding a guide RNA (gRNA) and CRISPR/Cas endonuclease where said gRNA targets the BTK gene; or
a ribonucleoprotein (RNP) complex comping a guide RNA complexed to a CRISPR/Cas endonuclease, where said gRNA targets the BTK gene.

3. The method of claim 2, wherein:
said BTK cDNA donor sequence is flanked by a 5' homology arm that begins at the TALEN or CRISPR/Cas cut site and extends at least 50 bp upstream, or at least 100 bp upstream, or at least 200 bp upstream, or at least 300 bp upstream, or at least 400 bp upstream, or at least 500 bp upstream; and/or
said BTK cDNA donor sequence is flanked by a 5' homology arm that begins at the TALEN or CRISPR/Cas cut site and extends about 500 bp upstream from said site; and/or
said cDNA donor sequence is flanked by a 3' homology arm that extends at least 50 bp, or at least 100 bp, or at least 200 bp, or at least 300 bp, or at least 350 bp, or at least 400 bp, or at least 450 bp, or at least 500 bp downstream of the TALEN or CRISPR/Cas cut site; and/or
said BTK cDNA donor sequence is flanked by a 3' homology arm that extends at about 500 bp downstream of the TALEN or CRISPR/Cas cut site.

4. The method of claim 1, wherein:
said cDNA donor is codon-optimized/-divergent; and/or
said cDNA donor is modified to exclude protospacer adjacent motifs (PAMs); and/or
said cDNA is modified by modifying a PAM sequence TGG to TAA.

5. The method of claim 1, wherein:
said method comprises transducing said differentiated T cells and/or stem/progenitor cells with the integrase defective lentiviral vector (IDLV) containing said corrective BTK cDNA flanked by homology arms; and/or
said method comprises transducing said differentiated T cells and/or stem/progenitor cells with an AAV vector containing a corrective BTK cDNA flanked by homology arms.

6. The method of claim 5, wherein said AAV vector comprises a serotype selected from the group consisting of AAV1, AAV2, AAV4, AAV5, AAV6, AAV8, and AAV9.

7. The method of claim 5, wherein:
a helper protein is introduced into said cells; and/or
a helper protein is introduced into said cells wherein said helper protein comprises a mutant adenoviral serotype 5 helper protein; and/or
a helper protein is introduced into said cells wherein said helper proteins comprise E4orf6 and/or E1b55k helper proteins.

8. The method of claim 7, wherein:
said method comprises transfecting said cells in vitro, with TALEN mRNA targeting exon 1, intron 1, or exon 2 of the BTK gene; or
said method comprises transfecting said cells in vitro, with a nucleic acid encoding a guide RNA (gRNA) and CRISPR/Cas endonuclease where said gRNA targets exon 1, intron 1, or exon 2 of the BTK gene.

9. The method of claim 1, wherein:
said method comprises transfecting said cells in vitro, with a ribonucleoprotein (RNP) complex comprising a guide RNA (gRNA) complexed to a CRISPR/Cas endonuclease, where said gRNA targets a site in BTK exon 1; or
said method comprises transfecting said cells in vitro, with a ribonucleoprotein (RNP) complex comprising a guide RNA (gRNA) complexed to a CRISPR/Cas endonuclease, where said gRNA targets a site in BTK exon 1 comprising the sequence of SEQ ID NO: 1; or
said method comprises transfecting said cells in vitro, with a ribonucleoprotein (RNP) complex comprising a guide RNA (gRNA) complexed to a CRISPR/Cas endonuclease, where said gRNA targets a site in BTK intron 1; or
said method comprises transfecting said cells in vitro, with a ribonucleoprotein (RNP) complex comprising a guide RNA (gRNA) complexed to a CRISPR/Cas endonuclease, where said gRNA targets a site in BTK intron 1 comprising the sequence of SEQ ID NO:3).

10. The method of claim 9, wherein the CRISPR/Cas endonuclease is a Cas9 polypeptide and the corresponding CRISPR/Cas guide RNA is a Cas9 guide RNA.

11. The method of claim 1, wherein:
said method comprises transfecting said cells in vitro, with a ribonucleoprotein (RNP) complex comprising a guide RNA (gRNA) complexed to a CRISPR/Cas endonuclease, where said gRNA targets a site in BTK exon 2; or
said method comprises transfecting said cells in vitro, with a ribonucleoprotein (RNP) complex comprising a guide RNA (gRNA) complexed to a CRISPR/Cas endonuclease, where said gRNA targets a site in BTK exon 2 comprising the sequence of SEQ ID NO: 8.

12. The method of claim 1, wherein:
said cells comprise hematopoietic stem and progenitor cells (HSPC); and/or
said cells comprise CD34+ hematopoietic stem and progenitor cells (HSPC); and/or
said cells comprise peripheral blood stem cells (PBSC); and/or
said cells comprise G-CSF mobilized peripheral blood stem cells (PBSC); and/or
said cells comprise CD34+ cells.

13. The method of claim 1, wherein said method provides at least 3%, or at least 4%, or at least 5%, or at least 6%, or at least 7%, or at least 8%, or at least 9%, or at least 10% corrected hematopoietic stem cells with functional BTK.

* * * * *